US012725827B2

(12) United States Patent
Yushin et al.

(10) Patent No.: US 12,725,827 B2
(45) Date of Patent: Sep. 1, 2026

(54) METAL SULFIDE COMPOSITE MATERIALS FOR BATTERIES

(71) Applicants: Sila Nanotechnologies, Inc., Alameda, CA (US); GEORGIA TECH RESEARCH CORPORATION, Atlanta, GA (US)

(72) Inventors: Gleb Yushin, Atlanta, GA (US); Feixiang Wu, Atlanta, GA (US); Hyea Kim, Atlanta, GA (US)

(73) Assignees: SILA NANOTECHNOLOGIES, INC., Alameda, CA (US); GEORGIA TECH RESEARCH CORPORATION, Atlanta, GA (US)

( * ) Notice: Subject to any disclaimer, the term of this patent is extended or adjusted under 35 U.S.C. 154(b) by 524 days.

(21) Appl. No.: 18/318,519

(22) Filed: May 16, 2023

(65) Prior Publication Data

US 2024/0039034 A1 Feb. 1, 2024

Related U.S. Application Data

(63) Continuation of application No. 17/649,418, filed on Jan. 31, 2022, now Pat. No. 11,658,331, which is a (Continued)

(51) Int. Cl.

*H01M 10/052* (2010.01)
*H01M 4/04* (2006.01)

(Continued)

(52) U.S. Cl.

CPC ....... *H01M 10/052* (2013.01); *H01M 4/0404* (2013.01); *H01M 4/0428* (2013.01); *H01M 4/0471* (2013.01); *H01M 4/136* (2013.01); *H01M 4/1397* (2013.01); *H01M 4/366* (2013.01); *H01M 4/5815* (2013.01); *H01M 10/0568* (2013.01); *Y02T 10/70* (2013.01); *Y10T 156/10* (2015.01)

(58) Field of Classification Search

CPC ........... H01M 10/052; H01M 10/0568; H01M 4/0404; H01M 4/0428; H01M 4/0471; H01M 4/136; H01M 4/1397; H01M 4/366; H01M 4/5815

See application file for complete search history.

(56) References Cited

U.S. PATENT DOCUMENTS

2009/0162750 A1* 6/2009 Kawakami .............. H01M 4/58 252/182.1
2010/0143791 A1* 6/2010 Park ...................... H01M 4/131 429/220

(Continued)

*Primary Examiner* — Jane J Rhee
(74) *Attorney, Agent, or Firm* — Muncy, Geissler, Olds & Lowe, P.C.; Daniel Podhajny

(57) ABSTRACT

Lithium-ion batteries are provided that variously comprise anode and cathode electrodes, an electrolyte, a separator, and, in some designs, a protective layer. In some designs, at least one of the electrodes may comprise a composite of (i) Li2S and (ii) conductive carbon that is embedded in the core of the composite. In some designs, the protective layer may be disposed on at least one of the electrodes via electrolyte decomposition. Various methods of fabrication for lithium-ion battery electrodes and particles are also provided.

21 Claims, 35 Drawing Sheets

Related U.S. Application Data continuation of application No. 16/997,694, filed on Aug. 19, 2020, now abandoned, which is a continuation of application No. 16/208,486, filed on Dec. 3, 2018, now Pat. No. 10,756,382, which is a continuation of application No. 14/628,153, filed on Feb. 20, 2015, now Pat. No. 10,147,966.

(60) Provisional application No. 61/942,285, filed on Feb. 20, 2014.

(51) Int. Cl.

| | |
|---|---|
| ***H01M 4/136*** | (2010.01) |
| ***H01M 4/1397*** | (2010.01) |
| ***H01M 4/36*** | (2006.01) |
| ***H01M 4/58*** | (2010.01) |
| ***H01M 10/0568*** | (2010.01) |

(56) References Cited

U.S. PATENT DOCUMENTS

| | | | | |
|---|---|---|---|---|
| 2013/0244090 | A1* | 9/2013 | Tanaka | H01M 50/124<br>429/176 |
| 2013/0323595 | A1* | 12/2013 | Sohn | H01M 4/134<br>429/231.95 |

* cited by examiner

COMMERCIAL Li2S
NANOSTRUCTURED Li2S
10 WT. % CNT
20 WT. % CNT
7M LTFSI
SPECIFIC CAPACITY (mAhg-1 S)
SPECIFIC CAPACITY (mAhg-1 Li2S)
CURRENT RATE
C/20 C/10 C/5 C/2

GRAPHITIC OUTER SHELL
THREE Li2S-C NANOCOMPOSITE PARTICLES
20 nm
GRAPHITIC SHELL
A
A
100 nm
STEM
INTENSITY (a.u.)
0
20
40
60
80
100
C
S
POSITION (nm)
0
100
200
300
400
GRAPHITIC OUTER SHELL
Li2S NANOCRYSTALS
20 nm
TWO OVERLAPPING PARTICLES
GRAPHITIC OUTER SHELLS
0.32 nm
0.32 nm
10 nm

2200

2500

FIG. 29A
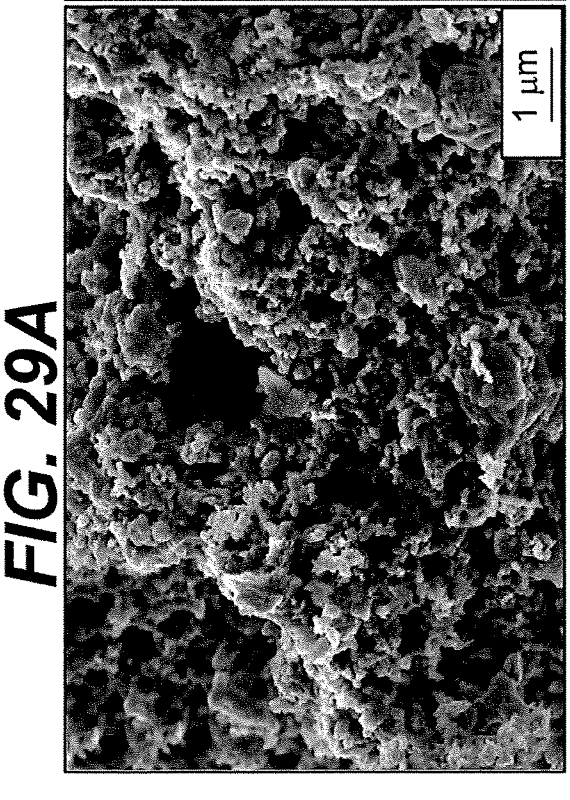
FIG. 29B
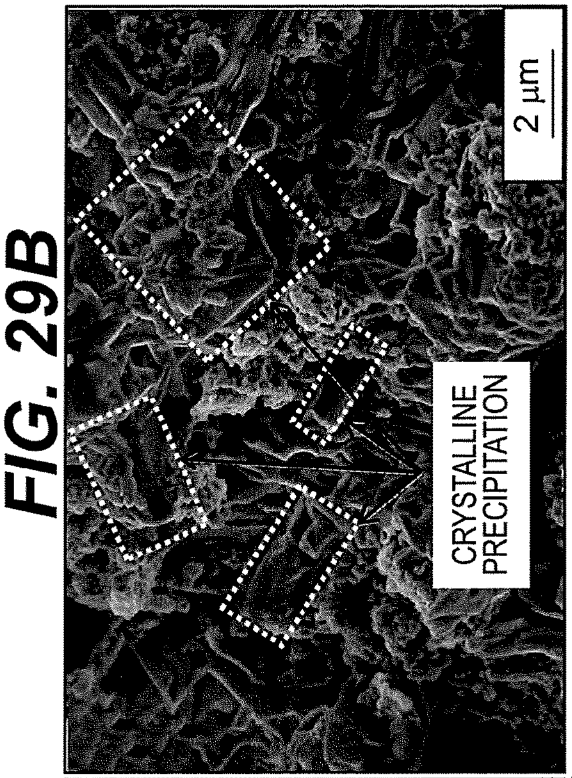
FIG. 29C
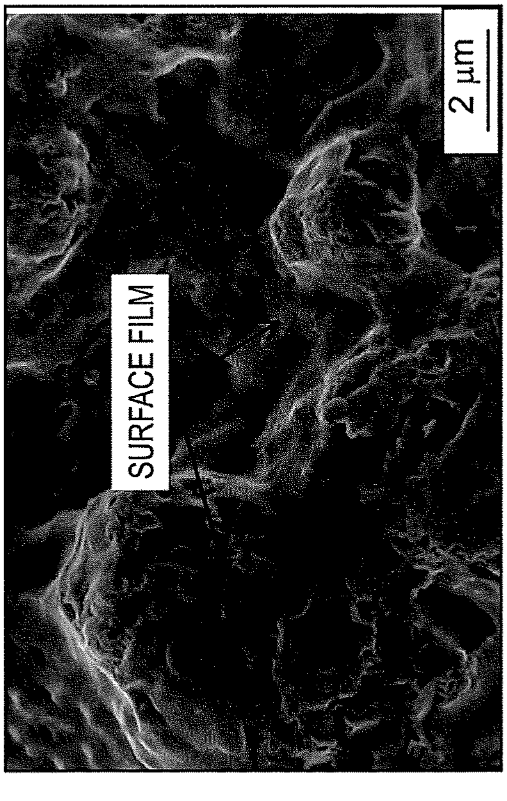
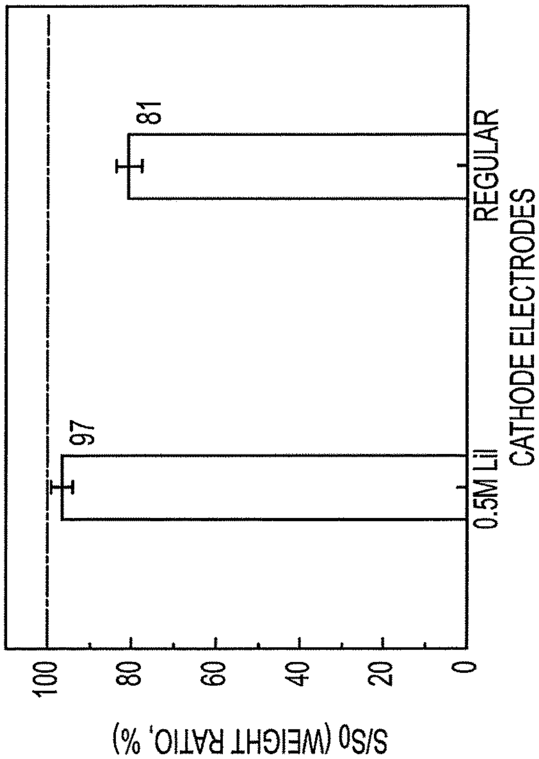
FIG. 29D

DISCHARGE CAPACITY (mAh/g)
1000
800
600
400
200
0
5M LiFSI/DME
3M LiFSI/DME
COULOMBIC EFFICIENCY (%)
100
80
60
40
20
0
0
200
400
600
800
1000
CYCLE NUMBER

CURRENT (uA)

60
30
0
-30
-60
-90
-120
-150

8TH CYCLE

1ST CYCLE 1.6 1.8 2.0 2.2 2.4 2.6 2.8 3.0

POTENTIAL (V VS. Li/Li+)

METAL SULFIDE COMPOSITE MATERIALS FOR BATTERIES

CROSS-REFERENCE TO RELATED APPLICATIONS

The present application for patent is a Continuation of U.S. patent application Ser. No. 17/649,418, entitled "Metal Sulfide Composite Materials for Batteries," filed Jan. 31, 2022, which is a Continuation of U.S. patent application Ser. No. 16/997,694, entitled "Metal Sulfide Composite Materials for Batteries," filed Aug. 19, 2020, which is a Continuation of U.S. patent application Ser. No. 16/208,486, entitled "Metal Sulfide Composite Materials for Batteries," filed Dec. 3, 2018, which is a Continuation of U.S. patent application Ser. No. 14/628,153, entitled "Metal Sulfide Composite Materials for Batteries," filed Feb. 20, 2015, which claims the benefit of U.S. Provisional Application No. 61/942,285, entitled "Harnessing Steric Separation of Freshly Nucleated Lithium Sulfide Nanoparticles for Bottom-up Assembly of High-Capacity, High-Rate Cathodes for Lithium-Sulfur and Lithium-Ion Batteries," filed Feb. 20, 2014, each of which is expressly incorporated herein by reference in its entirety.

STATEMENT REGARDING FEDERALLY SPONSORED RESEARCH OR DEVELOPMENT

This invention was made with United States Government support under grant number W911NF-12-1-0259 awarded by the United States Army. The United States Government has certain rights in this invention.

BACKGROUND

Field

The present disclosure relates generally to energy storage devices, and more particularly to battery technology with active metal ions participating in electrochemical reactions and the like.

Background

Owing in part to their relatively high energy densities, light weight, and potential for long lifetimes, rechargeable batteries with active metal ions are used extensively in consumer electronics, electric vehicles, aerospace and other important applications. The most popular type of rechargeable batteries with active metal ions is lithium (Li) ion (Li-ion) batteries. These batteries have essentially replaced nickel-cadmium and nickel-metal-hydride batteries in many applications. Despite their increasing commercial prevalence, further development of these and related batteries is needed, particularly for applications in low- or zero-emission, hybrid-electrical or fully-electrical vehicles, energy-efficient cargo ships and locomotives, aerospace, and power grids. Such high-power applications will require electrodes with higher specific capacities than those used in currently existing Li-ion batteries.

Sulfur (S) and sulfur-containing compounds have been investigated as a potential source for higher specific capacity electrodes, in addition to offering a number of other advantages, including a high theoretical specific capacity (1672 mAh/g of S), high energy density, low voltage operation, and relative material abundance. Sulfur's specific capacity is the highest among solid cathode compounds known for rechargeable Li-ion batteries and an order of magnitude greater than currently available commercial cathodes. If used in combination with Li metal anodes, the ultra-high specific capacity of S can enable exceptional gravimetric and volumetric energy densities in rechargeable batteries (e.g., 2600 Wh/kg and 2800 Wh/l, respectively), which is around 4-10 times higher than that of current state of the art Li-ion batteries. Sulfur is also found abundantly in nature, low cost, and light weight, in addition to having a relatively low toxicity.

For all of these reasons, sulfur-based electrodes are being investigated as a cost-effective, environmentally friendly, performance enhancing component of various batteries, such as Li and Li-ion batteries. Batteries with other active metal ions participating in electrochemical reactions (e.g., with Na ions, K ions, Mg ions, and other metal ions) may also benefit from the use of high-capacity, sulfur-comprising electrodes.

However, realization of the full potential of sulfur-based cathodes in metal-ion batteries has been hindered by a number of significant challenges, including low electrical conductivity, low ionic conductivity, and the physical instability of conventional sulfur-based cathodes. Sulfur and sulfur-containing compounds are highly electrically insulating. The ionic conductivity of lithium in sulfur and sulfur-compounds is also very small, which typically slows down the overall rate of the electrochemical reactions and leads to low power characteristics in Li/S cells. In addition, sulfur cathodes generate intermediate electrochemical reaction products (polysulfides, such as $Li_2S_n$) that are highly soluble in conventional organic electrolytes. This leads to sulfur cathode dissolution and re-deposition of electrically-insulating precipitates on the anode surface, preventing full reversibility of the electrochemical reaction.

Thus, despite the theoretical advantages of sulfur-based cathodes, practical application in metal-ion batteries is difficult to achieve. Several approaches have been developed to overcome these difficulties, but none have been fully successful in overcoming all of them. For example, some conventional designs have attempted to address the low electrical conductivity by using a conductive carbon additive to mix or ball mill with S to form C—S composites, but this does not address the ionic conductivity or cathode instability. In addition, the uniformity of such composites is poor, which negatively affects their performance characteristics in batteries. Similarly, some approaches have mixed or ball-milled metal sulfides (e.g., $Li_2S$) with conductive carbon additives to form $Li_2S$—C composites, but these approaches similarly suffer from a lack of uniformity and degradation in conventional cells.

Other conventional designs have attempted to address the ionic conductivity by using certain special electrolytes that cause the sulfur to swell, but this often increases the rate of sulfur dissolution. Still other conventional designs have attempted to melt-infiltrate S into a porous carbon. This approach, however, still suffers from low volumetric capacity of the produced composites and still has an unsatisfactorily high cathode dissolution rate. In addition, if sulfur expands during reaction with metal ions (e.g., during reaction with Li ions) forming metal sulfides (e.g. $Li_2S$), such an expansion may induce mechanical damage within the electrode and electrode particles.

Accordingly, conventional approaches to address sulfur-based (or metal-sulfide based) cathode shortcomings have found only limited success. There remains a need for better ways to address the low electrical and ionic conductivity as well as physical instability of sulfur-based (or metal-sulfide based) cathodes in metal-ion batteries. There also remains a need for developing new methods for the formation of uniform metal sulfide composites for use in batteries.

SUMMARY

Embodiments disclosed herein address the above stated needs by providing improved battery components, improved batteries made therefrom, and methods of making and using the same.

As an example, a lithium-ion battery is provided that comprises anode and cathode electrodes, an electrolyte, and a separator. At least one of the electrodes comprises a composite of (i) $Li_2S$ and (ii) conductive carbon. The carbon is embedded in the core of the composite. The electrolyte ionically couples the anode and the cathode. The separator electrically separates the anode and the cathode.

As another example, another lithium-ion battery is provided that comprises anode and cathode electrodes, an electrolyte, a separator, and a protective layer. At least one of the electrodes exhibits a capacity in the range from 50 to 2000 mAh per gram of active material when operating within a potential range from about 1 V to about 4 V vs. Li/Li+. The separator electrically separates the anode and the cathode. The electrolyte ionically couples the anode and the cathode. The protective layer is disposed on at least one of the electrodes via electrolyte decomposition. The protective layer either slows down further electrolyte decomposition or reduces reactions between the active material and an electrolyte solvent.

As another example, a method of fabrication for a lithium-ion battery electrode is provided. The method may comprise, for example, forming a sacrificial porous thermoset polymer film; impregnating active material into the polymer film; thermally treating the active material impregnated polymer film in an inert environment to induce carbonization of the active material impregnated polymer film; and attaching the carbonized active material impregnated polymer film to a metal foil current collector to form an electrode.

As another example, another method of fabrication for lithium-ion battery composite electrode particles is provided. The method may comprise, for example, forming sacrificial porous thermoset polymer particles; impregnating active material into the polymer particles; and thermally treating the active material impregnated polymer particles in an inert environment to induce carbonization of the active material impregnated polymer particles.

BRIEF DESCRIPTION OF THE DRAWINGS

The accompanying drawings are presented to aid in the description of embodiments of the invention and are provided solely for illustration of the embodiments and not limitation thereof.

FIGS. 28A-28D and 29A-29D illustrate post-mortem studies of the electrodes from the cells of FIG. 27.

DETAILED DESCRIPTION

Figure 1:
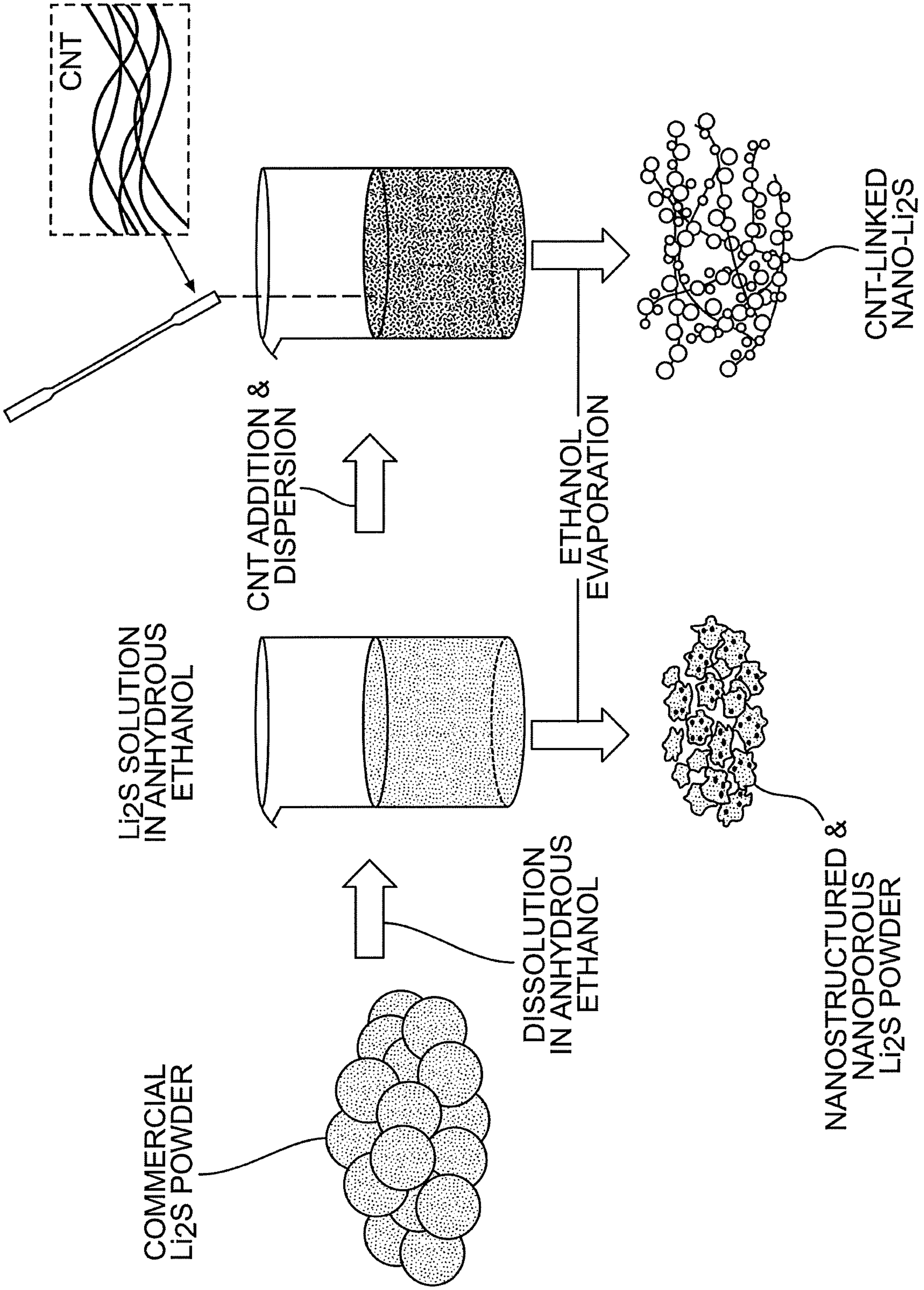
FIG. 1 is a schematic illustrating a synthesis process according to one example embodiment.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

In the description below, several examples are provided in the context of Li and Li-ion batteries with $Li_2S$ active materials because of the current prevalence and popularity of this technology. However, it will be appreciated that such examples are provided merely to aid in the understanding and illustration of the underlying techniques, and that these techniques may be similarly applied to other types of batteries with active metal ions other than Li (for example, Na or Na-ion batteries, Mg or Mg-ion batteries, etc.) as well as corresponding metal sulfides (such as $Na_2S$, MgS, etc.). Similarly, although several examples may be provided in the context of S and $Li_2S$ cathodes, and, in many cases, with certain specific electrolytes, it will again be appreciated that such examples are provided merely to aid in the understanding and illustration of the underlying techniques, and that these techniques may be similarly applied to various other batteries, various electrode materials, and various electrolytes.

As discussed in the background above, there remains a need in the art for better addressing the low electrical and ionic conductivity as well as physical instability of sulfur-based cathodes in metal and metal-ion batteries. In the view of the inventors, fully-lithiated $Li_2S$, for example (having theoretical gravimetric and volumetric capacities of 1166 mAh/g and 1935 mAh/cc), is likely to be a significantly more promising Li storage (active) material because it already contains Li and because it is formed in the already expanded state. The latter may improve its stability and handling. However, the preparation of uniform composites with $Li_2S$ (for example, preparation of uniform C—$Li_2S$ composites) is challenging, particularly if small (e.g., from about 2 to 500 nm) and uniform size of $Li_2S$ is desired.

The present disclosure accordingly provides or otherwise facilitates the fabrication and use of improved composite materials comprising sulfur, $Li_2S$, or other metal sulfides for metal or metal-ion (such as Li or Li ion) battery electrodes, improved metal or metal-ion batteries made therefrom, and methods of making and using such components and devices. In this way, a more full realization of the positive attributes of sulfur (sulfide) electrochemistry in metal or metal-ion batteries, improved development of advanced sulfur (or sulfide) comprising cathodes, and improved development of advanced metal or metal-ion batteries may be achieved. It will be appreciated, however, that some aspects of the present invention may also be applied for electrodes and batteries that do not contain sulfur, $Li_2S$, or other metal sulfides, or contain a mixture of chalcogenides (such as S, $Li_2S$, or other metal sulfides, other chalcogenides, etc.) with other types of active (ion storing) materials.

The high melting point of commercial $Li_2S$ (approximately 950° C.) makes it difficult to infiltrate into conductive carbon hosts. For example, ball milling may be used to reduce the size of commercial $Li_2S$ powders and distribute smaller particles together with carbon additives to improve their rate performance and capacity utilization. However, the ball milling procedure does not allow formation of uniform particles with controlled morphology or strong bonding between $Li_2S$ and carbon. As a result of volume changes within $Li_2S$, the produced cells show undesirably fast degradation. As another example, in order to better disperse $Li_2S$ in a carbon host and improve the strength of their interactions, lithium polysulfides may be used to synthesize the $Li_2S$ by releasing $H_2S$, and the electrodes maintained for 20 cycles. However, $H_2S$ is a rather toxic gas and harmful to the environment.

By contrast, in one example embodiment of the present invention, $Li_2S$ nanoparticles, porous $Li_2S$, as well as composites containing both $Li_2S$ and functional additives, may be produced by the dissolution of $Li_2S$ in a suitable solvent and eventual extraction of the solvent by, for example, evaporation. An intermediate step of adding a nonsolvent into the solution and inducing particle precipitation prior to the solvent evaporation may also be employed. By the addition of functional particles (additives) into the $Li_2S$ solution (e.g., in a suspension form), $Li_2S$ can be produced incorporating these particles within its structure. Depending on the geometry and relative fraction of such particles, as well as the chemistry of a particular solution, $Li_2S$ particles can also be produced on the surface of these functional additives or having functional additives connecting several $Li_2S$ particles. In some designs, some of the additives may also completely or partially encase the $Li_2S$ particles.

The use of functional additives within $Li_2S$-comprising composites may serve several purposes. For example, the functional additives may be used to enhance mechanical stability (e.g., by minimizing volume changes) during Li insertion/extraction (during battery cycling), to enhance electrical properties of $Li_2S$, or to reduce dissolution of $Li_2S$ during Li extraction. It is preferable that these functional additives exhibit small volume changes (for example, less than around 30 vol. %, more preferably below 10 vol. %) during Li extraction from the $Li_2S$-comprising electrode. When conductivity enhancement is desired, various conductive carbon materials can be used as suitable additives due to carbon's low weight, relatively low cost, high conductivity, and high Li-ion permeability. In some designs, the surface of the carbon additives may be coated with various functional groups or moieties. Some of these moieties or functional groups may be introduced to enhance nucleation of polar $Li_2S$ on their surface. In some designs, surfactants may also be added into the solution/suspension in order to control the size and morphology of the produced composites.

Examples of suitable carbon additives include, but are not limited to, carbon black particles, various porous carbon particles (including various types of porous carbons produced using sacrificial templates and self-templating approaches, activated carbon, various porous carbons produced from organic and inorganic precursors, etc.), carbon fibers and nanofibers, carbon nanotubes (including multi-walled carbon nanotubes, MWCNT), graphite and graphite flakes, graphene oxide and graphene (including multi-walled graphene and multi-walled graphene oxide), fullerenes, carbon onions, carbon aerogels, dendritic carbons, various other types of carbon particles and their mixtures, with specific surface area ranging from around 3 $m^2/g$ to around 3000 $m^2/g$. In addition to conductive carbon, conductive metal and conductive ceramic particles may also be used. In addition, a carbon precursor may also be used (for example, a polymer or another suitable organic material) instead of carbon particles. Such a precursor may be later transformed to conductive carbon during heat-treatment of the $Li_2S$-precursor composite at temperatures below the melting or decomposition of $Li_2S$ (e.g., below 950° C.). In the last case, it may be preferable for the carbon precursor to possess a high carbonization yield, such as a carbonization yield above 20%. In some cases, it may also be advantageous to use polymers conductive in the potential range of $Li_2S$ operation within the cell. In order to improve the dispersion of additives, it may be advantageous to use ultra-sonication or to use mixing.

In some cases, it may be advantageous (either instead of or in addition to conductive carbon) to use active particles (i.e., particles capable of storing or releasing Li ions) as functional additives. Suitable examples of such particles include various metal oxides, metal sulfides, metal phosphates, and various other known ceramic particles capable of intercalating Li and exhibiting capacity for Li extraction or insertion above 10 mAh/g and below 700 mAh/g in the potential range of electrode operation within a Li or Li-ion cell. Such particles may already comprise Li in their structure in order to maximize Li capacity of the composites. In this case, several advantages may be attained. Most of these ceramic particles create stronger bonding with $Li_2S$ and thus may produce composites with better mechanical properties. Such particles may also capture polysulfides and slow down (or even prevent) $Li_2S$ dissolution into the electrolyte during Li extraction. If such particles encase $Li_2S$, they may be particularly efficient in preventing $Li_2S$ dissolution into the electrolyte, by allowing Li transport and preventing a direct contact of the solvent with $Li_2S$.

It may be important or even critical that the solvent (used for the above-described preparation of $Li_2S$ nanoparticles, porous $Li_2S$, as well as composites containing both $Li_2S$ and functional additives) can be reversibly extracted from the $Li_2S$ solution with the formation of pure $Li_2S$. It may also be important that the solubility of $Li_2S$ in such a solvent (or solvent mixture) is sufficiently high. In order to reduce the cost associated with solvent use and the energy associated with solvent evaporation, it may be preferable to use a solvent (or a solvent mixture) that has $Li_2S$ solubility in excess of or even more preferably, in excess of 0.1M. It may also be preferable for the solvent to exhibit low viscosity (e.g., below 500 mPa·s, preferably below 100 mPa·s, or even more preferably below 10 mPa·s). The inventors have identified that ethanol and methanol, for example, work well as solvents suitable for application in the present invention. They offer high $Li_2S$ solubility, and do not induce alcoholysis. Further, the viscosity of ethanol is only around 1 mPa·s at room temperature. Therefore, it is preferred for the $Li_2S$ solution to contain at least 5% (preferably at least 20%) of their ethanol or methanol or their mixture. Pure ethanol or methanol or their mixture could be used favorably.

FIG. 1 is a schematic illustrating a synthesis process according to one example embodiment. In this example, carbon nanotubes (CNTs) are used as functional conductive additives. In addition or as an alternative, other carbon additives may be used as desired, instead of CNTs, as described above.

In illustrated schematic, commercial $Li_2S$ is dissolved in ethanol in an ultra-dry environment (e.g., within a glovebox with the moisture content below about 1 ppm, preferably below about 0.2 ppm) to obtain an approximately 0.5 M $Li_2S$ solution in ethanol. Evaporation of ethanol allows for the production of nanoporous $Li_2S$ by consolidation of individual $Li_2S$ nanoparticles nucleated heterogeneously from the supersaturated solution. The addition of CNT into the solution prior to evaporation may induce nucleation and growth of $Li_2S$ heterogeneously on the CNT surface sites. As a result, the CNT electrically links or connects multiple $Li_2S$ particles. No gas evolution is generally observed, suggesting that $H_2S$ is not released. In order to improve the uniformity of the CNT suspension, an ultrasonic bath treatment may be used. As a further preparation step, all samples may be annealed at about 100-950° C. (preferably at 200-800° C.) under inert gas or in vacuum to remove traces of solvents, and, if needed, to induce densification. If it is desired to avoid agglomeration of the particles, a lower annealing temperature (e.g., below 800° C., or in some cases below 600° C.) may be preferred. In one particular example, it has been found that a 400° C. annealing temperature under Ar works well.

Figure 2:
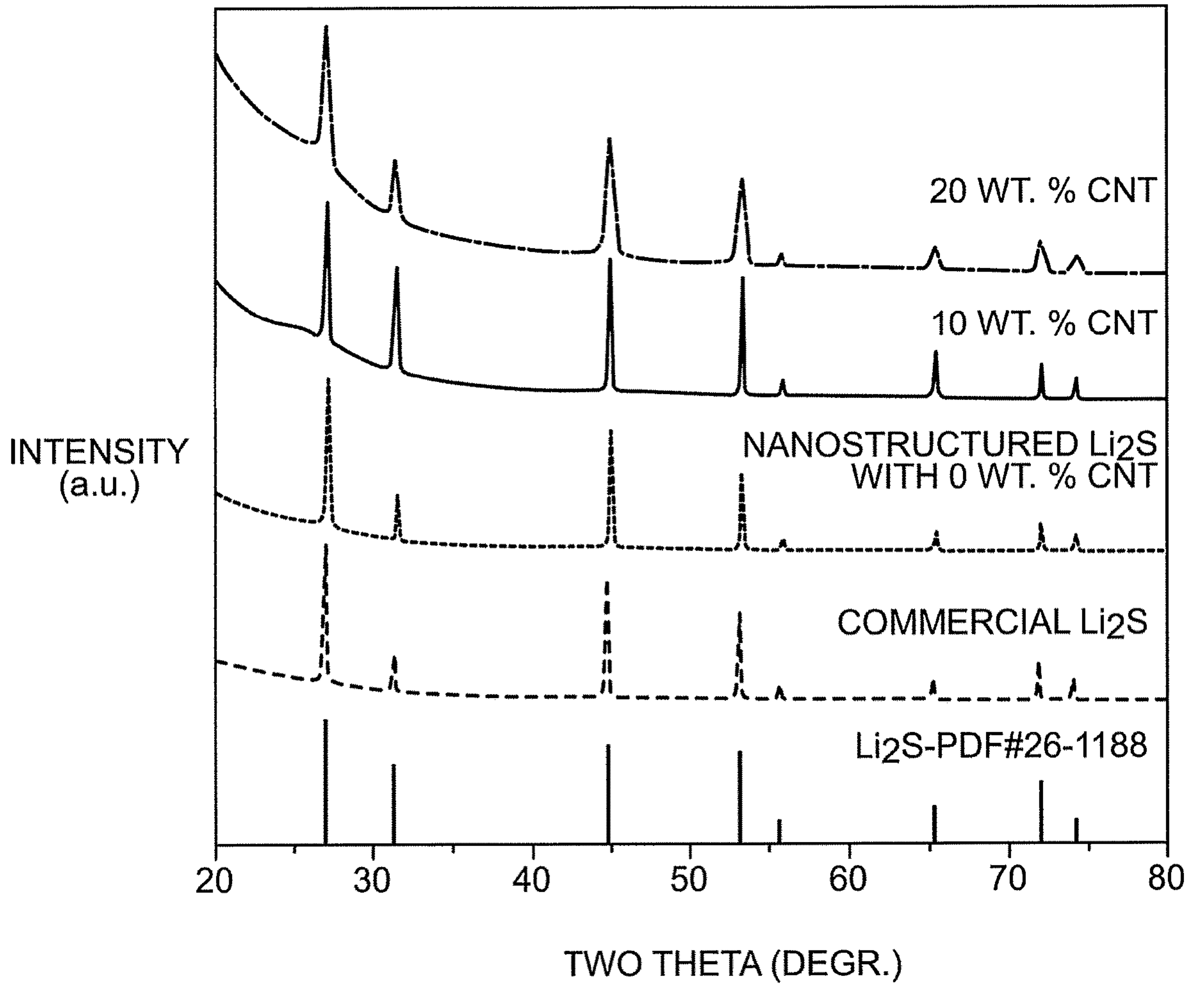
FIG. 2 illustrates X-ray diffraction (XRD) results on example materials synthesized according to the process of FIG. 1.

FIG. 2 illustrates X-ray diffraction (XRD) results on example materials synthesized according to the process of FIG. 1. The XRD results confirm the lack of substantial impurities in the samples (see $Li_2S$-PDF #26-1188 for $Li_2S$ peaks characterization). All of the produced samples in this example show the same peaks as commercial $Li_2S$, indicating the lack of alcoholysis of $Li_2S$ in an anhydrous ethanol. This is in direct contrast to the known hydrolysis of $Li_2S$ in water, which results in the formation of stable and highly undesirable LiOH.

Figure 3A:
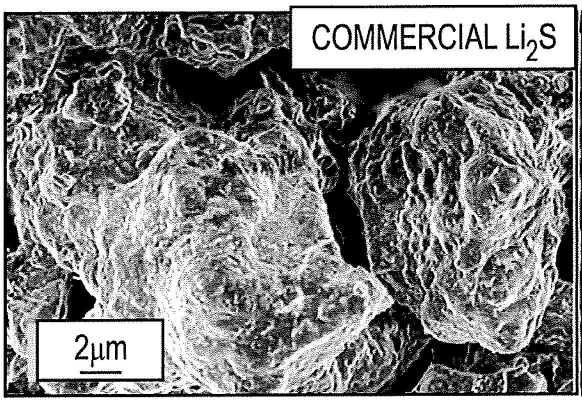
FIGS. 3A-3F illustrate selected results of electron microscopy characterization of the produced samples.
Figure 3B:
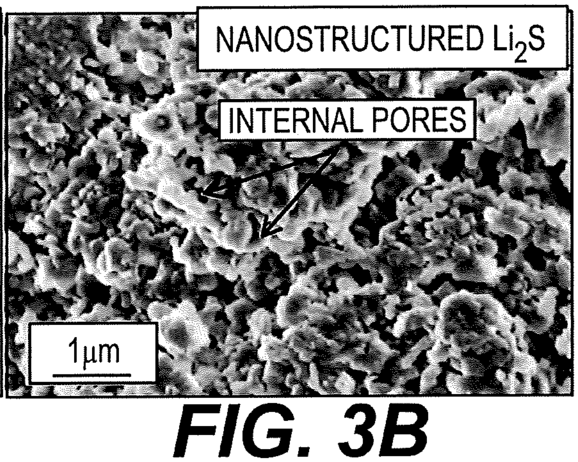
Figure 3C:
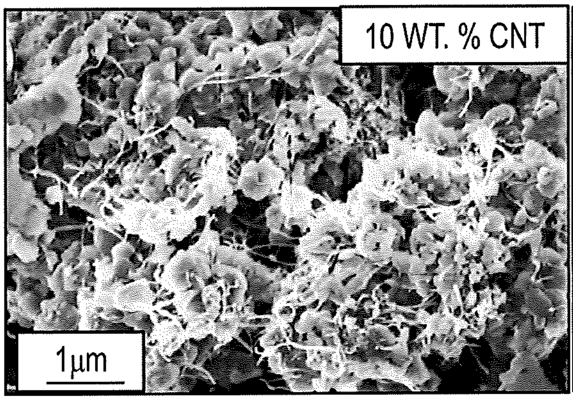
Figure 3D:
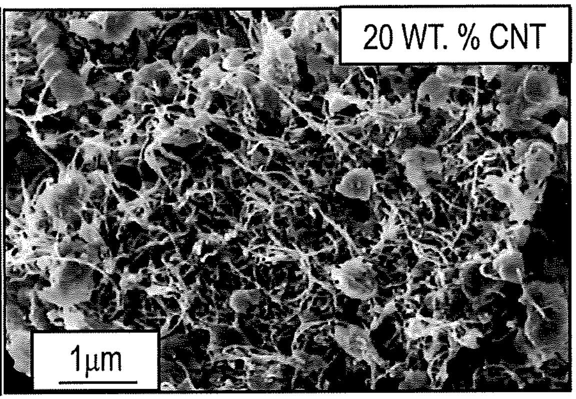
Figure 3E:
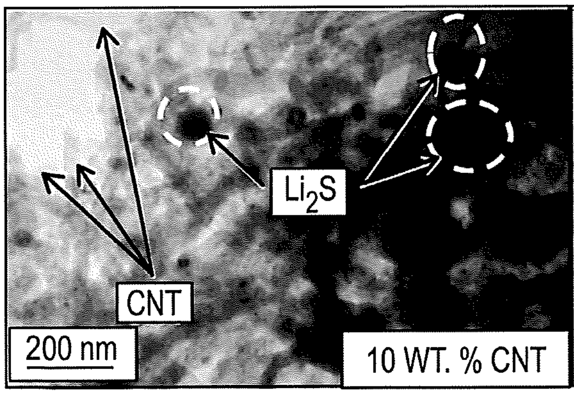
Figure 3F:
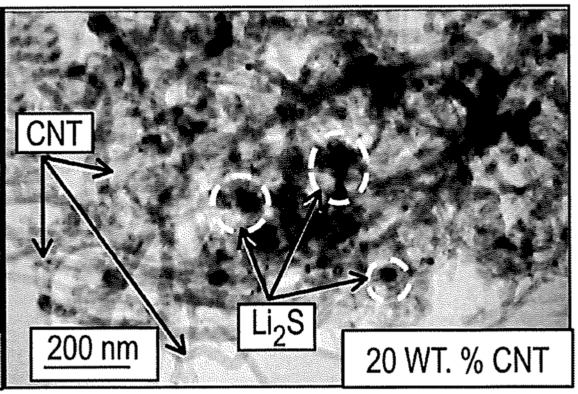

FIGS. 3A-3F illustrate selected results of electron microscopy characterization of the produced samples. In particular, FIG. 3A is a Scanning Electron Microscope (SEM) micrograph of commercial $Li_2S$. FIG. 3B is an SEM micrograph of nanoporous (nanostructured) $Li_2S$. FIG. 3C is an SEM micrograph of MWCNT-linked $Li_2S$ with 10 wt. % CNT. FIG. 3D is an SEM micrograph of MWCNT-linked $Li_2S$ with 20 wt. % CNT. FIG. 3E is a Transmission Electron Microscope (TEM) micrograph of MWCNT-linked nano-$Li_2S$ with 10 wt. % CNT. FIG. 3F is a TEM micrograph of MWCNT-linked nano-$Li_2S$ with 20 wt. % CNT.

As shown, the commercial $Li_2S$ displays a particle size of 10-20 inn. The nanostructured $Li_2S$ powder produced according to the above-described synthesis shows smaller porous particles (typically below 5 μm) with 50-200 nm interconnected pores present. These pores are produced during sintering of individual nanoparticles at around 400° C. The crystalline grains visible within the porous $Li_2S$ often exhibited a cuboid shape and an average size of approximately 200 nm. The SEM micrographs of CNT-containing samples show most of the $Li_2S$ particles being directly connected with CNTs. Defects and non-uniformities within CNTs serve as nucleation sites for heterogenous precipitation of $Li_2S$. In this example, the diameter of the majority of the precipitated $Li_2S$ particles remains below 0.5 inn, although the size may be less uniform than that of the grains in porous $Li_2S$ and the particles are of a more random shape.

The Brunauer-Emmett-Teller (BET) specific surface area (SSA) of the electrode particles is an important parameter, determining their electrochemical properties.

Figure 4A:
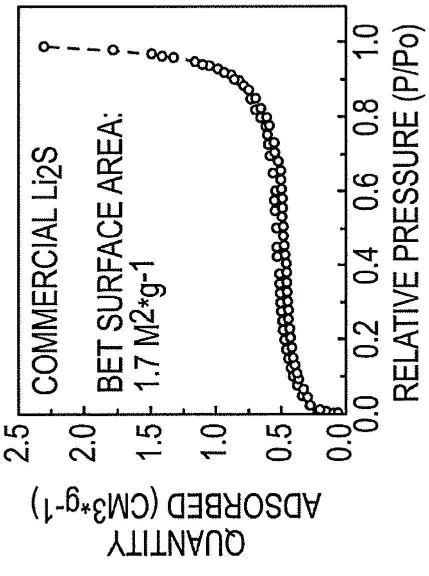
FIGS. 4A-4E illustrate example nitrogen sorption curves collected at 77K on various samples shown for illustration purposes.
Figure 4B:
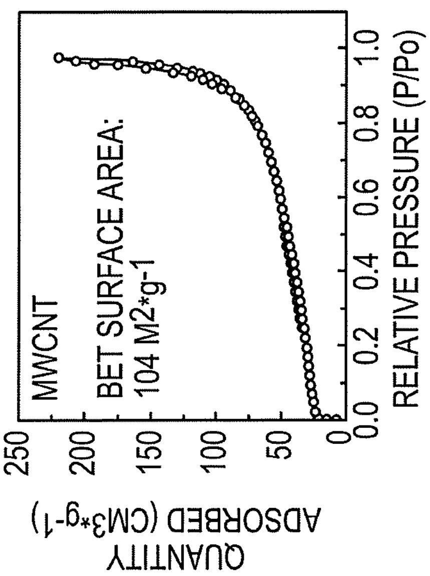
Figure 4C:
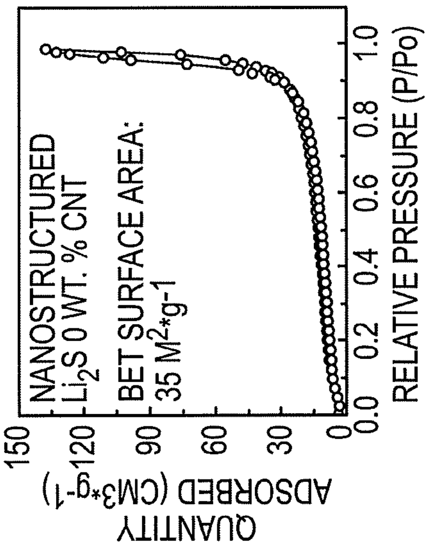
Figure 4D:
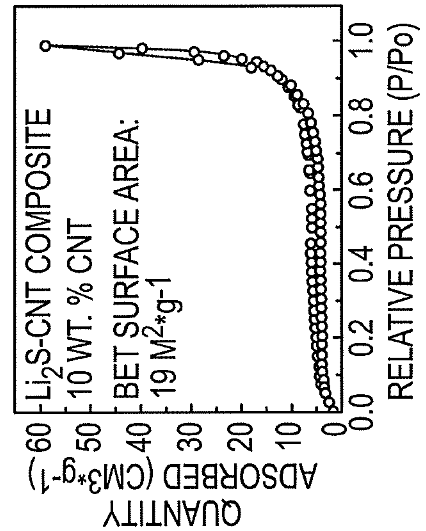
Figure 4E:
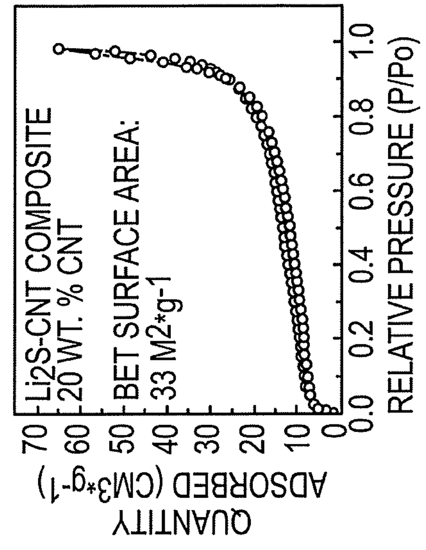

FIGS. 4A-4E illustrate example nitrogen sorption curves collected at 77K on various samples shown for illustration purposes. In particular, FIG. 4A illustrates a BET SSA of commercial $Li_2S$. FIG. 4B illustrates a BET SSA of MWCNT. FIG. 4C illustrates a BET SSA of nanostructured $Li_2S$ with 0 wt. % CNT. FIG. 4D illustrates a BET SSA of an $Li_2S$-CNT composite with 10 wt. % CNT. FIG. 4E illustrates a BET SSA of a $Li_2S$-CNT composite with 20 wt. % CNT.

In this example, the curves are of type II according to International Union of Pure and Applied Chemistry (IUPAC) classification, which is typical for samples having either no or a very small fraction of micropores (e.g., pores less than about 2 nm) and often composed of either macroporous adsorbents or nonporous particles. Analysis of the isotherms demonstrates that commercial $Li_2S$ powder exhibits approximately 1.7 $m^2/g$ of the BET SSA. By comparison, the nanoporous $Li_2S$ powder shows nearly a 20 times larger BET SSA. This corresponds to at least a 20 times shorter diffusion distance for Li ions, which may be beneficial for cathode performance at high current densities. The CNT-containing samples show a BET SSA in the range of about 20-30 $m^2/g$, which is consistent with an average $Li_2S$ particle size of approximately 100 nm. The relatively high BET SSA of the initial CNTs (approximately 100 $m^2/g$) may provide an additional 10-20 $m^2/g$ to the CNT-containing samples if the CNT outer surface is not blocked by the deposited $Li_2S$.

Figure 5A:
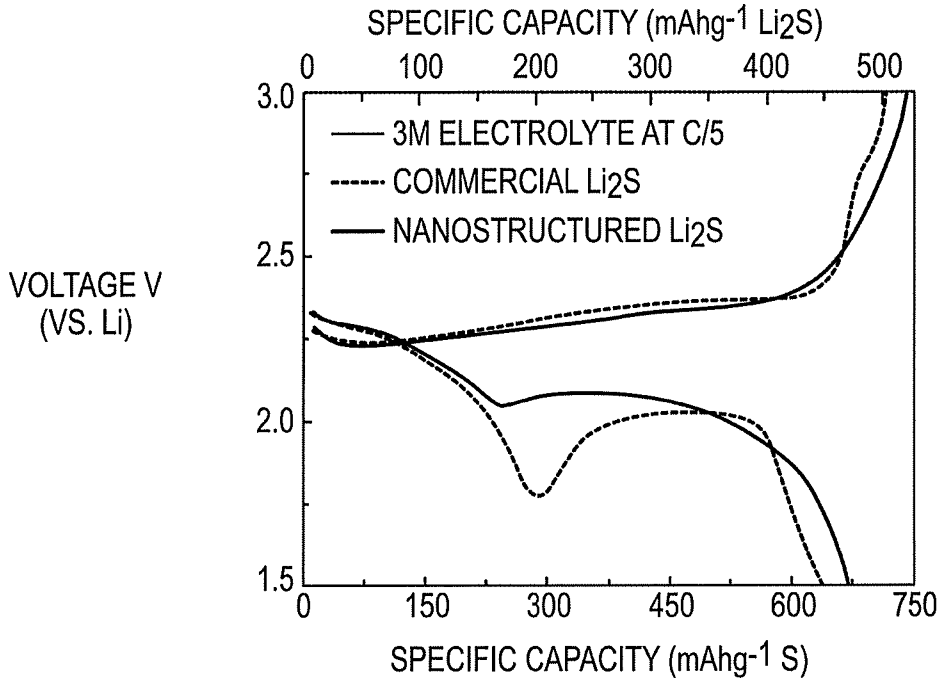
FIGS. 5A-5B illustrate example charge-discharge profiles of porous Li2S produced according to the above-described synthesis and that of commercial Li2S powder collected at relatively high current densities corresponding to the C/5 and C/2 rates.
Figure 5B:
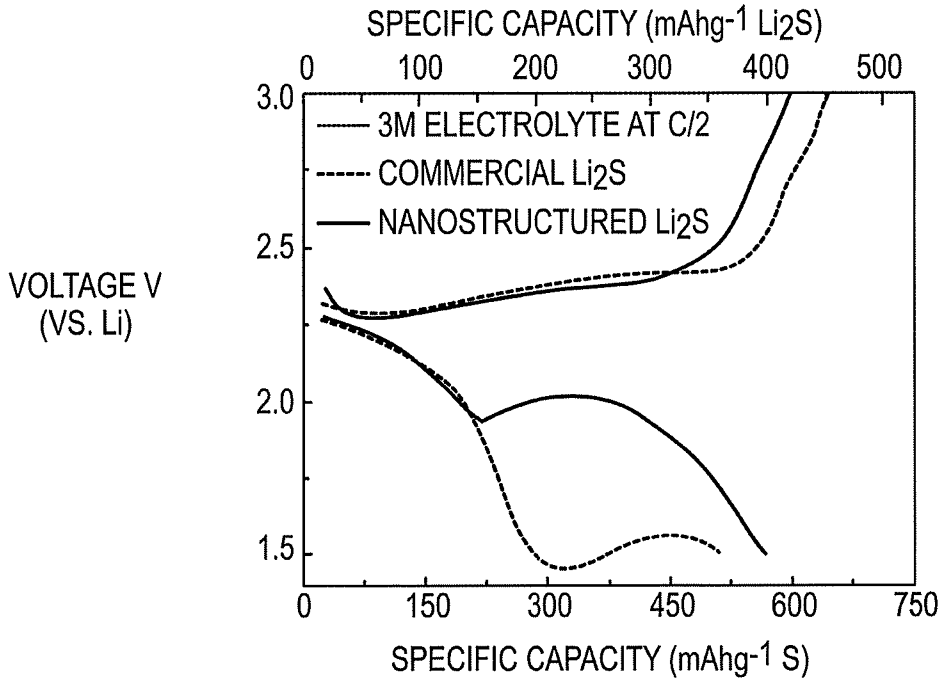

FIGS. 5A-5B illustrate example charge-discharge profiles of porous $Li_2S$ produced according to the above-described synthesis and that of commercial $Li_2S$ powder collected at relatively high current densities corresponding to the C/5 and C/2 rates. In particular, FIG. 5A illustrates profiles of commercial $Li_2S$ and nanostructured $Li_2S$ in a 3M electrolyte at a C/5 rate. FIG. 5B illustrates profiles of commercial $Li_2S$ and nanostructured $Li_2S$ in a 3M electrolyte at a C/2 rate.

The positive impact of the above-described reduction in average diffusion distance of Li ions becomes apparent when comparing the discharge profiles of these two samples. The polarization of the first plateau (from approximately 2.3 to 2 V vs. $Li/Li^+$ and corresponding to $S \rightarrow Li_xS$ transition to high order polysulfides) is similar in both samples, demonstrating relatively fast Li transport, believed to be due to pores remaining in the active material (S) after Li extraction from $Li_2S$. The second plateau at 2 V vs. $Li/Li^+$ corresponds to the conversion of the polysulfides to $Li_2S_2$. In this example, bis(triflouromethanesulfonyl)imide (LiTFSI) in distilled dimethoxyethane (DME):1,3-dioxane (DIOX) (1:1, v:v) is used as an electrolyte.

Figure 6B:
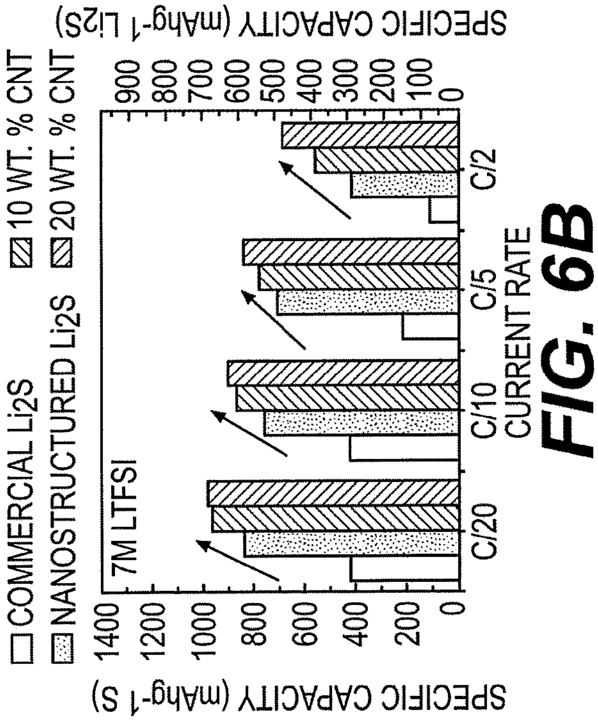
FIGS. 6A-6D illustrate electrochemical performance of example samples produced in accordance with the synthesis described above in two different electrolytes comprising different concentrations of an LiTFSI salt in a DME:DIOX mixture.
Figure 6A:
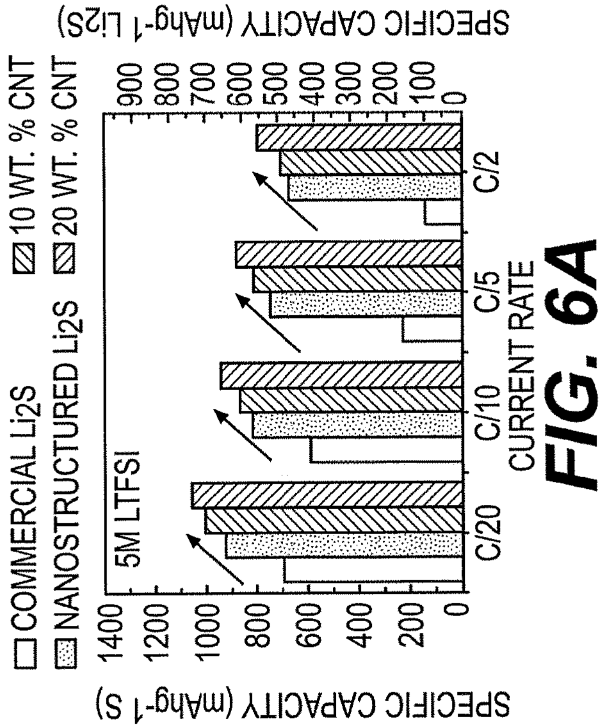
Figure 6D:
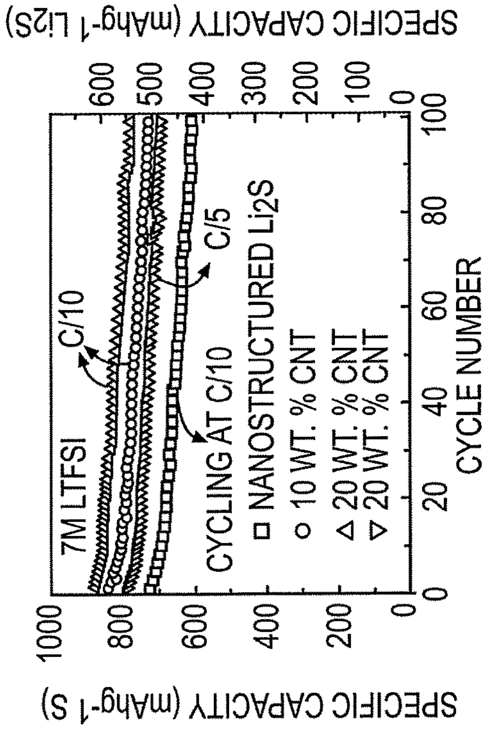
Figure 6C:
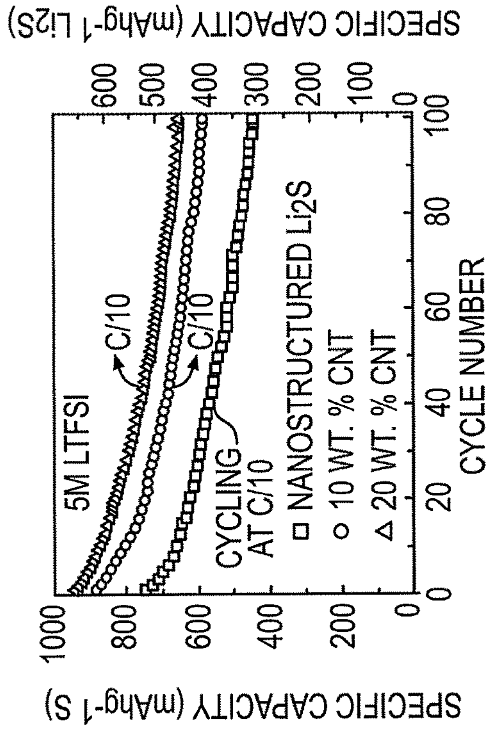
Figure 7A:
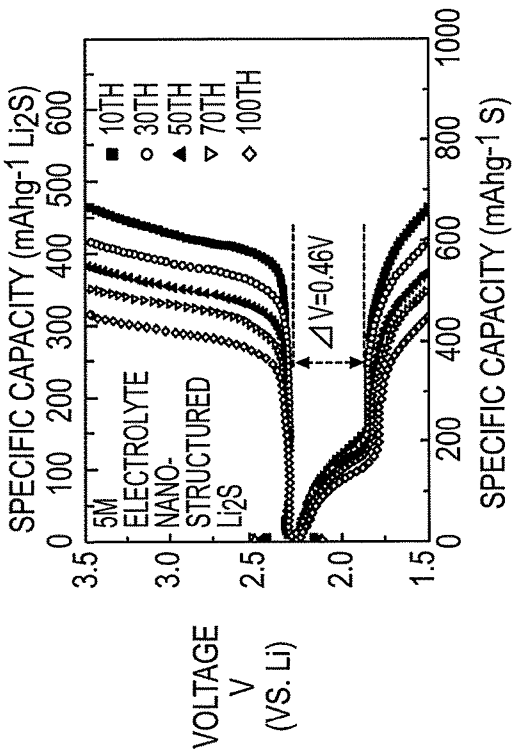
FIGS. 7A-7D illustrate the changes in charge-discharge profiles of Li2S/Li and Li2S-CNT/Li (20 wt. % CNT) cells with cycling in 5M (FIGS. 7A-7B) and 7M (FIGS. 7C-7D) electrolytes.
Figure 7B:
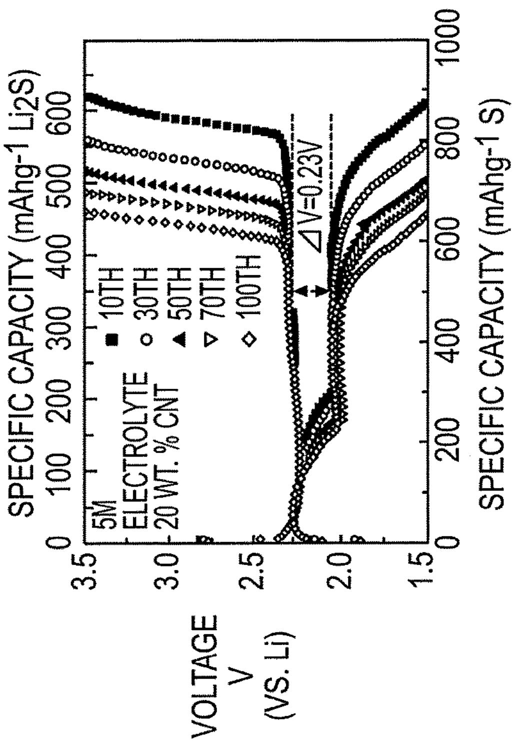
Figure 7C:
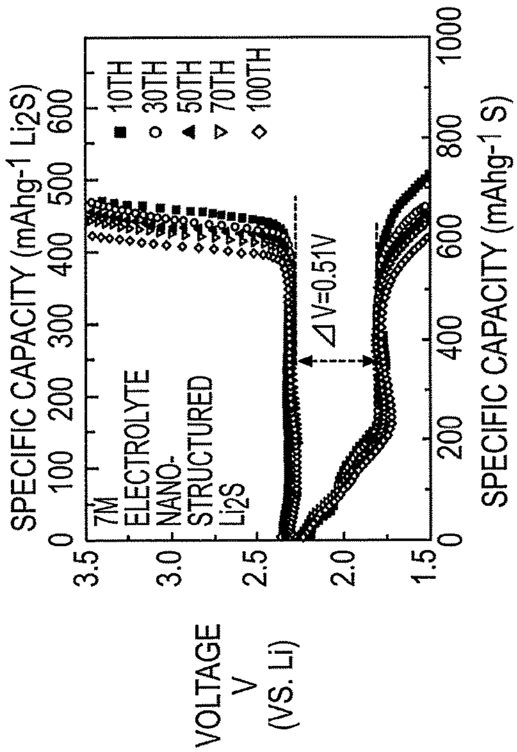
Figure 7D:
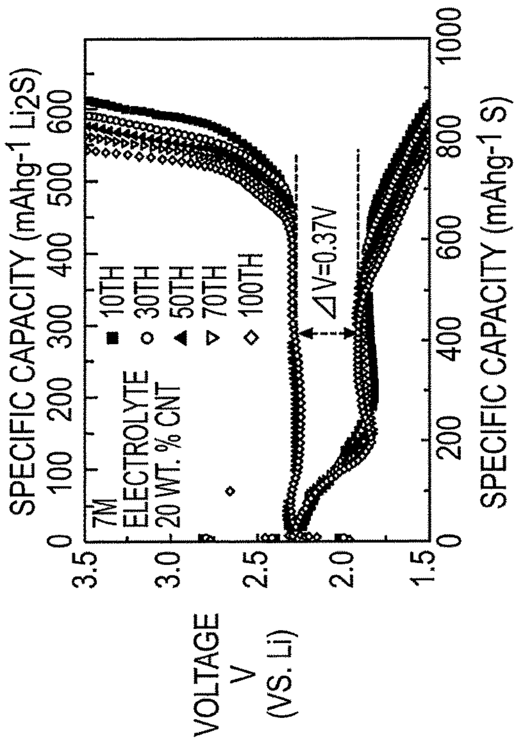

FIGS. 6A-6D illustrate electrochemical performance of example samples produced in accordance with the synthesis described above in two different electrolytes comprising different concentrations of an LiTFSI salt in a DME:DIOX mixture. In particular, FIGS. 6A-6B illustrate a comparison of the rate performance of commercial $Li_2S$, nanoporous $Li_2S$, and MWCNT-linked $Li_2S$. FIGS. 6A-6B illustrate a comparison of the cycling performance of commercial $Li_2S$, nanoporous $Li_2S$, and MWCNT-linked $Li_2S$ in 5M and 7M electrolytes at room temperature.

Formation of porous $Li_2S$ as well as increasing CNT content in the electrodes has been shown to improve the accessible capacity and the rate performance of the half cells. Even at a moderate charge-discharge rate of C/5, the specific capacity of the cathodes based on commercial $Li_2S$ is 2-3 times inferior to that of the rest of the samples. The nanosize $Li_2S$ particles linked together with 20 wt. % CNT shows the highest discharge capacities of up to approximately 1050 mAh/g (per mass of S) at the slowest rate of C/20. Similar (possibly slightly higher) stability of the CNT-containing cathodes is observed compared to nanoporous $Li_2S$. For example, as shown, the cathode containing 20 wt. % CNTs retains approximately 70% of the initial capacity after 100 cycles (vs. approximately 60% for porous $Li_2S$ cathodes) in a 5M electrolyte and approximately 90% of the initial capacity after 100 cycles (vs. approximately 85% for porous $Li_2S$) in a 7M electrolyte.

FIGS. 7A-7D illustrate the changes in charge-discharge profiles of $Li_2S/Li$ and $Li_2S$-CNT/Li (20 wt. % CNT) cells with cycling in 5M (FIGS. 7A-7B) and 7M (FIGS. 7C-7D) electrolytes. As shown, there is a reduced polarization in cells upon CNT incorporated into the electrode structure. For example, the use of 20 wt. % CNT reduces the voltage hysteresis from about 0.46 V to about 0.23 V in a 5M electrolyte and from about 0.51 V to about 0.37 V in a 7M electrolyte.

Figure 8A:
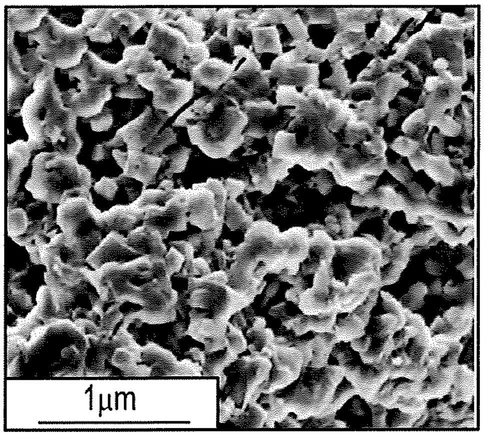
FIGS. 8A-8F illustrate other examples of Li2S and Li2S-graphene composite samples produced by precipitation.
Figure 8B:
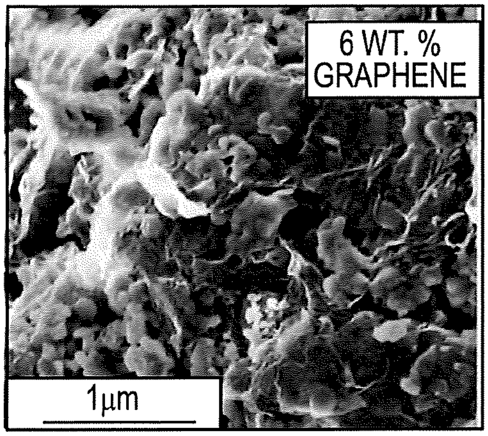
Figure 8C:
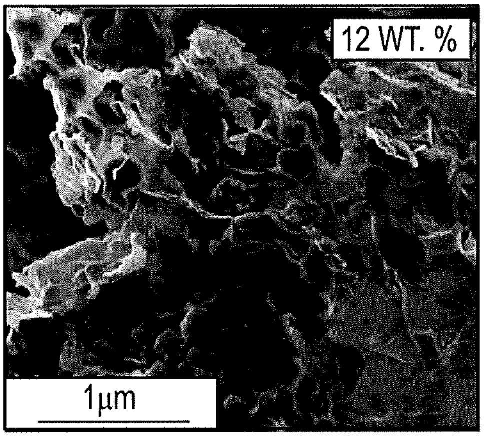
Figure 8D:
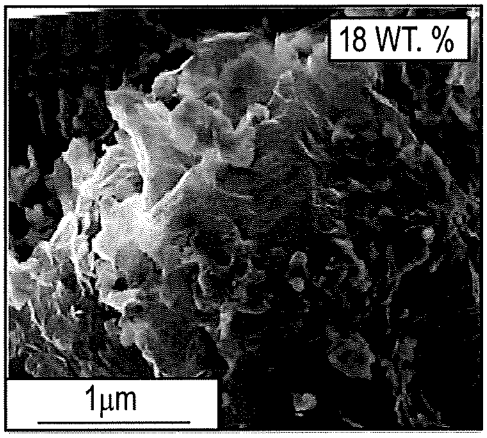
Figure 8E:
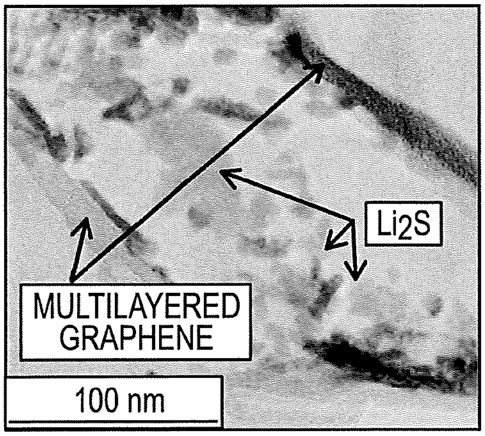
Figure 8F:
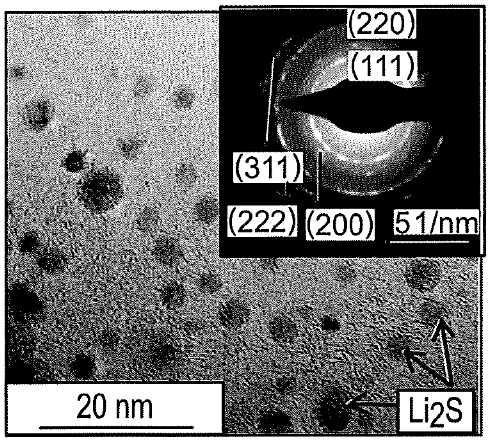

FIGS. 8A-8F illustrate other examples of $Li_2S$ and $Li_2S$-graphene composite samples produced by precipitation. In particular, FIG. 8A illustrates an SEM micrograph of pure $Li_2S$. FIG. 8B illustrates an SEM micrograph of an $Li_2S$-graphene composite with 6 wt. % graphene. FIG. 8C illustrates an SEM micrograph of an $Li_2S$-graphene composite with 12 wt. % graphene. FIG. 8D illustrates an SEM micrograph of an $Li_2S$-graphene composite with 18 wt. % graphene. FIGS. 8E-8F illustrate TEM micrographs showing small $Li_2S$ nanoparticles of different shape on a graphene surface. The inset in FIG. 8F shows a Selected Area Electron Diffraction (SAED) image with diffraction peaks corresponding to different crystallographic planes of $Li_2S$ nanoparticles.

In this example, graphene powder was first synthesized by reducing graphene oxide powder. To prepare graphene-$Li_2S$ composites, commercial $Li_2S$ powder was dissolved in anhydrous ethanol to 0.5 M and graphene powder was added during continuous mixing of the suspension. No gas evolution was observed. To further improve uniformity of the suspension, it was exposed to an ultrasonic bath treatment for 1 hour. A simple solvent evaporation method was selected in order to extract ethanol and produce nanostructured $Li_2S$-graphene composites. The nanoparticles of $Li_2S$ precipitated heterogeneously on the defective graphene surface. As a further preparation step, the samples were annealed at 400° C. under Ar. Pure $Li_2S$ samples were prepared under the same conditions, but without graphene addition.

In some designs, it may be advantageous to deposit a substantially continuous coating layer or “shell” on the surface of the above-described nanoporous $Li_2S$ or carbon-$Li_2S$ composites, or composites composed of $Li_2S$ and other functional additives (such as metals, ceramics, or polymers). Such a coating layer may prevent or otherwise reduce the dissolution of $Li_2S$ during Li extraction. In addition, it may enhance the mechanical stability of the $Li_2S$-comprising particles. In some cases, when the coating exhibits a high electrical conductivity, formation of such a coating may enhance the electrical conductivity of the $Li_2S$-comprising particles.

In some designs, it may be advantageous for such a coating layer to comprise carbon. In some designs, it may be preferable to deposit a carbon layer in such a way that it does not induce significant additional agglomeration (or linkage) between the $Li_2S$ nanoparticles, nanoporous $Li_2S$, or $Li_2S$-comprising composites. This is because breakage of the agglomerates during electrode preparation may induce damages within the carbon coating layer. To this end, a carbon coating may be produced in several steps. First, a polymer coating may be produced on the surface of $Li_2S$ nanoparticles, nanoporous $Li_2S$, or $Li_2S$-comprising composites. Subsequently, a polymer layer may be carbonized to produce porous carbon. Carbon may then be deposited into the carbon pores (and on the porous carbon surface) by using a gas phase carbon deposition technique, such as chemical vapor deposition of the carbon from hydrocarbon precursors. Examples of suitable hydrocarbon precursors include but are not limited to acetylene, propylene, methane, and many other hydrocarbons.

In some designs, a protective polymer coating may be produced on the surface of active particles (such as $Li_2S$ particles, nanoporous $Li_2S$, or $Li_2S$-comprising composites in the preceding example, or other active ion-storing particles, such as other conversation-type electrodes and intercalation-type electrodes that require protection against direct interaction with liquid electrolyte) using a process of chemical vapor deposition (CVD). In some designs, the polymer CVD precursors may comprise monomers and initiators. In some designs, the CVD deposited polymer coatings may be further carbonized in order to induce formation of carbon coatings. The advantages of polymer CVD include a high degree of coating uniformity, the ability to deposit a surface coating layer from monomers that exhibit different properties in solution (e.g., produce co-polymers from the hydrophilic and hydrophobic polymers) and the ability to prevent the use of a solvent (which could be expensive, difficult to remove, or which may have unfavorable interactions with the particles on which the polymer coating is to be deposited), which increases flexibility to design improved composite particles.

In some designs, carbon deposition from the vapor phase may not necessarily induce undesirable agglomeration. Or, even if such agglomeration does take place, may not necessarily lead to damaging the coating during de-agglomeration. For example, if $Li_2S$ is deposited on the surface of some carbon additives or infiltrated inside the pores of another material (e.g., a porous carbon material or porous active material), the direct deposition of carbon from the gas phase on the surface of such materials may be sufficient to produce stable carbon-coated $Li_2S$-comprising composite particles. If some of the shells become damaged during electrode preparation, $Li_2S$ in the core may be dissolved (e.g., in ethanol) prior to using carbon-coated $Li_2S$-comprising composite particles in the battery electrodes.

Figure 9:
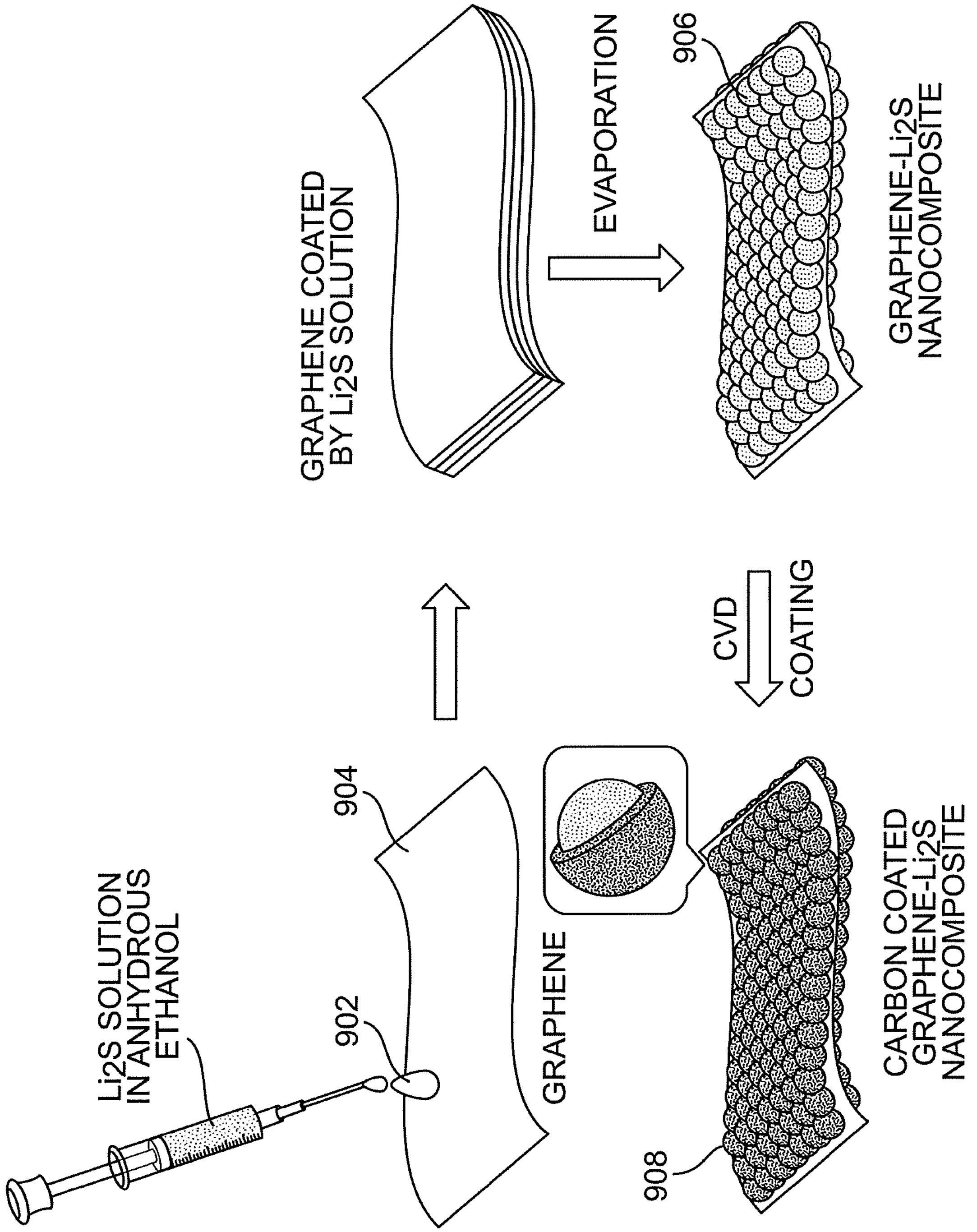
FIG. 9 is a graphical flow diagram illustrating an example of a suitable fabrication method for the formation of a carbon shell coated composite.

FIG. 9 is a graphical flow diagram illustrating an example of a suitable fabrication method for the formation of a carbon shell coated composite. In this example, an $Li_2S$ solution 902 in anhydrous ethanol is used to coat a graphene layer 904. The coated graphene is then subjected to evaporation to produce an $Li_2S$ nanoparticle 906 and resultant graphene $Li_2$ nanocomposite. The graphene $Li_2$ nanocomposite may then be coated (e.g., via CVD) to produce carbon-coated $Li_2S$ nanoparticles 908 and a resultant carbon-coated graphene-$Li_2S$ nanocomposite.

Figure 10A:
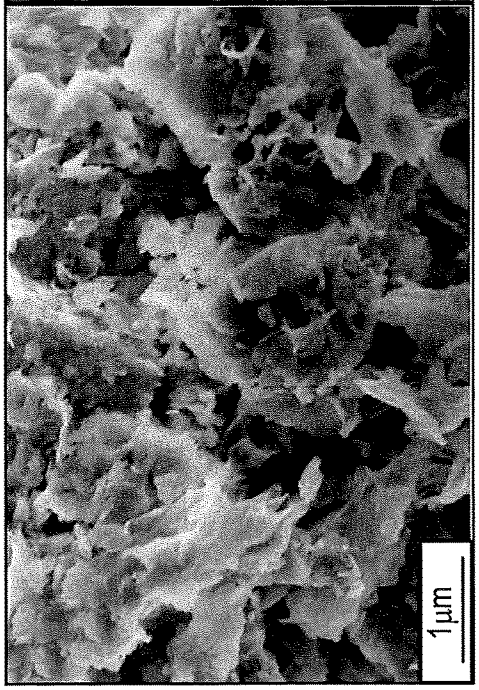
FIGS. 10A-10D illustrate selected characterizations of example materials produced according to the process of FIG. 9.
Figure 10B:
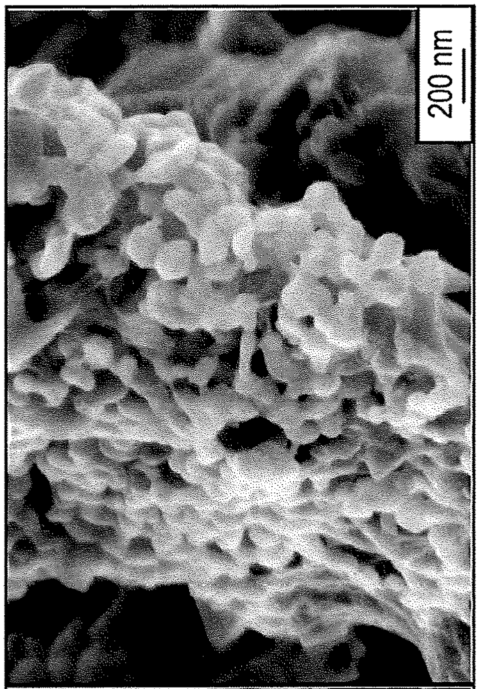
Figure 10C:
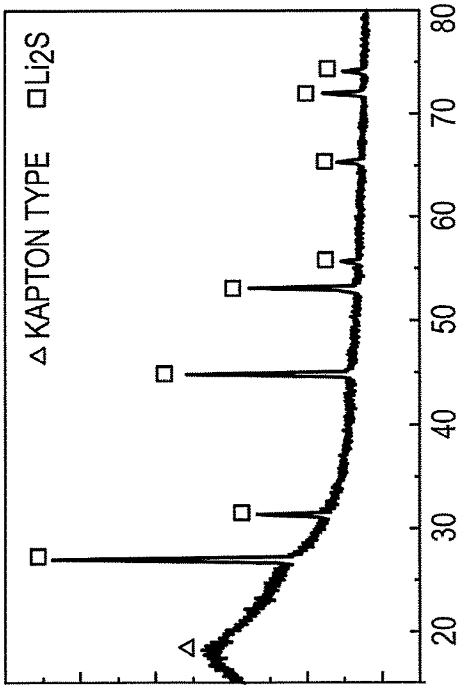
Figure 10D:
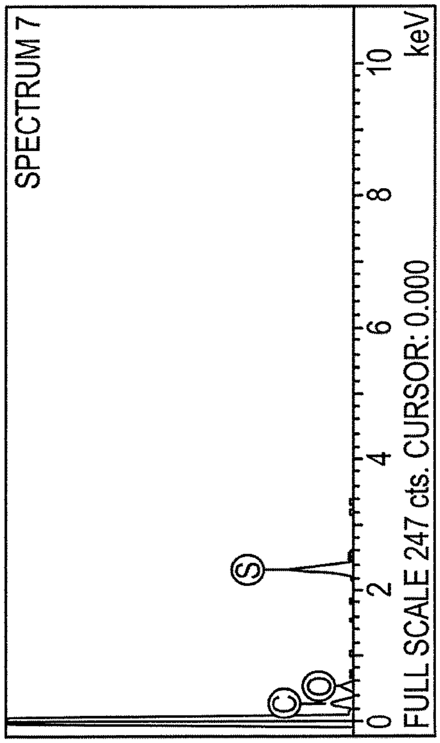

FIGS. 10A-10D illustrate selected characterizations of example materials produced according to the process of FIG. 9. Specifically, electron microscopy is shown for a produced graphene/$Li_2S$ composite nanopowder before CVD (FIG. 10A) and after CVD (FIG. 10B), where carbon-coated $Li_2S$ nanopowder deposited on the surface of a graphite flake (multi-walled graphene) is visible. Also shown is an X-ray diffraction pattern of the produced carbon-coated graphene/$Li_2S$ composite nanopowder (FIG. 10C), showing the presence of pure $Li_2S$, and an Energy Dispersive Spectroscopy (EDS) spectrum recorded on the carbon-coated graphene/$Li_2S$ composite nanopowder (FIG. 10D).

Figures 11A, 11B, 11C, 11D:
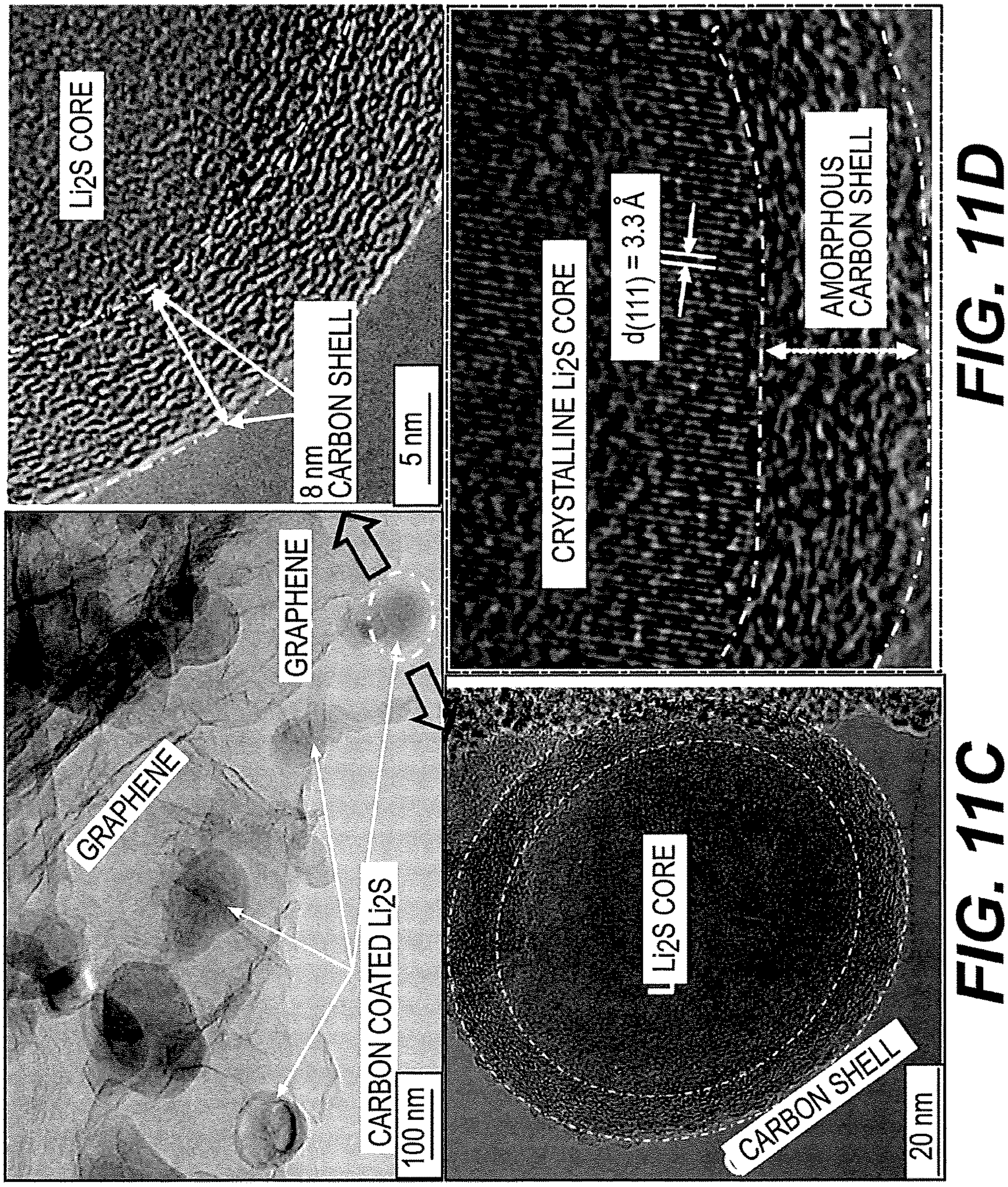
FIGS. 11A-11D illustrate additional characterizations of example materials produced according to the process of FIG. 9 using Transmission Electron Microscopy (TEM).

FIGS. 11A-11D illustrate additional characterizations of example materials produced according to the process of FIG. 9 using Transmission Electron Microscopy (TEM). In particular, FIG. 11A shows individual carbon-coated $Li_2S$ particles on the surface of graphene. FIGS. 11B-11D show high resolution images of the carbon coating.

Figure 12A:
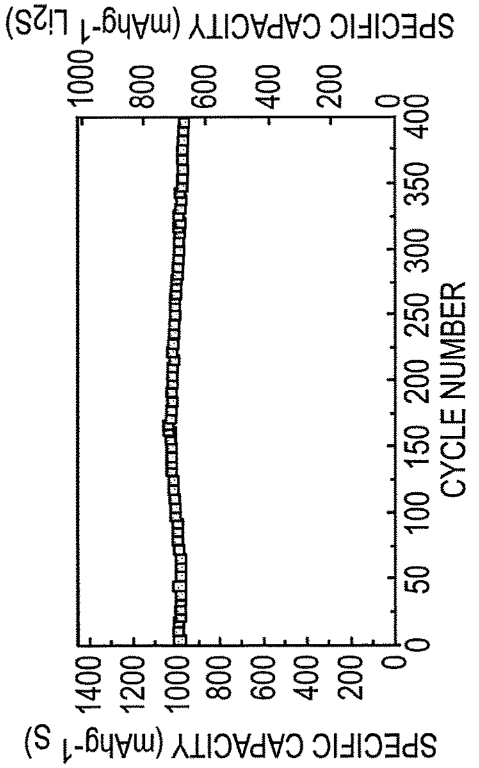
FIGS. 12A-12D illustrate electrochemical characterizations of example carbon-coated Li2S-graphene composite materials produced according to the process of FIG. 9 in Li half cells.
Figure 12B:
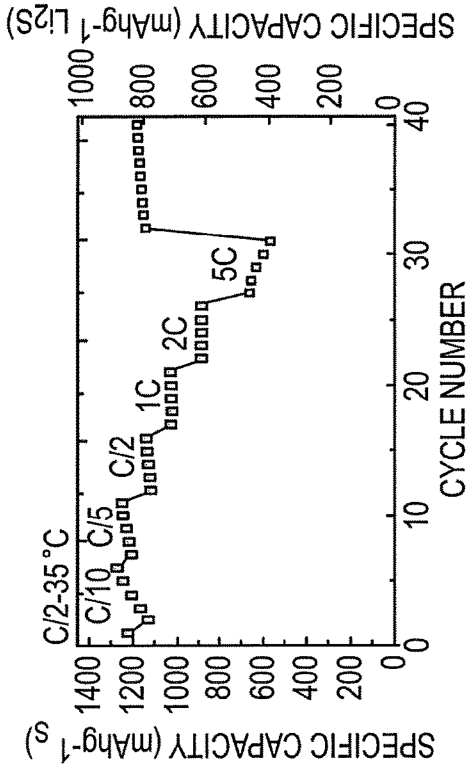
Figure 12C:
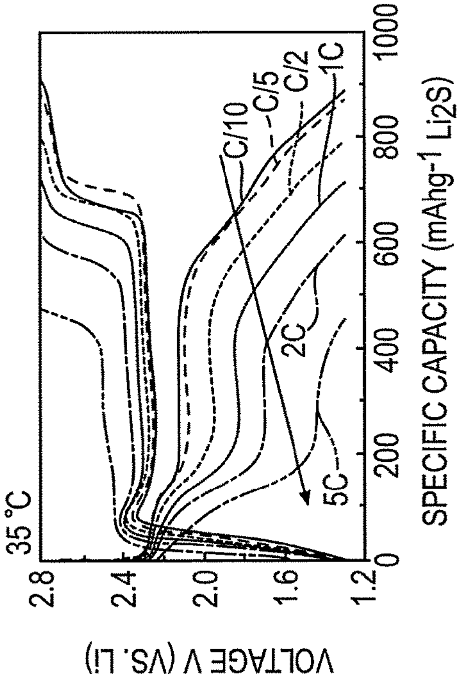
Figure 12D:
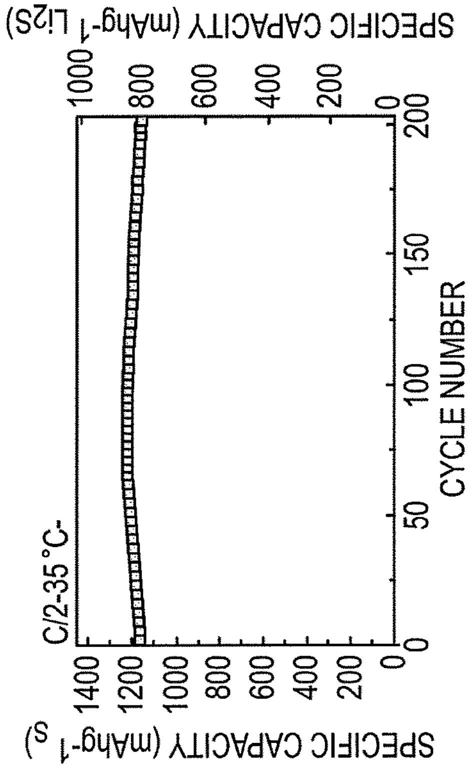

FIGS. 12A-12D illustrates electrochemical characterizations of example carbon-coated $Li_2S$-graphene composite materials produced according to the process of FIG. 9 in Li half cells. In particular, FIG. 12A illustrates cycling performance of at C/2 rate at room temperature. FIG. 12B illustrates discharge capacity at different C-rates at 35° C. FIG. 12C illustrates voltage profiles at different C-rates at 35° C. FIG. 12D illustrates cycling performance at a C/2 rate at 35° C. LiI was used in these tests as an electrolyte additive. Exceptional stability and rate performance are visible.

Incorporating $Li_2S$ nanoparticles within a dense, solid and electrically conductive carbon matrix may offer particularly attractive properties, such as high stability when used in batteries, high mechanical stability, high density and high conductivity. However, low-cost formation of such composites is challenging, particular if the size of $Li_2S$ is only within 2-100 nm. Example methods of composite formation may involve (i) synthesis of small, stable and preferably uniform $Li_2S$ nanoparticles, and (ii) either dispersing them within a solvent-compatible carbon precursor solution or depositing carbon on their surface via hydrocarbon decomposition. However, the low-cost solvents commonly utilized for organic carbon precursors either dissolve or react with $Li_2S$. Furthermore, uniform dispersion of tiny $Li_2S$ nanoparticles, which have a natural tendency to agglomerate, is challenging.

In some embodiments, it has been found advantageous to harness the unique combination of (i) the high solubility of both $Li_2S$ and many polymers in suitable solvents (e.g., in ethanol), (ii) the steric separation of freshly nucleated $Li_2S$ nanoparticles in the presence of a polymer, (iii) the bottom-up self-assembly of polymer-coated nanoparticles into larger granules, and (iv) the high thermal stability of $Li_2S$ to prepare dense C—$Li_2S$ composite nanoparticles. The inventors have found that in-situ formation of polymer coatings around freshly precipitated $Li_2S$ nanoparticles may efficiently prevent their agglomeration and growth by steric interactions. The inventors have further found that annealing of polymer-$Li_2S$ composites at elevated temperatures results in the formation of C—$Li_2S$ composites without significant side reactions, which may otherwise release toxic $CS_2$, $H_2S$, and other S-containing gases, and induce undesirable formation of various Li compounds (such as $Li_2CO_3$ or LiOH). The C—$Li_2S$ nanopowder cathodes produced by the solution-based methods described herein have been shown to provide remarkable performance characteristics and stable performance in half cells with a Li foil counter collector.

Figure 13:
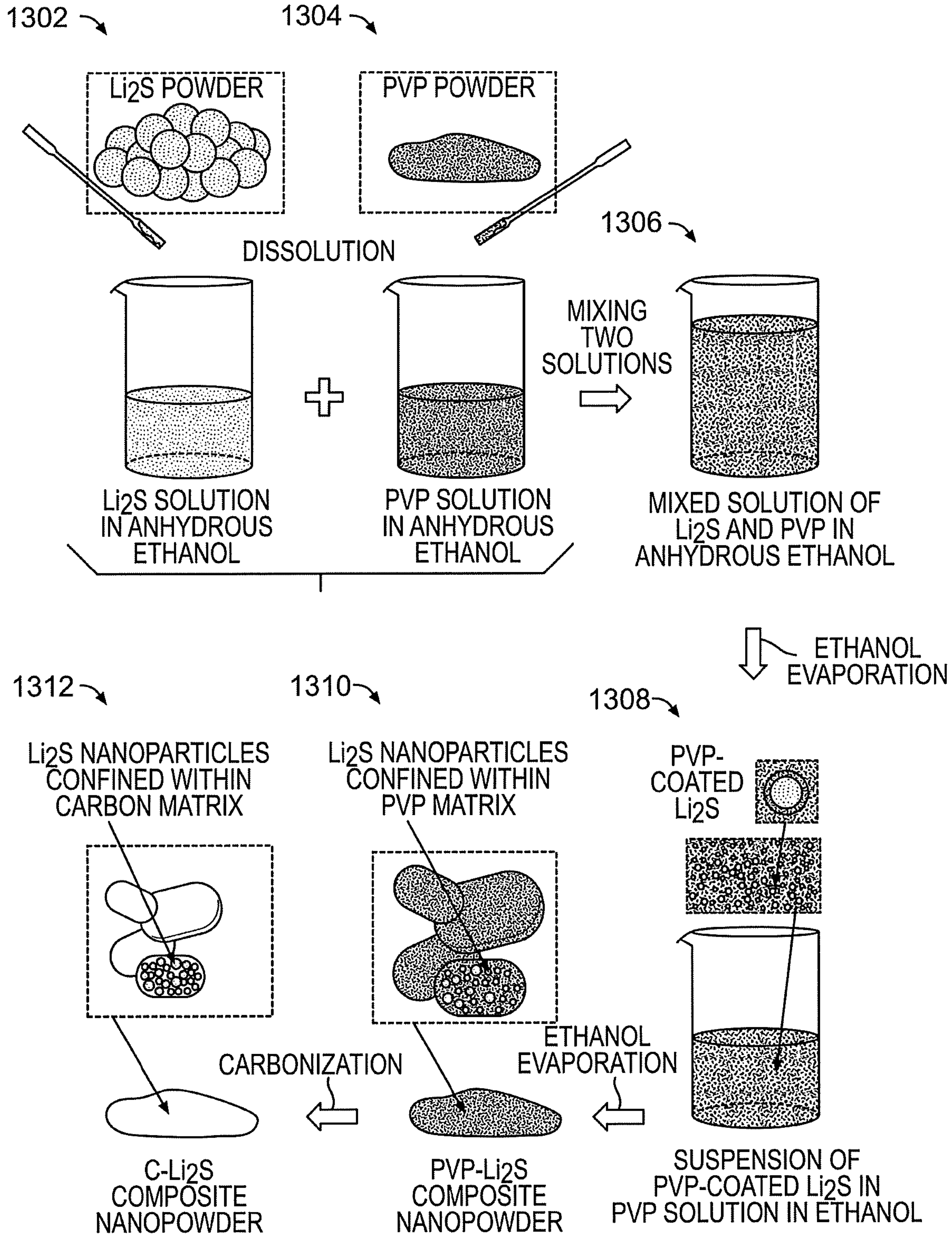
FIG. 13 is a graphical flow diagram illustrating an example process for the formation of C—$Li_2S$ powder via an example ultrafast and scalable bottom-up synthesis route of the type described above.

FIG. 13 is a graphical flow diagram illustrating an example process for the formation of C—$Li_2S$ powder via an example ultrafast and scalable bottom-up synthesis route of the type described above. In this example, commercial $Li_2S$ powder (block 1302) and a polymer (block 1304) are first dissolved in anhydrous ethanol. The polymer should ideally be polar and soluble in the same solvent (in this case—in ethanol). Ethanol-soluble polyvinylpyrrolidone (PVP) may be selected as a carbon precursor polymer in this example due to its affinity to $Li_2S$. Next, both $Li_2S$/ethanol and PVP/ethanol solutions may be combined together (block 1306) to obtain a uniformly mixed solution. Extraction of ethanol from the solution and co-precipitation of $Li_2S$ may be achieved in several routes, such as a simple evaporation. During evaporation of ethanol, nanoparticles of $Li_2S$ precipitate first because it may be desirable to select a polymer with higher solubility in the solvent (the solubility of PVP in ethanol, for example, is higher than that of $Li_2S$, which makes PVP suitable for this process). However, due to the strong affinity between the polar precipitates and high polarity >C═O functional groups of PVP, the $Li_2S$ nanoparticles become simultaneously coated by this polymer, which prevents the undesirable growth of individual $Li_2S$ particles by a steric separation mechanism (block 1308). At the same time, self-assembly of PVP-coated $Li_2S$ nanoparticles induces formation of larger PVP—$Li_2S$ composite nanoparticles (block 1310). The last step involves carbonization of PVP (in this particular example, at 700° C. under Ar) and the formation of C—$Li_2S$ composite nanoparticles (block 1312). A higher processing temperature may lead to the undesirable growth of $Li_2S$ grains. The mass ratio between $Li_2S$ and a polymer (such as PVP) may vary, depending on the desired ratio of $Li_2S$ to C in the composite. Suitable values range from 20:1 to 1:10. In one example, a 1:1 PVP:$Li_2S$ mass ratio was used.

Figure 14A:
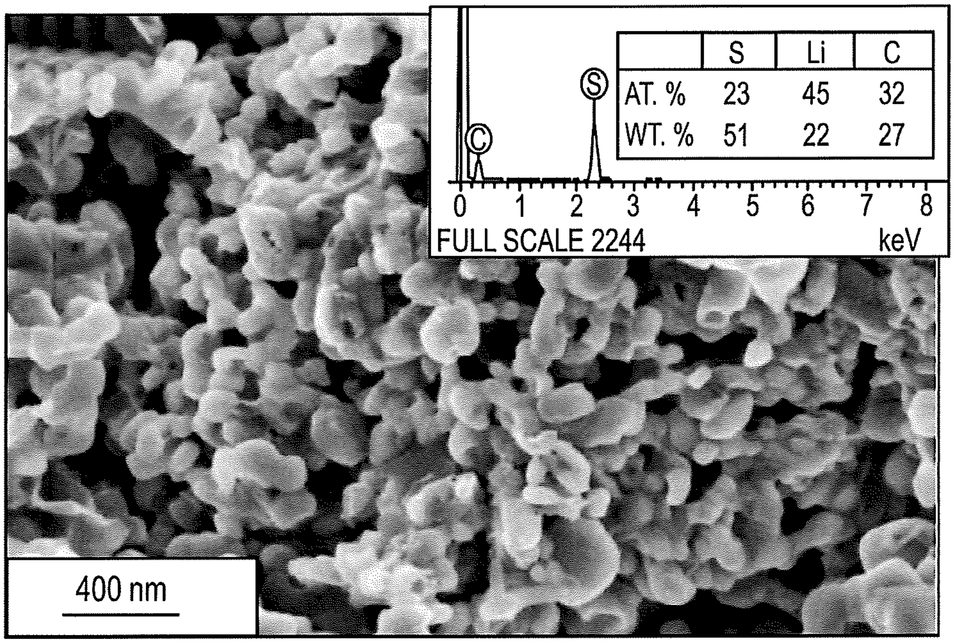
FIGS. 14A-14B illustrate results of electron microscopy characterization of example composite samples produced according to the process of FIG. 13.
Figure 14B:
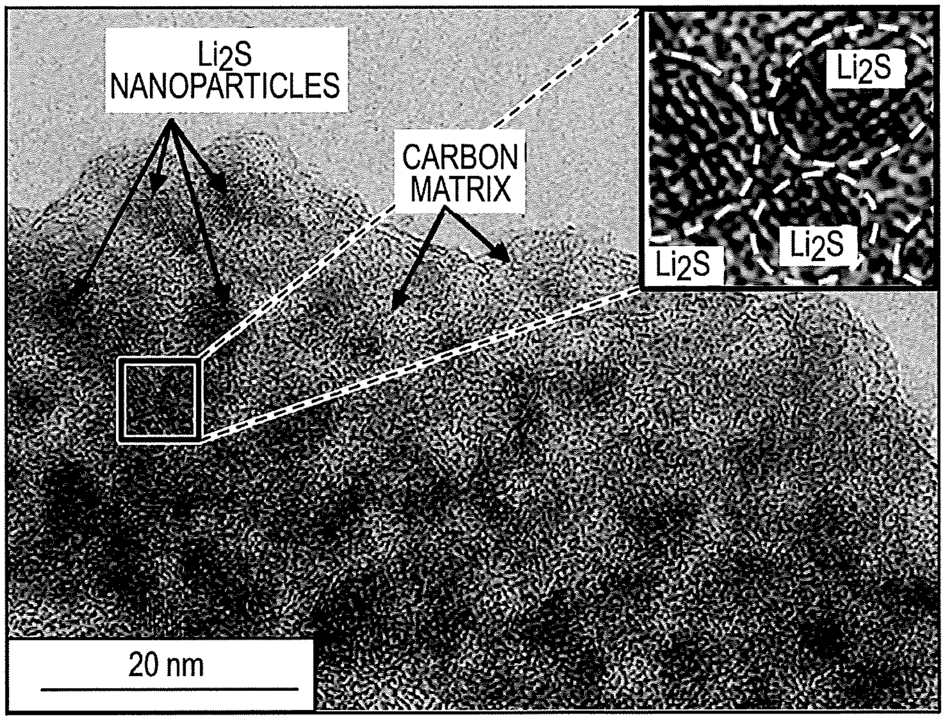

FIGS. 14A-14B illustrate results of electron microscopy characterization of example composite samples produced according to the process of FIG. 13. In particular, FIG. 14A illustrates an SEM micrograph of the produced C—$Li_2S$ composite nanopowder, showing composite particles of 100-400 nm in diameter. FIG. 14B illustrates a TEM micrograph of the produced C—$Li_2S$ composite nanopowder, showing smaller 5-20 nm individual $Li_2S$ nanoparticles within an amorphous carbon matrix. The inset in FIG. 14A shows an example of the EDS analysis of the sample. The atomic fraction of Li is estimated assuming Li:S=2:1 stoichiometry In more detail, the SEM micrograph shows a typical shape and size of the produced nanoparticles with the characteristic dimensions in the range of 100-400 nm. The EDS analysis demonstrates that the weight fraction of C is approximately 27 wt. %. Since Li was not detected by EDS, in the atomic and weight fraction of Li, S and C elements were estimated assuming an atomic ratio of Li:S to be 2:1, as also determined from XRD studies. The TEM studies were used to reveal the distribution of $Li_2S$ within these composite nanoparticles and show the microstructure of carbon produced from the PVP precursor. The size of $Li_2S$ was found to be relatively broad, but with most particles being small, in the range from about 5 to about 20 nm. The introduction of a polar carbonizable polymer (such as PVP) into $Li_2S$ solution facilitated keeping the $Li_2S$ particle size small. Their distribution within the carbon matrix was uniform.

Figure 15:
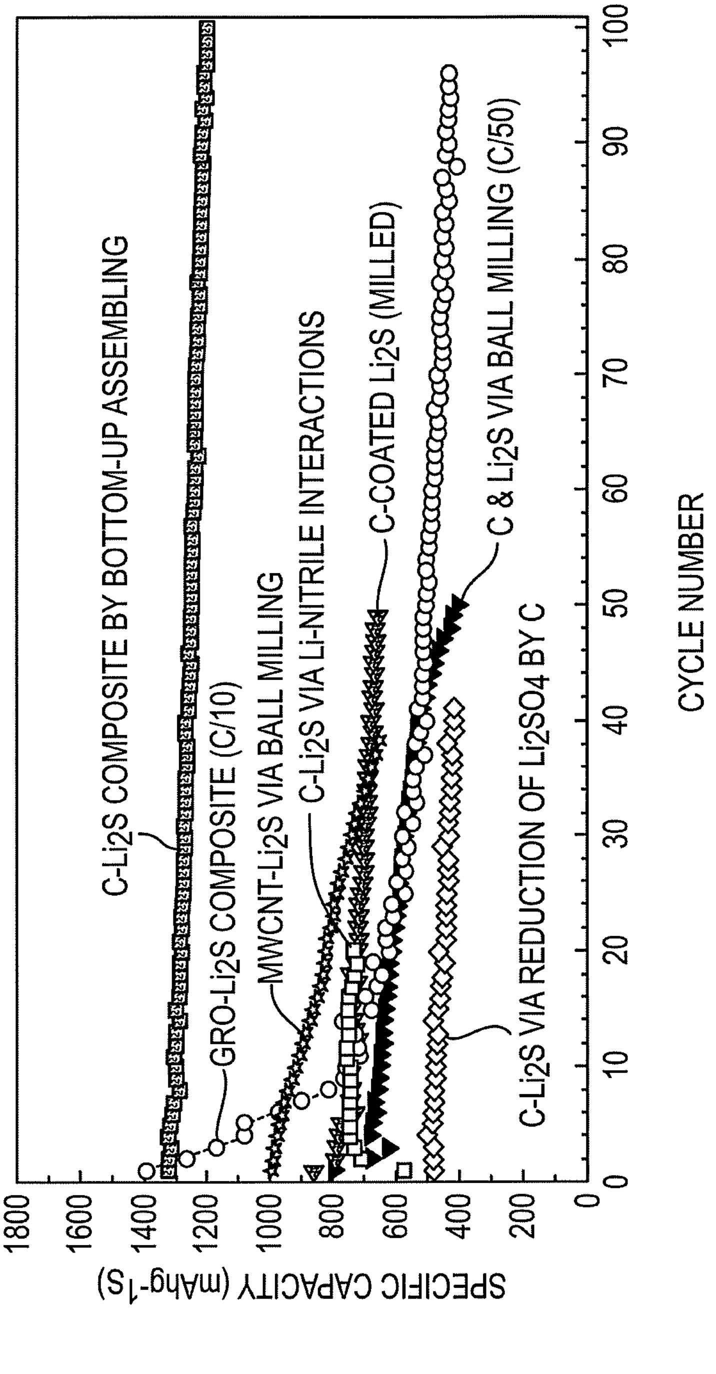
FIG. 15 illustrates the cycling performance of an example composite C—Li2S electrode produced according to the process of FIG. 13 and compared with other relevant samples.

FIG. 15 illustrates the cycling performance of an example composite C—$Li_2S$ electrode produced according to the process of FIG. 13 and compared with other relevant samples. For this electrochemical characterization, a C/5 rate was selected in accordance with other studies that utilize this rate in cycle stability tests. Capacity utilization in the produced composites at this rate is unprecedented. Excellent capacity retention was also observed in the C—$Li_2S$ composite nanoparticle electrode, which showed a discharge capacity of over 1200 $mAhg^{-1}$ (per mass of S) after 100 cycles. Such performance originates from the good dispersion of $Li_2S$ within the C matrix, good mechanical stability of electrodes, and suppressed polysulfide dissolution by the C.

Another aspect of the present invention addresses the need to further improve stability of $Li_2S$ (and, in fact, many other conversion-type electrodes for various batteries) by using a hierarchical architecture of the protective shells (protective coatings). In this approach, the shell-protected (coated) composite particles comprise an assembly of smaller particles, each having their own protective shells. In some cases, it may be advantageous to have multiple levels of hierarchy. For example, having the smaller particles also comprised of the assembly of even smaller particles, etc. In this approach, if the protective coating on the smaller particles fails due to the mechanical stresses accompanying charge-discharge (or, in one example, Li extraction or Li insertion), then the particles still have additional protective shell(s) to prevent (or reduce, e.g., by at least twice) undesirable interaction(s) of active material (e.g. $Li_2S$) with electrolyte. In addition, the use of hierarchical particles allows one to minimize stresses on the outer shell by accommodating some of the strain inside the composite. It may be advantageous to have the space between the individual smaller particles of the hierarchical composite filled with an ionically conductive material. If such a material is active (capable of reversibly storing Li ions), this may also be advantageous as it will increase the capacity of the hierarchical composite. If such a material is electrically conductive, this may also be advantageous since it will improve electrical conductivity of the hierarchical composite particles. If such a material possesses some elasticity (at least 1% maximum expansion), this may also be advantageous since it will help to release some of the stresses within the core during charge or discharge of the hierarchical particles.

Figure 16C:
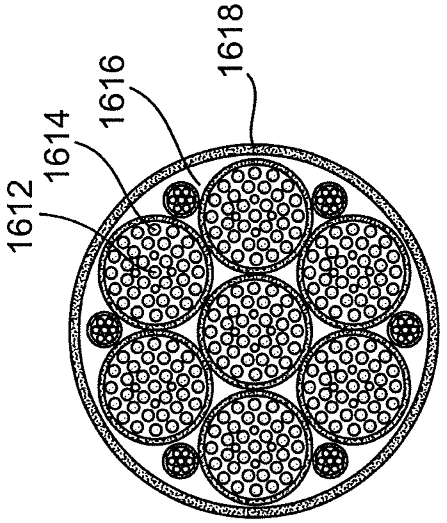
FIGS. 16A-16C provide an example illustration of hierarchical particle shelling for enhanced mechanical stability of volume-changing active materials, such as Li2S.
Figure 16B:
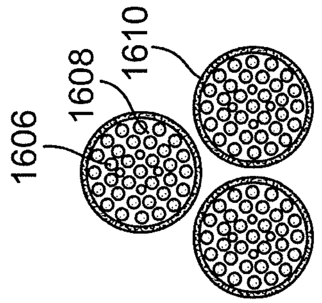
Figure 16A:
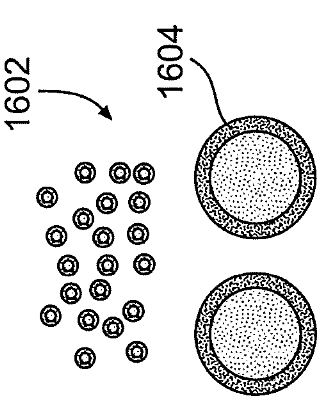

FIGS. 16A-16C provide an example illustration of hierarchical particle shelling for enhanced mechanical stability of volume-changing active materials, such as $Li_2S$. Particles exhibiting three levels of enclosing hierarchy are shown, including zero (small and medium size particles) (FIG. 16A), one (FIG. 16B), and two levels (FIG. 16C).

In this example, both primary and secondary particles are shown to be near spherical for simplicity and illustration purposes. The shape of the particles (on various levels of hierarchy) may be irregular, flake-shaped, cylindrical, fiber-like, or other shapes. In addition, $Li_2S$ particles are shown for illustration purposes, but other particles (e.g., Si, Sn, and various other conversion-type anodes for Li-ion batteries; various conversion-type cathodes for Li and Li-ion batteries, such as metal fluorides (e.g., copper fluoride, iron fluoride, etc.), metal bromides, iodides, their mixtures, etc.; and many other types of particles used in batteries, where direct interactions between electrolyte and active material is undesirable) may similarly benefit from the illustrated hierarchical shell design as it provides improved strength and stability.

In more detail, FIGS. 16A-16C show three levels of hierarchy: zero-level, corresponding to "regular" particles 1602 with a coating 1604 (FIG. 16A); first-level, corresponding to multiple particles 1606 incorporated within a protective matrix 1608 and further coated with an external shell 1610 (FIG. 16B); and second-level, corresponding to shell-coated composite particles 1612, in turn, composed of multiple particles 1614 incorporated within a protective matrix 1616 and further coated with an external shell 1618 (FIG. 16C). Again, however, higher levels of hierarchy are also contemplated.

In some designs, the shape of the particles at different hierarchical levels may be different. For example, the overall shape of a composite particle may be near spherical, while the shape of the primary particles may be flake-like. In another example, the overall shape of the composite particle may be flake-like, but the elementary particles may be spherical. In some examples, it may also be beneficial for particles with a hierarchical protective shell/coating structure to additionally comprise other functional additives, as described above. Such additives may provide enhanced conductivity (e.g., various carbon additives, such as graphene, carbon blacks, and other conductive carbon additives) or provide other benefits, such as improved stability (e.g., by having a stronger affinity with volume changing particles, such as $Li_2S$ and exhibiting small volume changes themselves).

Figure 17:
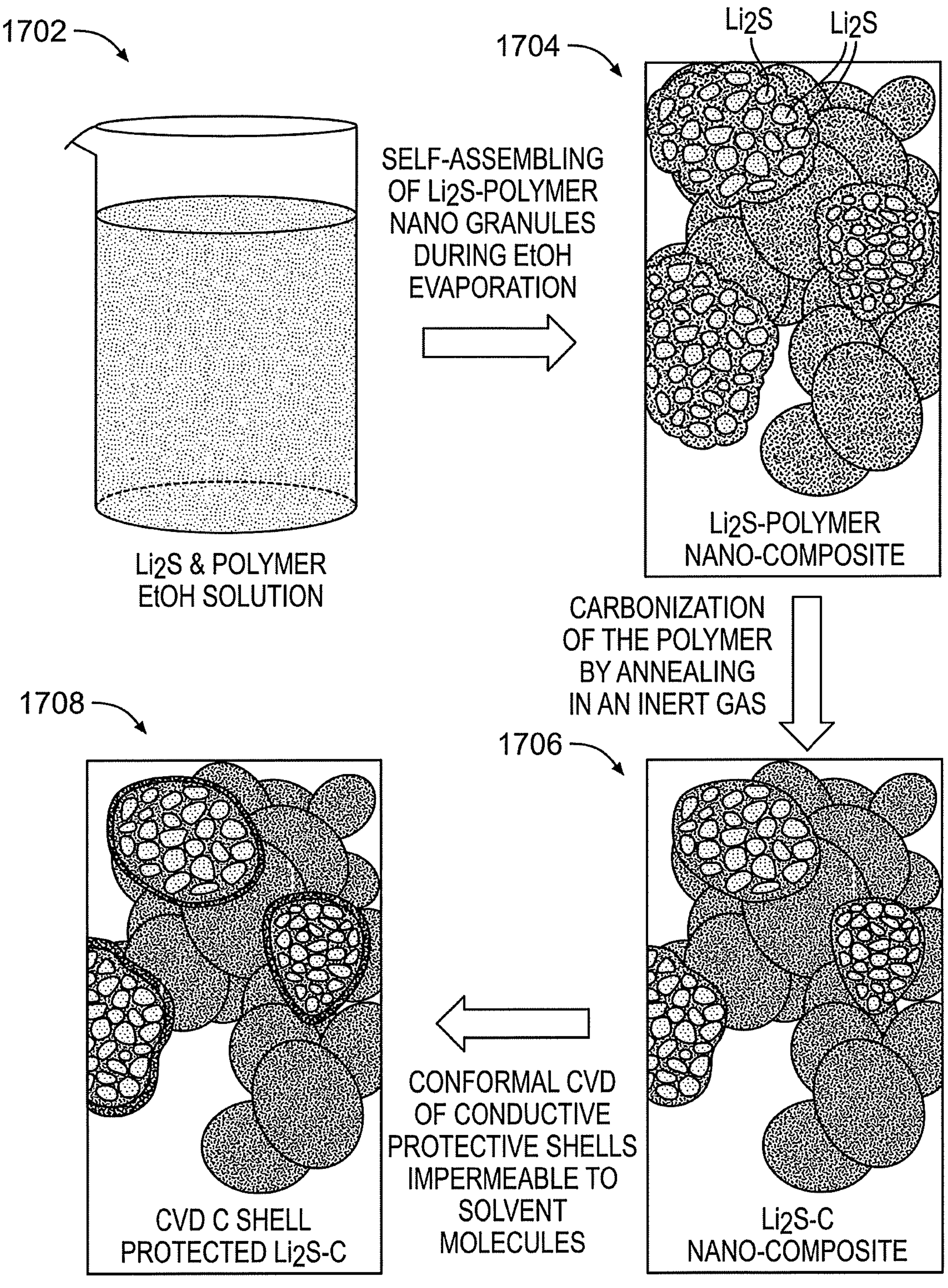
FIG. 17 is a graphical flow diagram illustrating an example process for the formation of composite particles with a first level of hierarchy.

FIG. 17 is a graphical flow diagram illustrating an example process for the formation of composite particles with a first level of hierarchy. In this example, (nano) composite particles comprising $Li_2S$ within a polymer matrix are first produced using an approach similar to that described above with respect to FIG. 13 (blocks 1702-1704). The particles are then carbonized in order to produce (nano) composite particles comprising $Li_2S$ embedded within a matrix of conductive and elastic carbon (preferably, with a pore volume of less than about 0.3 cc/g) (block 1706). In order to minimize the content of inactive material and maximize the volumetric capacity of the composite, the volume and mass fractions of the carbon should be small, preferably smaller than about 50%. In this example, the C—$Li_2S$ (nano)composite (nano)particles are further coated with a layer of carbon (C) by using a chemical vapor deposition (CVD) to create additional protection, improve the particle mechanical properties, and improve electrical conductivity of the particles (block 1708).

Figure 18A:
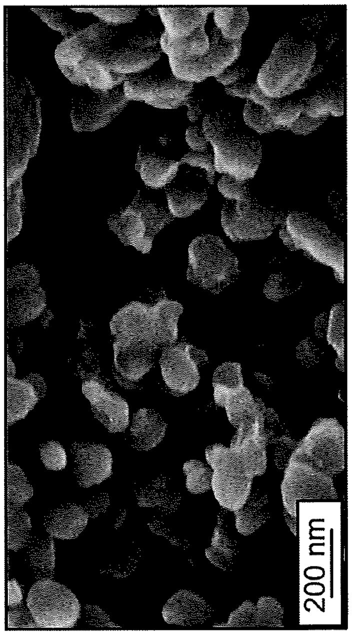
FIGS. 18A-18F illustrate select characterizations of example materials produced according to the process described in FIG. 17.
Figure 18B:
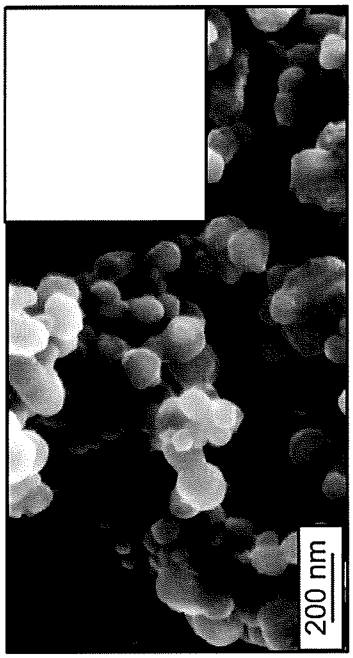
Figure 18C:
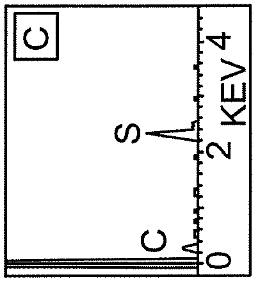
Figure 18D:
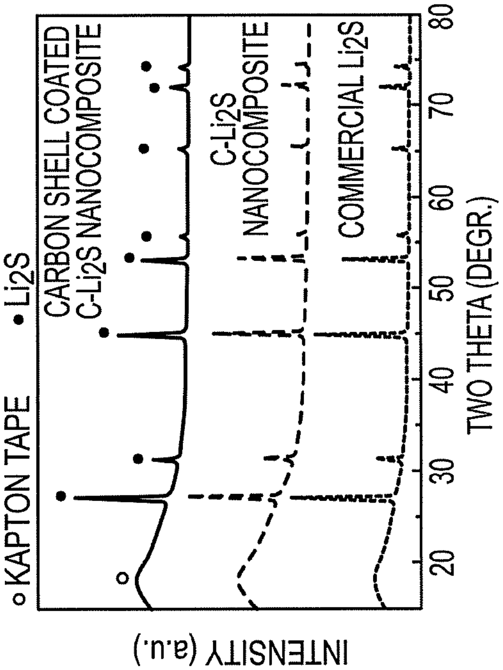
Figure 18E:
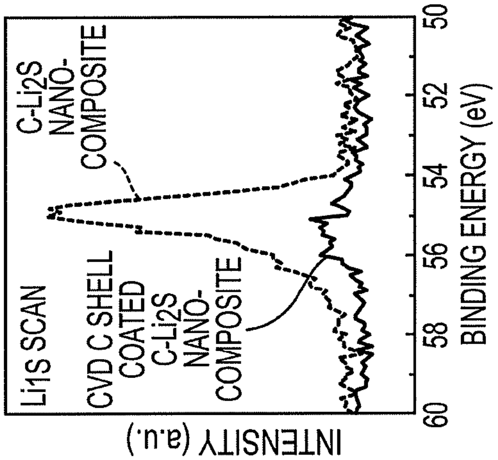
Figure 18F:
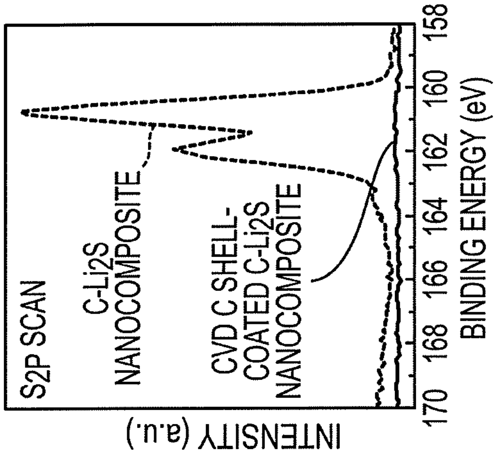

FIGS. 18A-18F illustrate select characterizations of example materials produced according to the process described in FIG. 17. In particular, FIGS. 18A-18B illustrate SEM studies of C—$Li_2S$ composite materials before (FIG. 18A) and after (FIG. 18B) carbon CVD shell formation. FIG. 18C illustrates an EDS study of the samples with a C CVD shell. FIG. 18D illustrates XRD showing the presence of pure $Li_2S$ and the lack of crystalline impurities. FIGS. 18E-18F illustrate X-ray photoelectron spectroscopy (XPS) studies of the surface of the particles before and after CVD shell formation, demonstrating complete coverage of the composite particle by the shell.

Figures 19A, 19B, 19C, 19D, 19E:
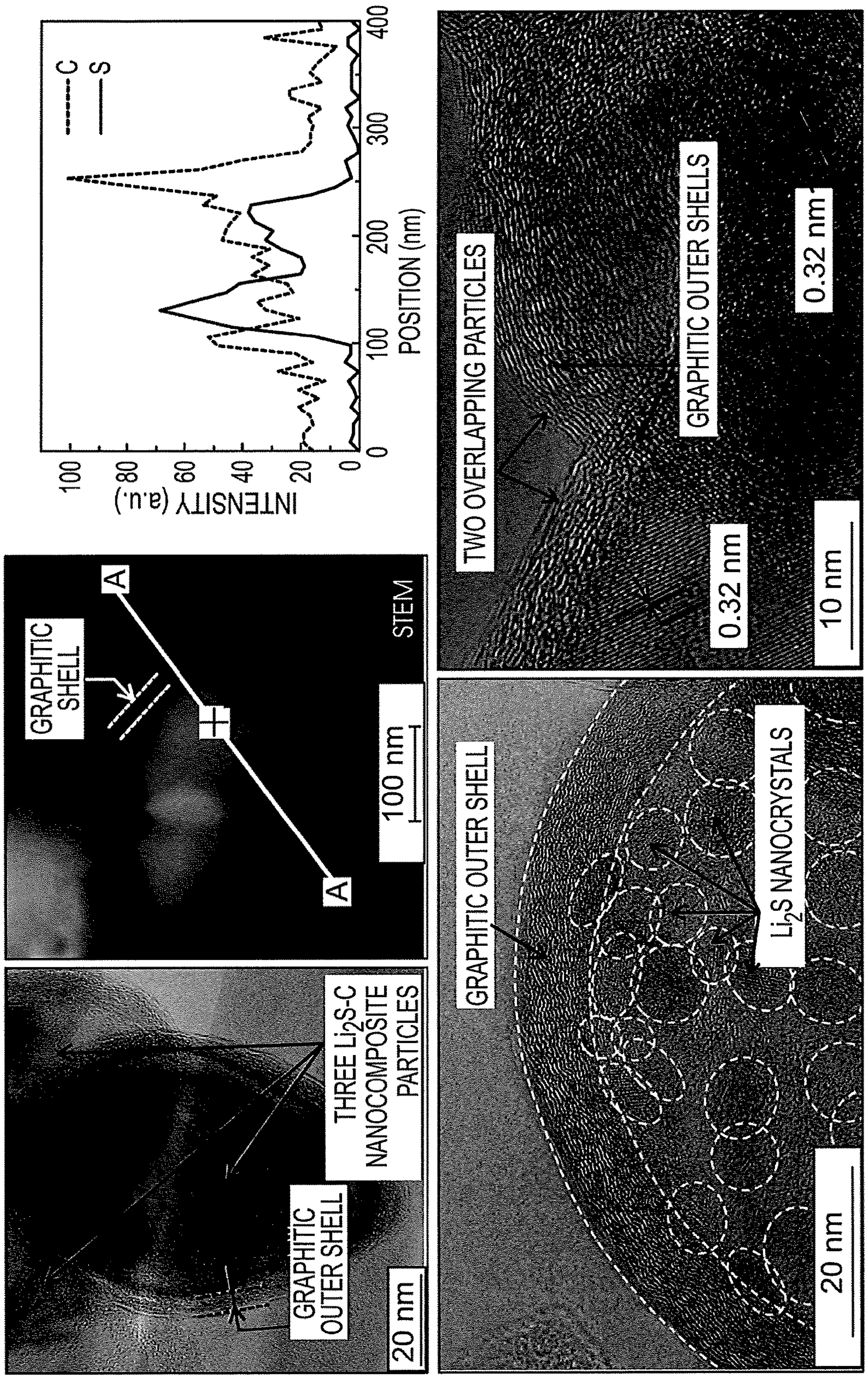
FIGS. 19A-19E illustrate additional characterizations of example materials produced according to the process described in FIG. 17.
Figure 20A:
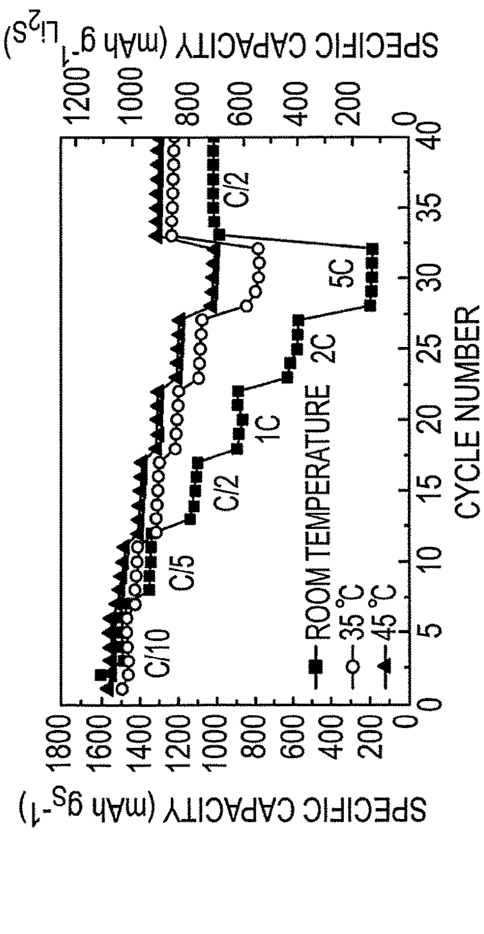
FIGS. 20A-20D illustrates results of select electrochemical tests of example materials produced according to the process described in FIG. 17 against Li metal foil.
Figure 20B:
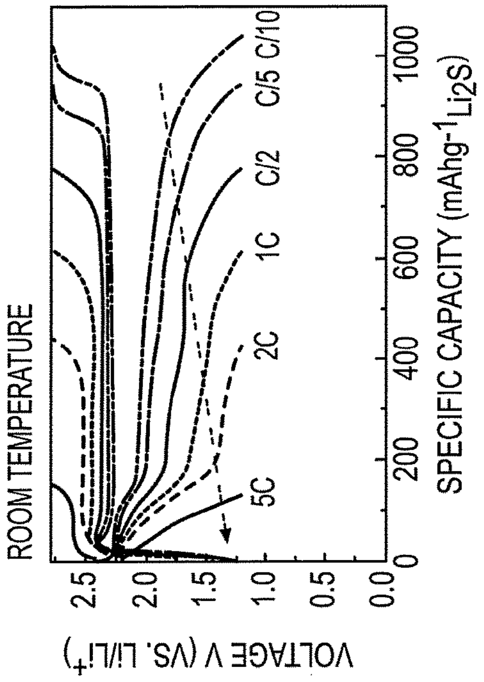
Figure 20C:
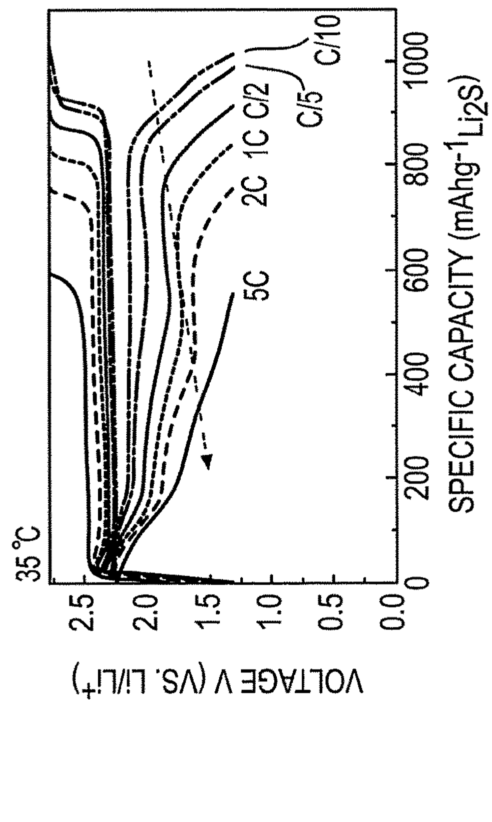
Figure 20D:
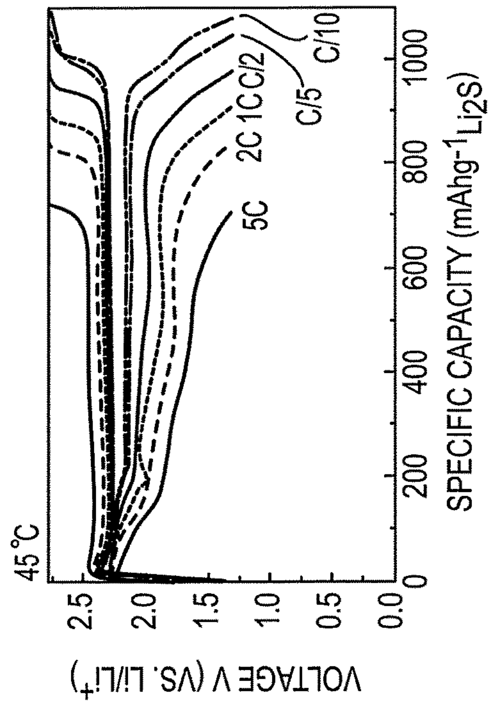

FIGS. 19A-19E illustrate additional characterizations of example materials produced according to the process described in FIG. 17. The characterizations include TEM studies revealing the size of the $Li_2S$ nanocrystals, morphology, and thickness of the disordered graphite shell. In particular, FIG. 19A illustrates a low resolution TEM micrograph of the core-shell nanocomposite. FIG. 19B illustrates an Scanning TEM (STEM) micrograph showing the projected sample density. FIG. 19C illustrates a normalized Electron Energy Loss Spectroscopy (EELS) profile, showing the presence of a carbon shell along the A-A line in FIG. 19B. FIG. 19D illustrates a high resolution TEM micrograph showing both the graphitic shell and $Li_2S$ nanocrystals within an amorphous carbon matrix. FIG. 19E illustrates a high resolution TEM micrograph showing the inter-planar spacing within the nanocrystals coinciding with that of the (111) planes of $Li_2S$.

FIGS. 20A-20D illustrate results of select electrochemical tests of example materials produced according to the process described in FIG. 17 against Li metal foil. In particular, FIG. 18A illustrates rate-test performance at room temperature, 35° C., and 45° C. FIGS. 18B-18D illustrate the shape of the charge-discharge curves collected at different rates and at different temperatures, showing high rate performance and a small value of the hysteresis.

Figure 21:
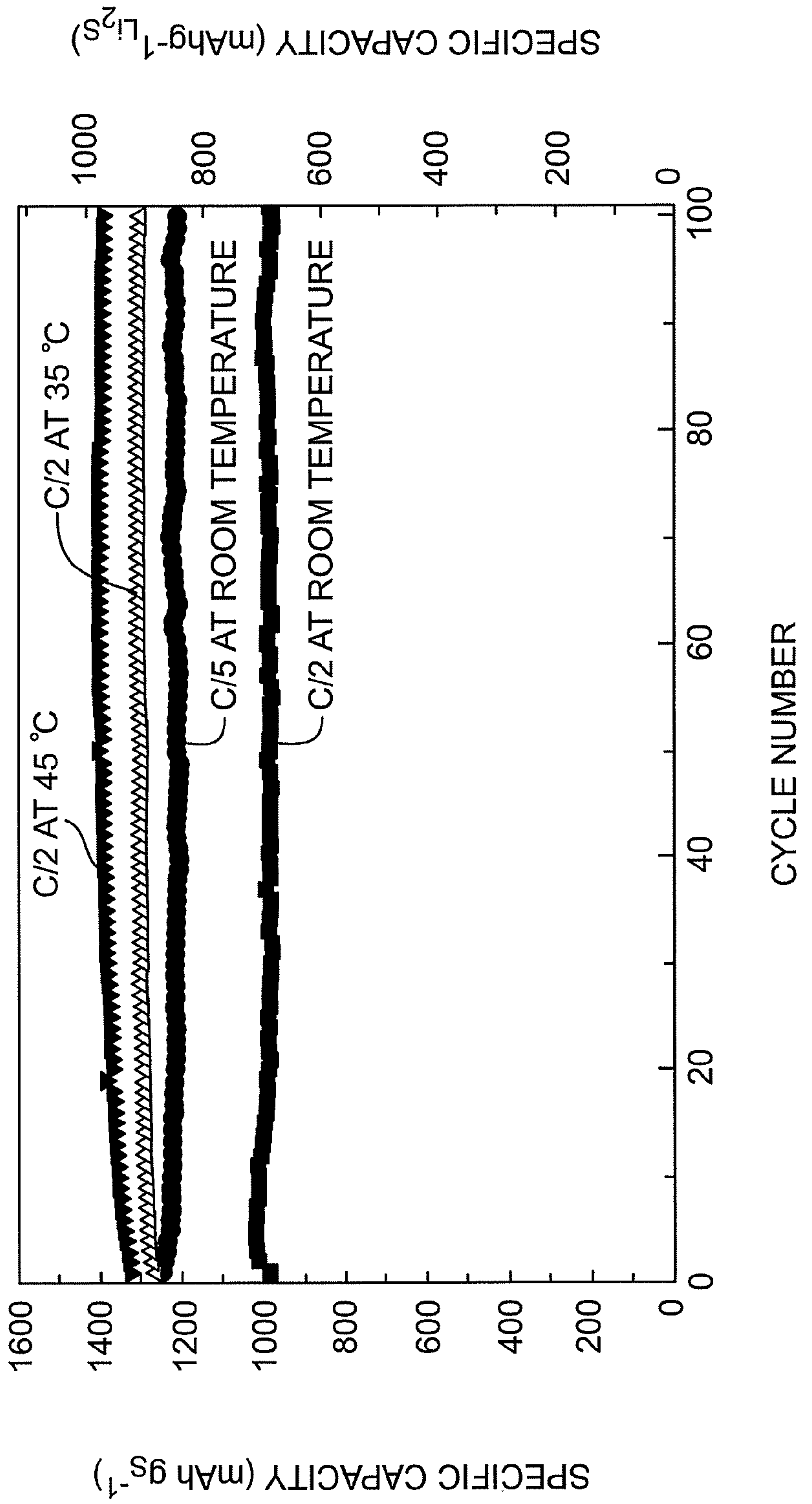
FIG. 21 illustrates results of electrochemical cycle stability tests of example materials produced according to the process described in FIG. 17 against Li metal foil.

FIG. 21 illustrates results of electrochemical cycle stability tests of example materials produced according to the process described in FIG. 17 against Li metal foil. As shown, the results demonstrate substantially high capacity utilization and virtually no degradation within 100 cycles.

In still other aspects of the present invention, a novel architecture of the electrodes, a novel route to produce electrodes with improved properties, and a novel route to produce individual composite particles are provided. Conventional routes to produce electrodes typically involve formation of active particles (e.g., $Li_2S$-comprising particles), mixing these particles with a polymer solution and conductive carbon additives to achieve homogeneous slurry, casting this slurry on the surface of a metal foil current collector, and drying. There is a need to increase the electrode thickness (and mass loading of the active material per unit area) in order to reduce the weight and volume fraction of inactive components of the battery (such as separators and metal foils) and also to reduce the cost of the coating process. However, when drying thick coatings, they tend to crack and delaminate from the current collector. In addition, increasing the coating thickness undesirably increases electrical resistance of the electrode (in the direction perpendicular to the electrode) due to point contacts between the active particles and conductive additives.

Figure 22:
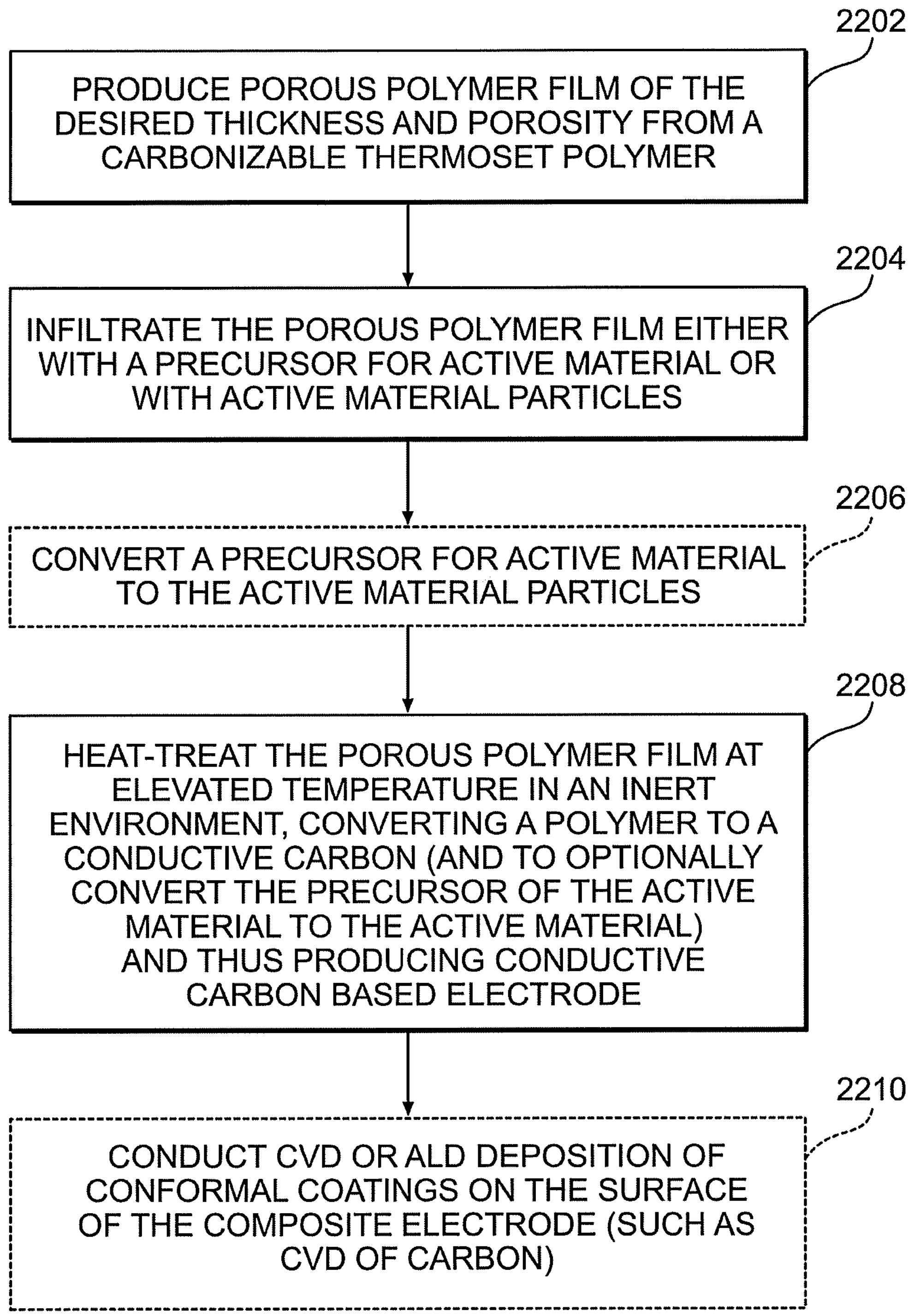
FIG. 22 is a flow diagram illustrating an example method of fabricating a conductive carbon based electrode.

FIG. 22 is a flow diagram illustrating an example method of fabricating a conductive carbon based electrode. In this example, the method 2200 includes formation of a film (e.g. a free-standing film) of a porous thermoset polymer or polymer mixture (block 2202); impregnating or infiltrating this film with active material (or a precursor(s) of active material) (block 2204); optionally (if needed or if needed as a separate step) converting the precursor(s) into active material particles (optional block 2206); and heat-treating the produced composite at elevated temperatures to induce carbonization of the polymer and its conversion to conductive carbon (block 2208). To reduce the amount of inactive material within the electrode, it may be preferable that the final amount of carbon does not exceed 25 wt. % (even more preferably, 15 wt. %). Because the polymer chains of the polymer are rigid, the produced electrode does not crack during the solvent evaporation (e.g., if a solvent is used for active material infiltration) even if the overall electrode thickness is large (e.g., within 60-200 microns). Because the produced carbon electronically connects all particles within the electrode, the achieved conductivity and mechanical stability of the produced electrode may be very high. In order to protect the surface of the active material particles from undesirable interactions with the electrolyte, it may also be desired to optionally deposit a protective layer on the surface of the active material (optional block 2210). Carbon deposition (e.g., by CVD) is an example of such a protective coating method. Carbon deposition also further increases the electrical conductivity of the electrode.

As a particular example, a carbonizable polymer may be impregnated with a solution of $Li_2S$ in anhydrous ethanol, the produced material may be dried from the solvent, and the process optionally repeated as necessary to achieve a desired polymer-$Li_2S$ ratio. Subsequently, the polymer-$Li_2S$ composite may be carbonized in an inert environment (e.g., under Ar gas) to produce a C—$Li_2S$ composite. The composite may be further coated with a layer of CVD carbon using a hydrocarbon precursor (e.g., acetylene). The polymer-$Li_2S$ composite may also be coated with another layer of polymer (e.g., by using CVD) before or after carbonization. And similarly, another layer of CVD carbon may be further deposited.

Here, the produced electrode may be able to protect high capacity $Li_2S$ particles against dissolution or unfavorable reactions with the electrolyte, while achieving high electrode uniformity, high electrode conductivity, and high electrode rate performance. Furthermore, this method allows for the production of uniform electrodes with high mass loading (high capacity loading) per unit electrode area.

Figure 23:
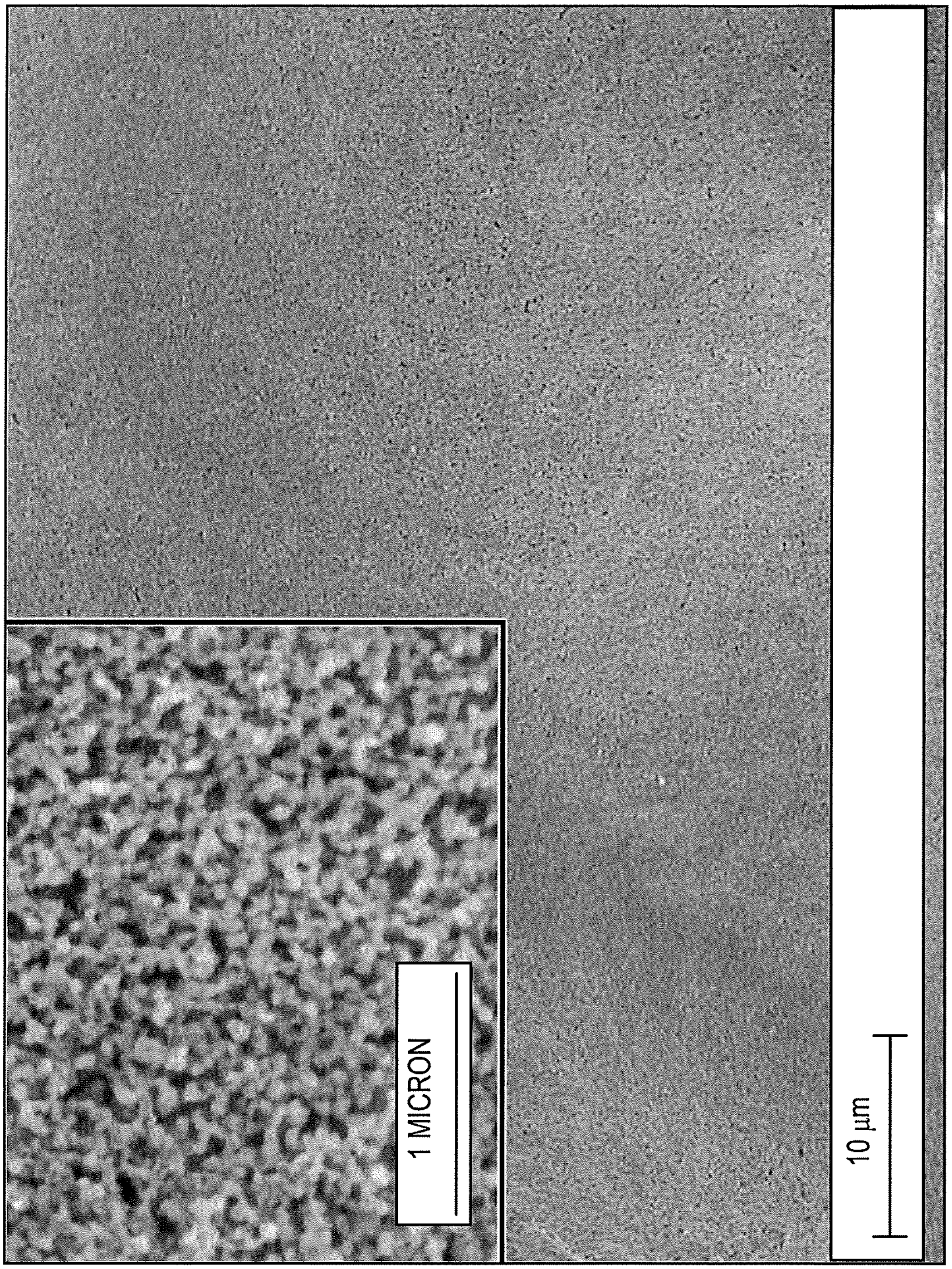
FIG. 23 is an SEM micrograph illustrating an example $Li_2S$—C electrode produced according to the method described in FIG. 22.

FIG. 23 is an SEM micrograph illustrating an example $Li_2S$—C electrode produced according to the method described in FIG. 22. As shown, a very high degree of electrode uniformity and smoothness is visible. Remaining pores within the electrode may be used to achieve rapid transport of electrolyte ions.

Figure 24A:
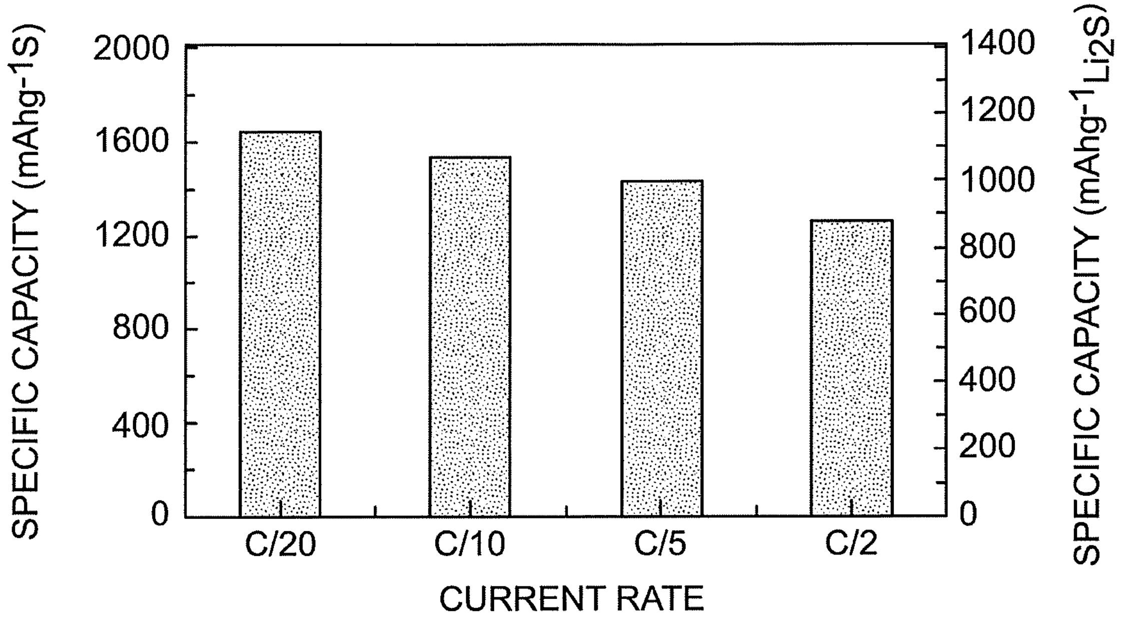
FIGS. 24A-24B illustrate select electrochemical performance results of the material of FIG. 23 in half cells with a Li foil counter electrode.
Figure 24B:
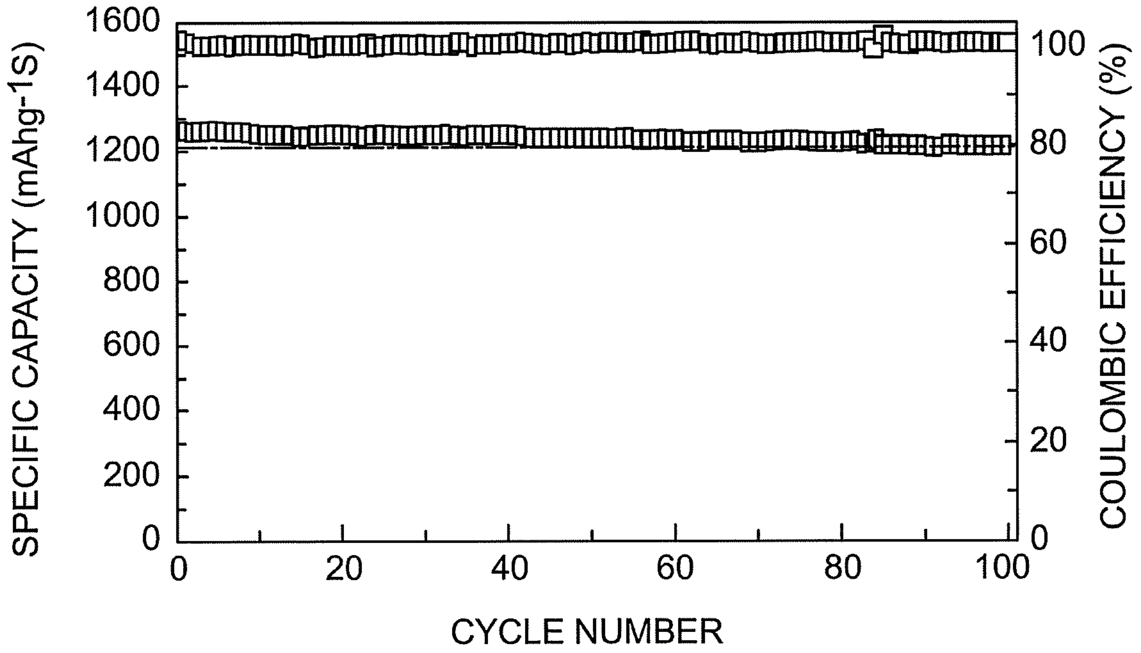

FIGS. 24A-24B illustrate select electrochemical performance results of the material of FIG. 23 in half cells with a Li foil counter electrode. The illustrated results include rate performance (FIG. 24A) and cycle stability (FIG. 24B). Remarkable stability and ultra-high capacity is demonstrated.

In addition to the preparation of the electrode as described above with reference to FIG. 22, a modification of this approach is suitable for the fabrication of the individual particles.

Figure 25:
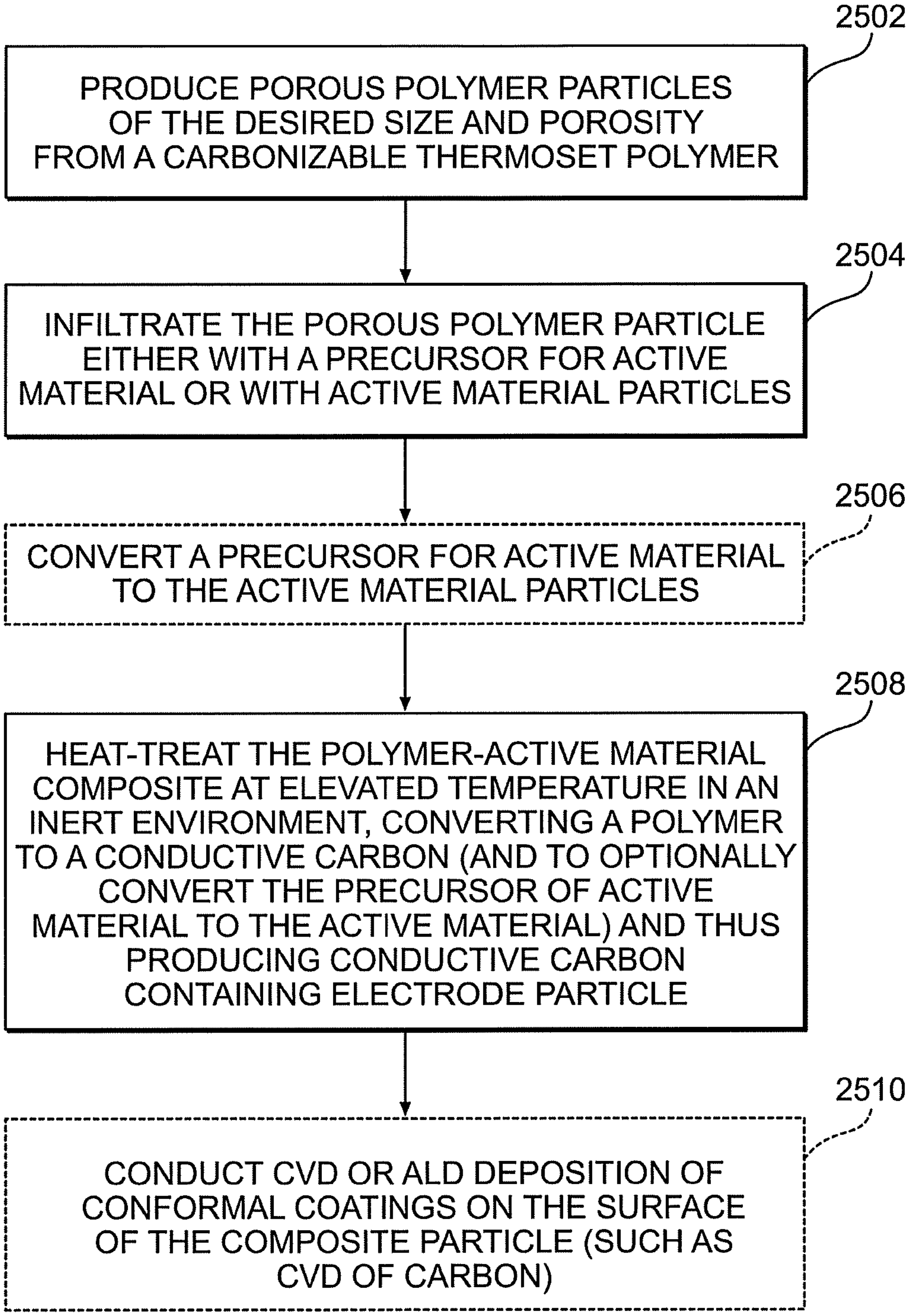
FIG. 25 is a flow diagram illustrating an example method of fabricating carbon containing composite particles.

FIG. 25 is a flow diagram illustrating an example method of fabricating carbon containing composite particles. In this example, the method 2500 includes producing porous polymer particles (block 2502) and impregnating (infiltrating) with active material (or a precursor(s) of active material) (2504). The next optional step (if needed or if needed as a separate step) includes converting the precursor(s) into active material particles (optional block 2506). Further heat-treatment of the produced composite particles may be conducted at elevated temperatures (e.g., 300-1000° C., sufficiently high to carbonize a polymer but not so high that damage to the active material occurs) in order to induce carbonization of the polymer and its conversion to conductive carbon (block 2508). To reduce the amount of inactive material within the composite electrode particle, it may be preferable that the final amount of carbon does not exceed 25 wt. % (even more preferably, 15 wt. %). In order to protect the surface of the active material particles from undesirable interactions with the electrolyte, it may also be desired to optionally deposit a protective layer on the surface of the produced composite (optional block 2510). Carbon deposition (e.g., by CVD, preferably at temperatures below 800° C.) is an example of such a protective coating method. Polymer deposition (e.g., by CVD, preferably at temperatures below 350° C.), with or without subsequent carbonization, is another example of such a protective coating method. Carbon deposition (or deposition of a polymer electrically conductive during exposure to electrolyte and during operation within the cell) also further increases the electrical conductivity of the electrode.

In some applications, it may be advantageous to infiltrate different types of active material in a single porous polymer particle. In this case, for example, a combination of favorable properties enabled by individual components of active material may be achieved. For example, one active material may offer higher energy density, while another offers higher capacity or higher rate performance.

In some applications, it may also be advantageous to additionally infiltrate another polymer or an organic compound into the pores of the polymer in addition to the infiltration of the active material. In this case, for example, formation may be induced of the (porous) carbon film on the surface of active particles during heat-treatment.

In the two examples above, $Li_2S$ particles are used for illustration purposes, but other particles may also greatly benefit from using the disclosed electrode fabrication methods. Examples of suitable active materials may range from Si, Sn, Sb, P, $SiO_x$, and various other conversion-type anodes for Li-ion batteries, to various metal fluorides (e.g., iron fluorides, copper fluorides, bismuth fluorides, etc), various metal bromides (e.g., lithium bromide), various selenides, sulfides, iodides and various other conversion-type cathodes for Li and Li-ion batteries, to various intercalation-type active materials to be used as anodes or cathodes in Li-ion batteries and electrochemical capacitors, to various electrochemically active polymers, to various other types of materials that can be used to store energy via electrochemical reactions.

In yet another aspect of the present invention, unwanted reaction of the active material with liquid electrolytes may be substantially reduced by forming protective coatings in-situ, during the initial cycles of cell operation. As discussed above, $Li_2S$ cathodes, for example, typically suffer from polysulfide dissolution, which reduces the cell capacity and increases cell resistance by (i) increasing electrolyte viscosity and ion mobility and (ii) inducing the continuous precipitation of resistive $Li_2S$ and $Li_2S_2$ on the surface of Li in a $Li_2S$—Li cell. In some of the embodiments described above (e.g., with respect to FIG. 9 and FIG. 13), a Li+ conducting shell may be formed on the $Li_2S$ surface, which may protect $Li_2S$ against dissolution during Li extraction, with carbon being an example of a suitable shell. However, it may desirable for certain application to have decreased complexity and a lower cost of cell fabrication. Further, some applications may be less tolerant of defects within the protective layers or require increased toughness. While hierarchical shells address this concern, they nonetheless further increase complexity of a system and may increase material synthesis cost.

To address the need for an efficient yet low-cost approach to protect the electrode surface from liquid electrolyte (or, in some cases to protect the electrolyte from continuous decomposition on the electrode surface), the formation may be induced of an effective protective coating on the surface of cathode particles (e.g., $Li_2S$-based) in-situ, which helps to keep battery costs low and ensure high coating uniformity. This approach is complementary to the protective shell formation. In some cases, additional benefits can be achieved with electrolyte modifications to induce this in-situ film formation. Examples of such benefits include, but are not limited to, the following: (i) the overpotential of first charge may be reduced and (ii) the cell rate performance may be significantly enhanced. It may be preferred for this in-situ formed protective layer to reduce the rate of undesirable reactions (such as continuous electrolyte decomposition, partial etching, or dissolution of the cathode) by at least two times, preferably by at least four times, even more preferably by ten times.

Although the formation of an in-situ protective layer on the low potential electrodes (e.g., with a Li insertion potential below 1 V vs. Li/Li+) have been used in conventional designs (e.g., on graphite or on Li foil anodes), the application of an in-situ formed protective layer on the medium-high voltage electrodes (e.g., electrodes with active materials having a Li insertion potential between 1 V and 4 V vs. Li/Li+, such as $Li_2S$ and many others, and having specific capacities in the range of about 50 to about 2000 mAh/g when operated within this potential range) have not been employed and, at most, thought to be unnecessary, useless, or harmful. Furthermore, there have been only a few examples when in-situ (during the cell operation) formed coatings could be formed at medium-high voltages (e.g., between 1 V and 4 V vs. Li/Li+, where $Li_2S$, $Li_2Se$, various metal fluorides, other conversion-type electrodes, and some intercalation-type electrodes operate) and it was at best unclear if such coatings would provide any benefits to cell performance (including the cells with electrodes comprising $Li_2S$ or other conversion-type active materials). Therefore, such embodiments are believed to be novel and important. Finally, the in-situ formation of a superior protective layer, as provided by certain aspects of this description through the use of certain electrolyte salts or electrolyte salt additives, or through a combination of salts and additives, is also significant for battery applications. Such superior protective layers may benefit various types of electrodes (not only those that are active in the medium-high voltages of 1-4 V vs. Li/Li+).

One example of a suitable electrolyte is the DME-based electrolyte comprising LiI as an additive. Some other ethers may also be used instead of DME as electrolyte solvents. Similarly, additives other than LiI may induce reduction of the electrolyte at the potential above that of the Li insertion into the de-lithiated $Li_2S$ (or other medium-high-voltage electrodes, 1-4V vs. Li/Li+).

FIGS. 26A-26D illustrate results of select electrochemical tests with a LiI electrolyte additive for in-situ protective shell formation. In this example, coin cells were assembled with an $Li_2S$—C composite cathode and an approximately 4 M lithium bis(trifluoromethanesulfonyl)imide (LiTFSI) salt solution in distilled dimethoxyethane (DME):1,3-dioxolane (DIOX) (1:1, v:v) with 0, 0.2, 0.5 or 1 M LiI used variously as an additive, as described in relevant detail below.

Figure 26A:
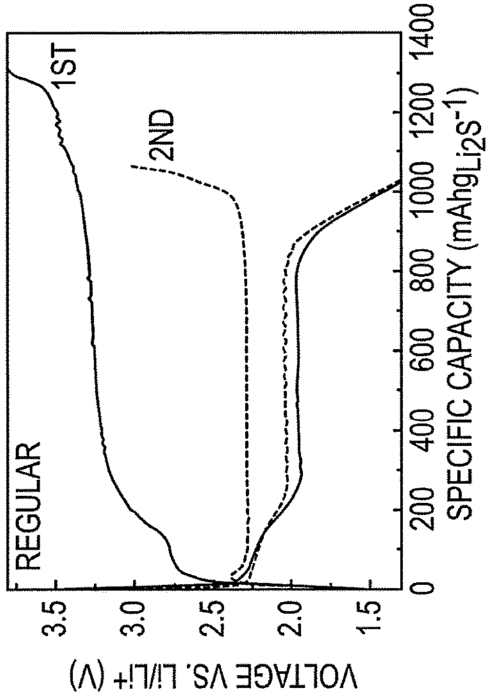
FIGS. 26A-26D illustrate results of select electrochemical tests with a LiI electrolyte additive for in-situ protective shell formation.
Figure 26B:
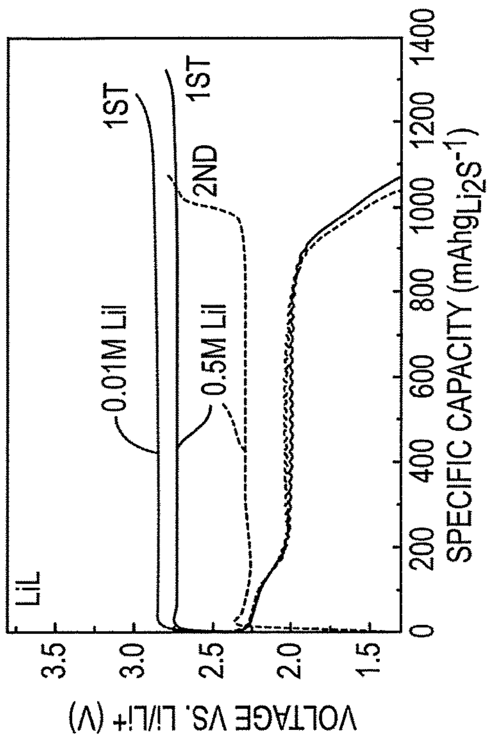
Figure 26C:
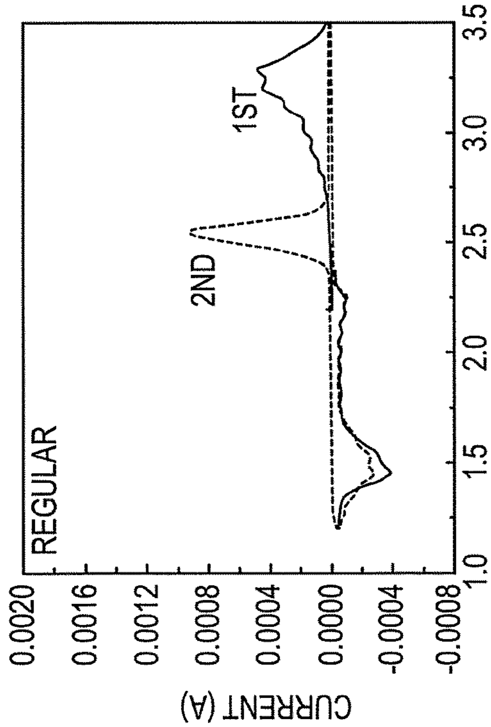
Figure 26D:
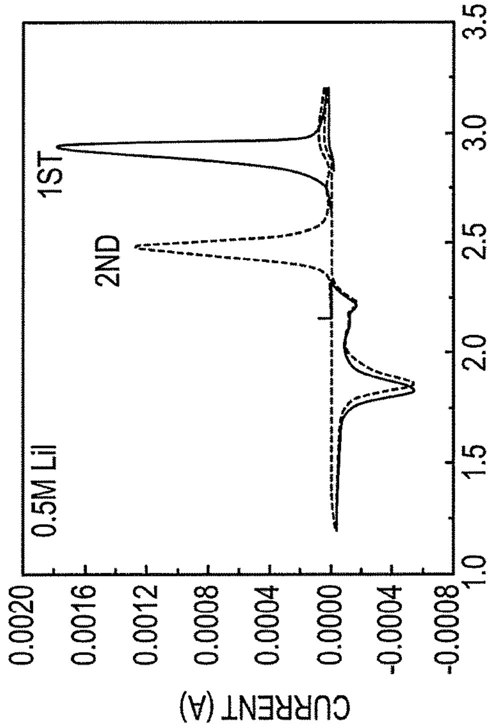

As shown, the voltage profiles of the two initial charge-discharge cycles of such $Li_2S$—C electrodes against Li without (FIG. 26A) and with (FIG. 26B) LiI additives (0.5 M in this case) into electrolyte (lithium bis(trifluoromethanesulfonyl)imide (LiTFSI) salt solution in 1,2-dimethoxyethane (DME):1,3-dioxolane (DIOX) solvent mixture) show significant differences. Without the additive, the first charge profile of nanostructured C—$Li_2S$ based electrode displays a visible over-potential in the range of 3.0-3.8V, previously explained by a high activation barrier for Li extraction from crystalline $Li_2S$. Addition of LiI dramatically reduces over-potential. To be clear, because the redox potential of LiI is approximately 3V vs. Li/Li+, iodine dissolved in the electrolyte does not contribute to capacity during charge-discharge cycling. The positive impact of LiI on the reduction of first cycle overpotential (as seen from a comparison of FIG. 26A and FIG. 26B) may be explained by three separate hypotheses: (i) LiI acts as a redox mediator, with the primary function to enhance electrical conductivity of the electrode in contact with electrolyte by transferring electrons from conductive carbon to the $Li_2S$ surface through the ionic mediator (within its oxidation potential within 2.9-3.4 V vs. Li/Li+); (ii) LiI improves ionic conductivity through the solid electrolyte interphase (SEI) initially formed on the Li anode and (if it exists) on the cathode. The fact that these electrodes show near-theoretical capacity (see FIG. 26A-26B) suggests that they already possess sufficient conductivity and that further conductivity enhancement (e.g., via introduction of redox mediators into the electrolyte) is unlikely to lower the first cycle overpotential significantly. Furthermore, because I– does not oxidize below approximately 2.8 V vs. Li/Li+ due to the high thermodynamic potential of LiI, LiI may not be very active as a redox mediator when charging the cell to below 2.8V (first charge). Finally, the hysteresis for the second cycle in both electrodes is nearly identical at this rate, suggesting little difference in the overall cell resistances. Since the ionic conductivities of electrolytes slightly increase with LiI additions, there remains no evidence of electrode conductivity enhancement. Therefore, in the view of the inventors, the simplistic redox mediator theory (i) is unlikely. LiI-based solid state electrolytes are known to exhibit high ionic conductivity ranging from $10^{-7}$-$10^{-3}$ S/cm and, indeed, improve ionic conductivity and reduce the over-potentials involved in various electrochemical reactions during the first charge. However, in this case it may be expected that the amount of LiI added into the electrolyte should have a major impact on the first cycle overpotential. To test this hypothesis, a very small amount (0.01 M LiI) was added into the electrolyte, and a much smaller Li extraction potential was still observed (approximately 2.85 V with 0.01 M LiI compared to approximately 3.3 V without). Without reliance on any particular theory for operation, it is at least believed that either SEI properties are improved in the presence of LiI for reasons other than LiI inclusions or electrocatalytic activity of LiI is responsible for the decrease in the activation energy of $Li_2S$ oxidation and the resulting reduction in the first cycle overpotential. Because iodides (including LiI) have been previously used as catalysts for various processes, ranging from $H_2O_2$ decomposition to various organic reactions, the last hypothesis is not unreasonable. Cyclic voltammetry (CV) curves (FIG. 26C and FIG. 26D, collected at a scan rate of 0.05 mV/s approximately equal to C rate around C/10) confirm the results of charge-discharge tests and show that the hysteresis between 1st charge and discharge decreased substantially when the LiI was used as an electrolyte additive. Without using the LiI additive, the cathodic peak is very broad in the range of 3.1-3.5V, indicating a high energy barrier for the activation, which is consistent with the high over-potential in FIG. 26A. With the LiI additive, the first cathodic peak shows very sharp peak centered at a noticeably lower potential of 2.9V. The sharper peak during the second cycle indicates better kinetics of Li ions' diffusion in LiI containing cells, which may be a result of both the catalytic effect and slightly better SEI properties (FIG. 26D).

Figure 27A:
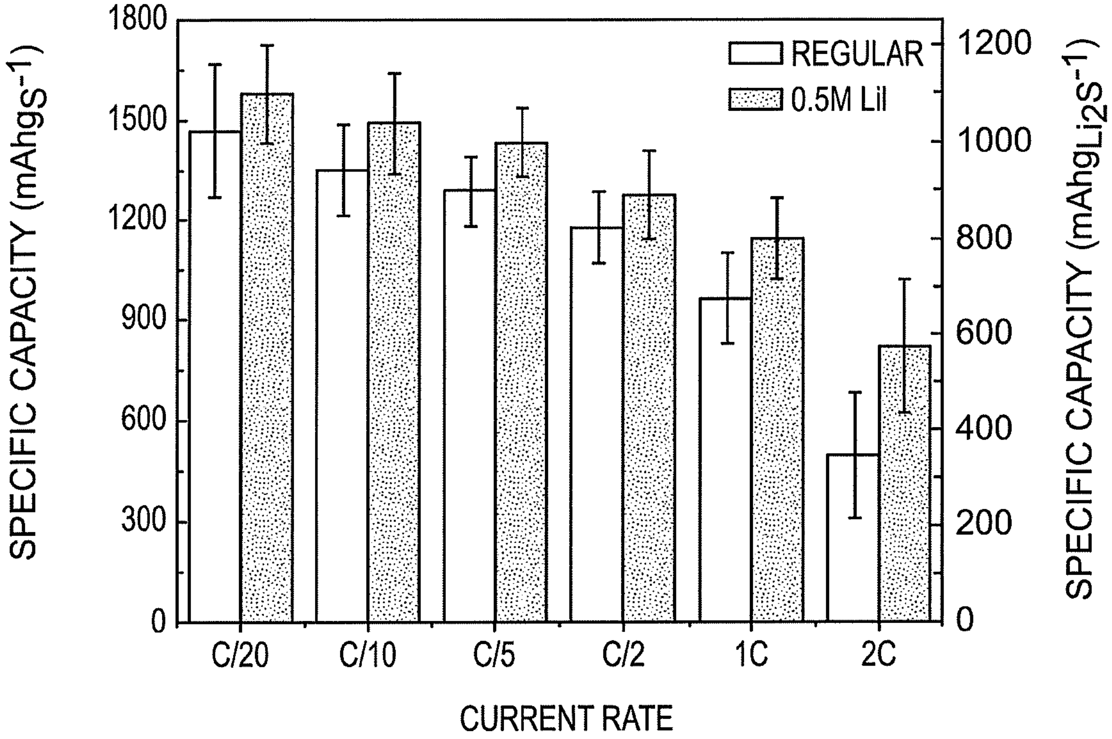
FIGS. 27A-27B illustrate results of additional electrochemical tests conducted on a $Li_2S$—C composite cathode in an LiTFSI/DME:DIOX electrolyte without and with a LiI additive, as described above and characterized in FIGS. 26A-26D.
Figure 27B:
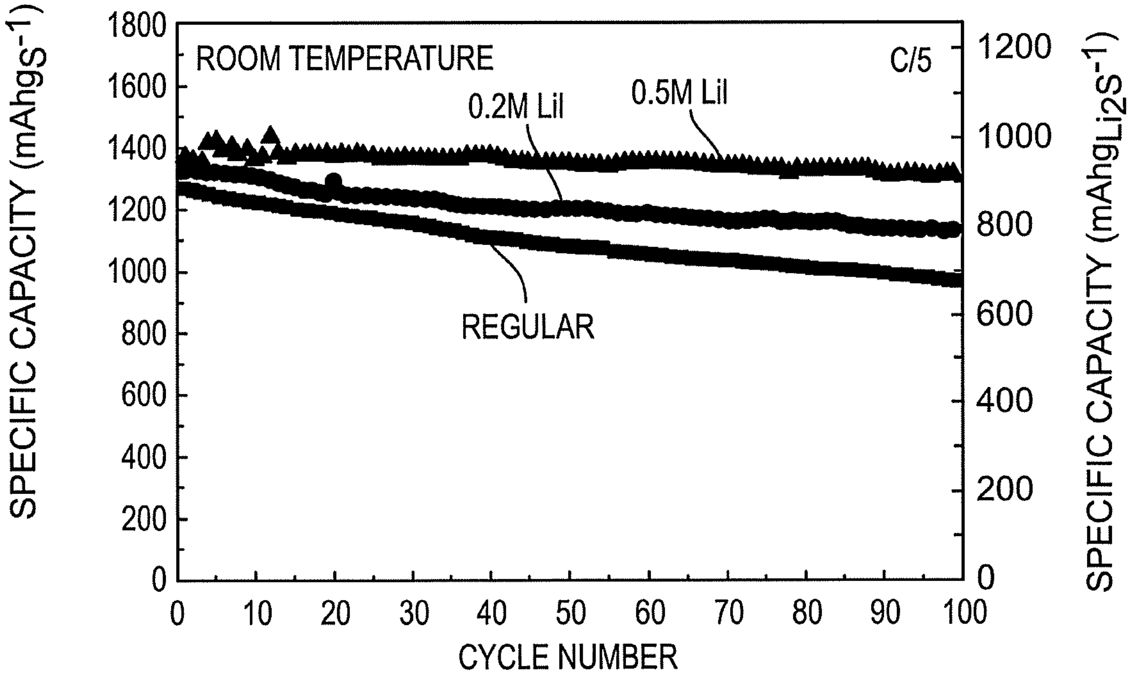

FIGS. 27A-27B illustrate results of additional electrochemical tests conducted on a $Li_2S$—C composite cathode in an LiTFSI/DME:DIOX electrolyte without and with a LiI additive, as described above and characterized in FIGS. 26A-26D. In particular, FIG. 27A illustrates rate performance for $Li_2S$-based electrodes in 5 M LiTFSI and 5 M LiTFSI with different molar concentrations of LiI as electrolytes. FIG. 27B illustrates cycling stability performance recorded at C/5 for $Li_2S$-based electrodes in 5 M LiTFSI and 5 M LiTFSI with different molar concentrations of LiI as electrolytes.

As shown, the reduced first cycle over-potential reduces side reactions and correlates with the suppressed polysulfides' dissolution, which are both significantly positive attributes for the Li/S cells. For charge-discharge (C-D) tests, the impact of LiI on the rate performance becomes apparent at around 1 C or faster rates. The reversible capacities are increased by approximately 100 mAh/g at C/20, C/10, and C/5, and by over approximately 300 mAh/g at 2 C due to the LiI additive. Rate capability of the $Li_2S$-based electrode with a 0.5 M LiI electrolyte was tested at room temperature from C/20 to 5 C. Even at a high C rate of 1 C the cell shows highly reversible capacities of 1114 mAh/g (normalized by the mass of S). After rate testing, the cell returns to C/2 cycle test with the capacity coming back to 1233 mAh/g. Both excellent rate capability and good stability were evident and attributed to the good reaction kinetics in the electrode based on nanostructured C—$Li_2S$ cathode materials and good stability of this electrochemical system by using LiI. By using LiI as an additive, capacity retention was increased from 76% to 85% and 96% after 100 cycles. The best performing cell (0.5 M LiI) exhibited 1310 mAh/g capacity after 100 cycles at C/5, which is remarkably high considering that no polysulfides were added to the electrolyte. When compared to the recent literature reports, the combination of high capacity utilization and cycle stability of the cell comprising 0.5 M LiI is outstanding.

FIGS. 28A-28D and 29A-29D illustrate post-mortem studies of the electrodes from the cells of FIG. 27. These studies reveal a dramatic effect of LiI on the morphologies of both Li and $Li_2S$ electrodes.

Figure 28A:
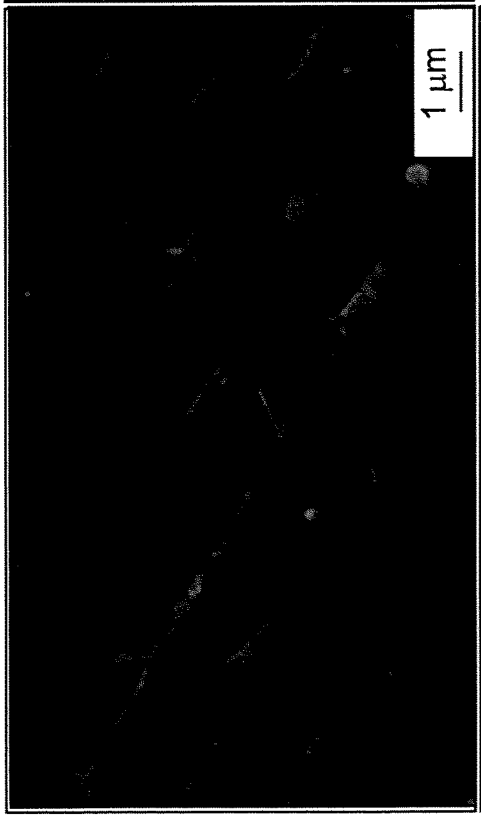
Figure 28B:
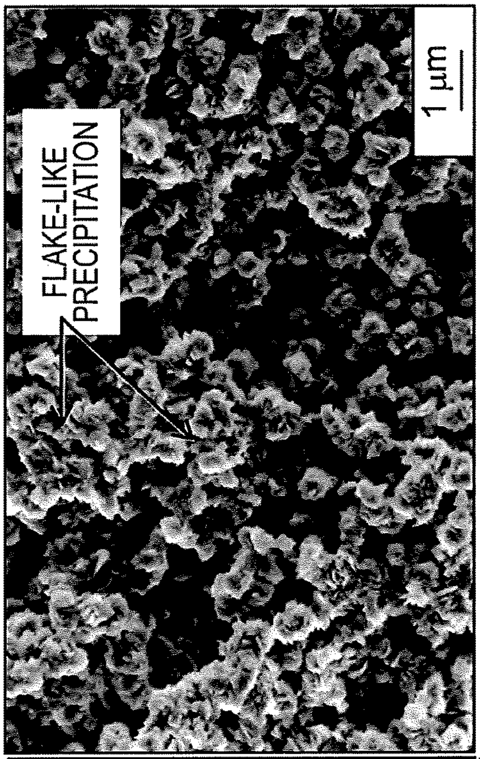
Figure 28C:
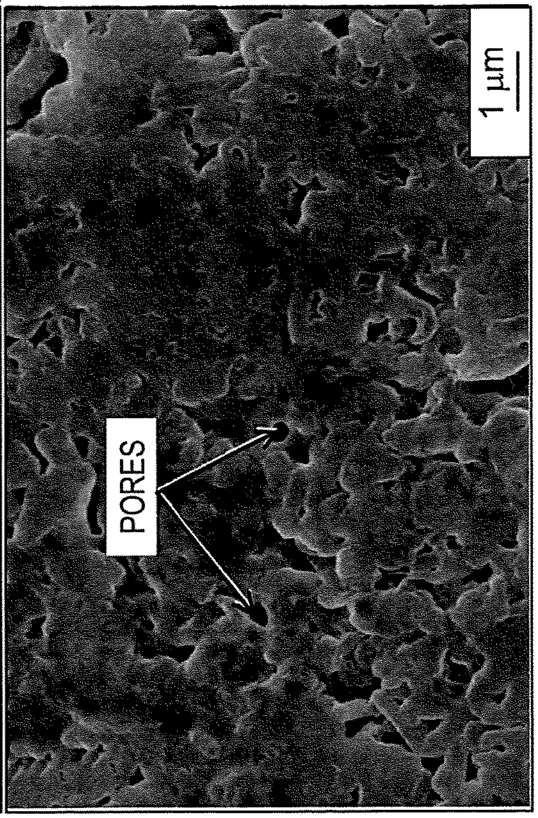
Figure 28D:
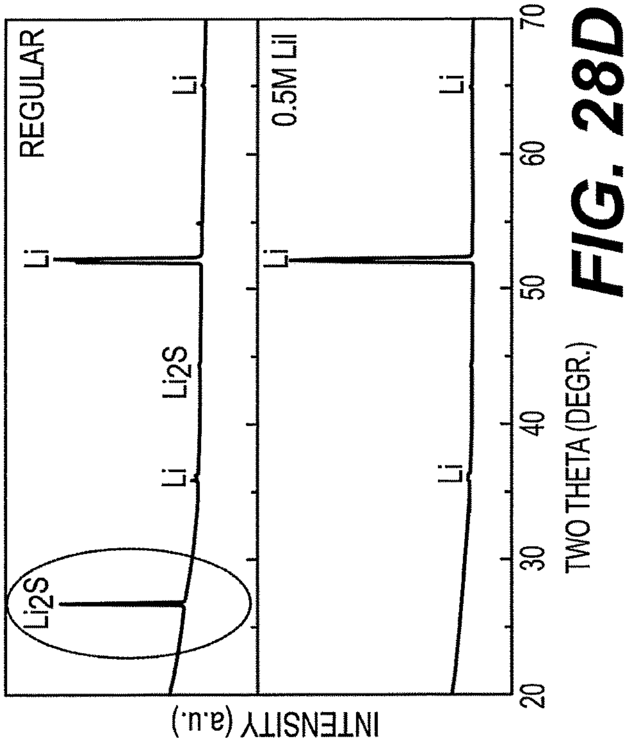

FIGS. 28A-28C show the SEM images of fresh Li anode foil (FIG. 28A) as well cycled (100 cycles at C/5) Li foils without (FIG. 28B) and with (FIG. 28C) a 0.5 M LiI additive. The fresh lithium foil has a substantially smooth surface. After cycling in a regular electrolyte, the surface becomes rough and covered with flake-like crystalline $Li_2S$ growing like dendrites on it, which is confirmed by X-ray diffraction (XRD) of cycled lithium foil exhibiting very sharp diffraction peaks of $Li_2S$ (FIG. 28D). The formation of such an SEI as a result of polysulfide shuttle not only reduces cell capacity by reducing the content of active material on the cathode side, but also increases the cell's resistance. In sharp contrast, the use of LiI yielded a very smooth surface of the cycled lithium foil with no dendrites and $Li_2S$ particles visible after 100 cycles (FIG. 28C). The SEM study also reveals a net-like porous structure of the Li SEI layer, which may be beneficial for faster diffusion of Li ions. The XRD study does not show any new crystalline phase formed after 100 cycles (FIG. 28D), providing further evidence that polysulfide shuttle was strongly reduced in cells comprising LiI. This SEI evidently prevented (or at least significantly reduced) the reduction of polysulfides to $Li_2S$ on the surface of lithium foil, which similarly enhances the cycling performance, in addition to prevention (or at least significant reduction) of polysulfide dissolution by the protective film formed on the S cathode discussed below.

FIGS. 29A-29D illustrate SEM analyses of cycled cathodes of cells from the electrochemical tests of FIG. 27. A similarly dramatic difference can be seen in the sample morphology with the LiI addition. The surface of the cathode comprising C—$Li_2S$ composite and a small content of nanosized carbon black additives becomes covered with large (0.5-3 μm) size crystals after cycling in a regular electrolyte. These large crystals are precipitates of dissolved polysulfides ($Li_2S$ or $Li_2S_2$), which are shuttling between cathode and anode sides during cycling. This precipitation layer is insulated for the electron and Li ions and can block the Li ions during the lithiation or dilithiation, which could contribute to the rise in the cells' resistance and reduced utilization of the active material. The LiI additive yielded markedly different cathode morphology (FIG. 29C). After cycling, the cathode surface becomes coated with a very smooth polymer-like film, which is in significant contrast to the rough surface of the fresh electrode (compare FIG. 29C and FIG. 29A). No crystalline precipitates are observed, further suggesting that polysulfide diffusion through such a protective film layer was significantly impeded. Not unexpectedly, both energy dispersive spectroscopy (EDS) and XPS tests revealed the presence of I on the surface of this cycled cathode and the distribution of I was very uniform. The irreversible mass loss of S in the cathode electrodes after 100 cycles reflects the degree of the polysulfide dissolution. The change in the S/S0 weight ratio in the cathodes after cycling, as determined from the EDS measurements, show as much as approximately 20% losses of S in the electrode after 100 cycles in a baseline electrolyte. In contrast, adding LiI into the electrolyte reduced the S losses by seven times to only approximately 3% after 100 cycles. Combinations of experimental evidence reveal that the addition of LiI to the electrolyte induces formation of a protective film on the surface of both electrodes.

In addition to LiI, other metal halide (e.g., LiF, LiCl, $MgF_2$, $MgI_2$, etc.) additives may also be used in some electrolytes for the in-situ formation of an efficient protective layer for Li-ion and other batteries.

Another example of a suitable electrolyte is the DME-based electrolyte based on LiFSI salt. This salt is not particularly stable and may decompose with the formation of LiF and radicals. Such radicals may induce polymerization of organic electrolytes and produce a protective surface layer.

Other salts (e.g., MgFSI, LaFSI, or LaTFSI salts; other salts containing rare earth metals; Li salts not containing $FSI^-$ anions; or salts of other metals that do not contain FSI– anions) that either produce metal halides or radicals or both upon in-situ (within a cell) decomposition may be utilized for certain embodiments (e.g., for the formation of protective coatings on the electrode surface or improving the properties of such protective coatings). Such a decomposition may be triggered by increasing temperature, by reduction, or by oxidation of the suitable salt. This concept of purposely using "unstable" salts that decompose in-situ is markedly different from the state of the art because one of the parameters often used for electrolyte salt selection is its stability in a broad potential range (the range electrolyte is exposed to in a cell). Taking advantage of the "unstable" salts that decompose, produce radicals (or produce metal halides or both) and initiate formation of the suitable protective layers on the electrode surface (particularly on the surface of the medium high voltage electrodes) is therefore believed to be novel. To be clear, this concept should not be confused with the concept of using solvent additives that may induce a favorable solid electrolyte interphase on the anode surface. However, it is noted that such concepts may be combined in certain embodiments of the present invention, where an improved surface layer may be achieved by combining electrolyte solvents (as main electrolyte solvents or as additives) that may induce cross-linking with the salts that produce radicals or metal halides upon decomposition (as additives or as main salts) in a single electrolyte.

FIGS. 30A-30B, 31A-31B, 32A-32B, 33A-33B, and 34 illustrate various aspects of an example of the favorable performance of the S-based electrode in half cells (with a Li foil anode) with LiFSI/DME and LiFSI/DME:DIOX electrolytes. Similar to the previously described example of LiI additive-comprising electrolyte, this example demonstrates that electrochemical reduction of a lithium bis(fluorosulfonyl)imide (LiFSI)-based electrolyte and interaction between polysulfides and FSI– anions allow for the formation of a very effective protective coating. This coating suppresses the S shuttle (with columbic efficiency, CE, being nearly 100%) and allows S—Li cells to exhibit very stable long-term cycling performance (1000 cycles+) during accelerated tests conducted at 60° C. Neither electrolyte additives nor prior-to-testing electrode coating technology were utilized for the cell preparation.

Figure 30A:
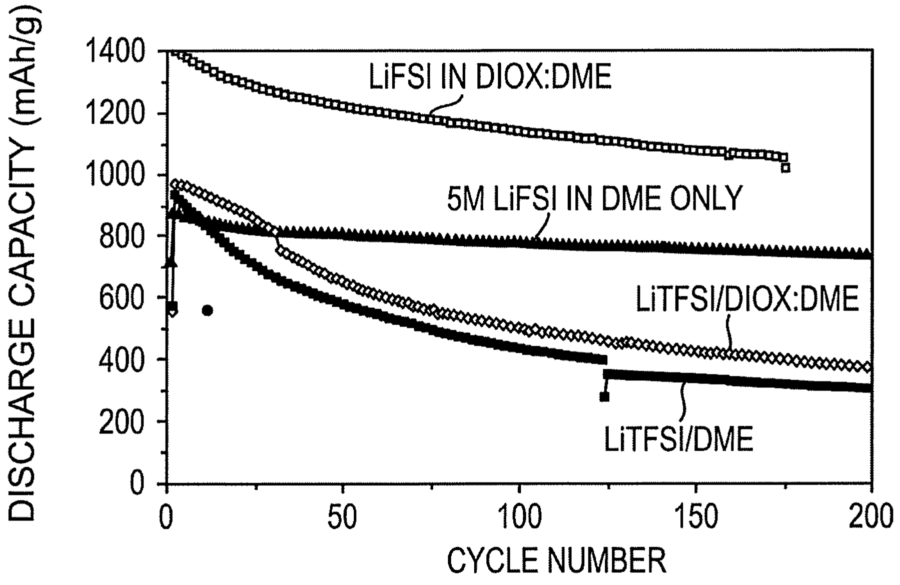
FIGS. 30A-30B, 31A-31B, 32A-32B, 33A-33B, and 34 illustrate various aspects of an example of the favorable performance of the S-based electrode in half cells (with a Li foil anode) with LiFSI/DME and LiFSI/DME:DIOX electrolytes.
Figure 30B:
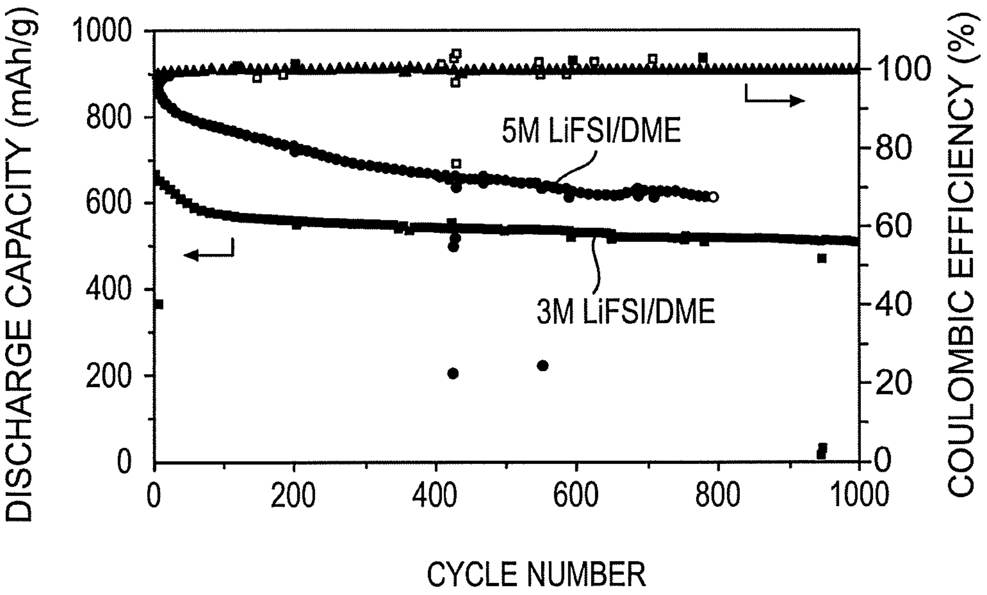

FIGS. 30A-30B show results of selected electrochemical testing. One of the most popular solvents in Li—S batteries is 1:1 vol. ratio of 1,3-dioxolane (DIOX) and 1,2-dimethoxyethane (DME) binary solvent with 1 M LiTFSI salt. A cyclic DIOX is used due to its ability to improve a passivation layer on a Li metal anode, while DME with its higher donor number (DN=20) compensates for the low solvation ability of DIOX. LiTFSI salt is used in nearly all research on Li—S because this salt is commonly believed to resist unfavorable interactions with polysulfides, while the use of other more conductive salts (such as lithium bis(fluorosulfonyl)imide (LiFSI), LiPF6, LiBF4, etc.) degrades cell performance. For example, a recent study of various ionic liquid (IL)-based electrolytes for Li—S cells showed that the unfavorable reactions between polysulfides and both [FSI]− and [BF4]− anions result in a dramatically faster fading of cells comprising such anions in IL electrolyte. In contrast to this conventional understanding, the inventors have discovered and demonstrated that an LiFSI salt dissolved in organic solvents may offer an outstanding performance for Li—S and related chemistries by inducing a protective surface coating layer. In addition to their higher conductivity, LiFSI-based electrolytes offer lower solubility of polysulfides. FIGS. 30A-30B illustrate results of the accelerated cycle stability tests conducted at 60° C., which reveals a major impact of substituting a common LiTFSI salt by LiFSI. As expected, cycle stability tests of Li—S cells in 5 M LiTFSI solution in both pure DME and DME:DIOX mixtures reveal relatively rapid degradation; after 200 cycles these cells lost approximately 70% and 60% of their initial capacities, respectively. Slightly better performance of the DME:DIOX mixture may be explained by the DIOX ability to form a better passivation layer on a Li foil electrode, which reduces the irreversible $Li_2S/Li_2S_2$ losses on its surface. Contrary to rapid fading of LiTFSI-based cells, significantly better capacity retention was observed in LiFSI-based electrolytes. In this case, the addition of DIOX as a co-solvent results in a surprisingly higher first cycle charge capacity compared to the performance of pure DME, which the inventors hypothesize to be related to the reduced polysulfide dissolution in DIOX-containing cells. However, in spite of the higher initial capacity, the DIOX-containing cells show a relatively fast degradation. In an effort to determine a possible degradation mechanism, the inventors investigated possible changes in electrolytes during their storage in sealed glass containers. It was found that DIOX-containing LiFSI electrolytes (LiFSI/DIOX and LiFSI/DME:DIOX) showed a gelation behavior in less than a day even at room temperature. Since both LiTFSI-based electrolytes and LiFSI/DME did not exhibit this behavior, it is proposed that a bulk cationic polymerization of DIOX by more polar LiFSI than LiTFSI is a probable gelation cause. Higher viscosity of LiFSI/DME: DIOX should indeed reduce the polysulfide dissolution, but the growth in viscosity during electrolyte polymerization over time will lead to an increase in the ohmic resistance and may lead to an eventual failure (here, the cell failed to operate at the 175th cycle). In order to avoid polymerization of the bulk electrolyte, a cell with LiFSI in pure DME was prepared. This cell retained 86% of the initial capacity after 200 cycles. This is significant considering the high operating temperature. Further cycling up to 1000 cycles showed that capacity fading slowed down over time and total capacity loss was only about 35% after 800 cycles. Interestingly, when the LiFSI concentration was reduced from 5 M to 3 M in order to increase polysulfide solubility in the electrolyte, it was observed that in spite of the lower initial capacity (as expected) the cycle stability improved with a capacity loss of about 24% after 1000 cycles. Higher Li salt concentration (5 M LiTFSI) result in higher specific capacity (due to the more suppressed polysulfide dissolution), but less stable performance (due to the formation of a less favorable SEI on Li, which exhibits higher and slowly growing resistivity). After the cell performance is stabilized at around the 100th cycle, the cell with 3 M electrolyte showed only 0.07 mAh/g of average capacity drop per cycle. More importantly, approximately 100.0% average CE was observed in both 3 M and 5 M LiFSI/DME cells, confirming that polysulfide dissolution and the resulting "S shuttle" was effectively suppressed.

Figure 31A:
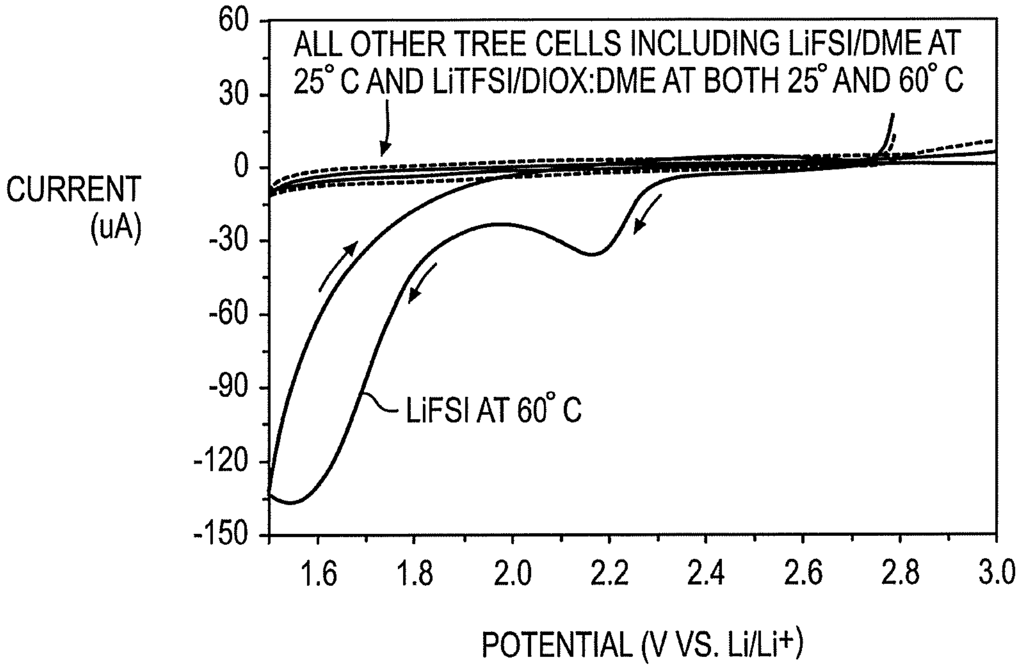
Figure 31B:
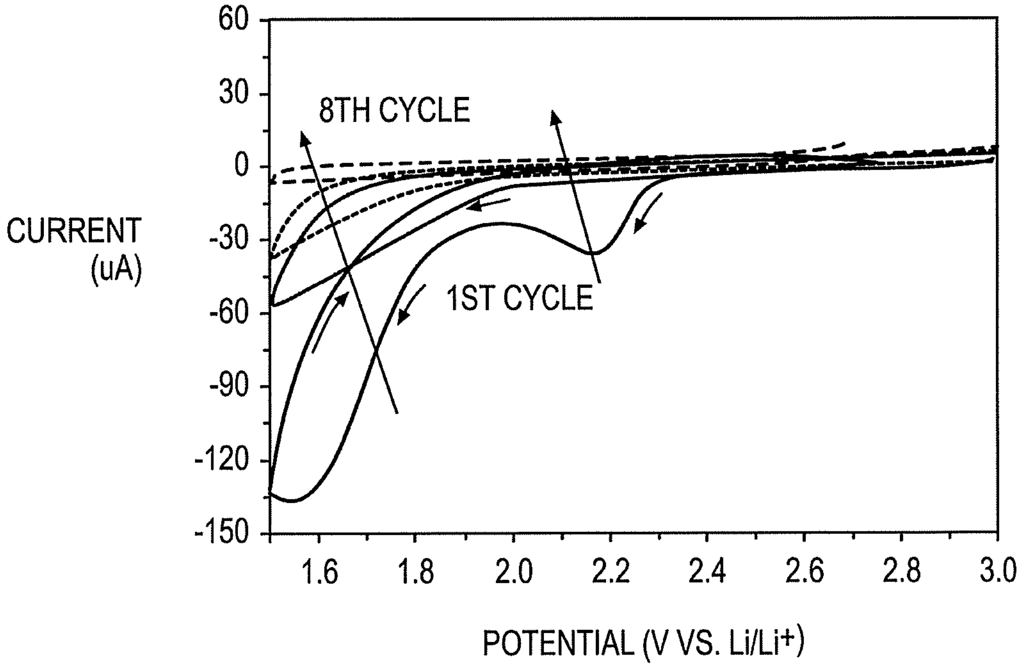

FIGS. 31A-31B illustrate cyclic voltammetry conducted on cells prepared using bare aluminum (Al) foils as working electrodes in Li half cells. A significant reduction is seen of LiFSI-based electrolytes at high voltages (a first peak at approximately 2.2V and a second peak at approximately 1.6V vs. Li/Li+) at 60° C. However, at room temperature the same LiFSI-based electrolytes (including LiFSI/DME) did not show any peaks, indicating that at these electrolyte salt concentrations high thermal energy is required to initiate the observed high voltage electrolyte reduction process. Furthermore, conventionally used LiTFSI-based electrolytes in different solvents did not show high voltage electrolyte decomposition at both 25° C. and 60° C., suggesting that electrolyte reduction is triggered by LiFSI. FIG. 31B shows the reduction is self-limiting.

Figure 32B:
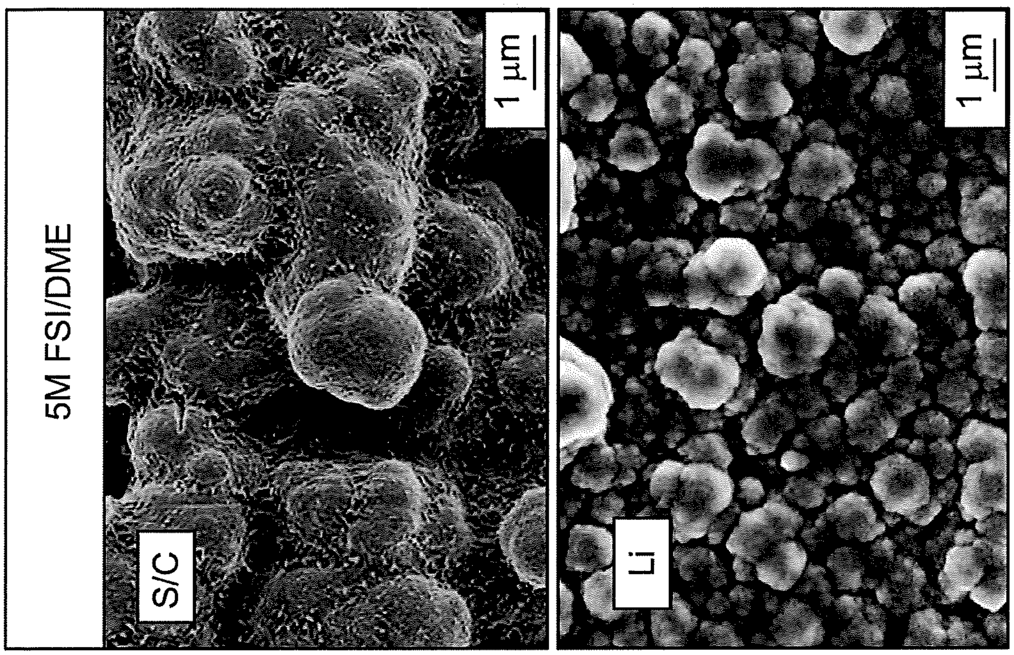
Figure 32A:
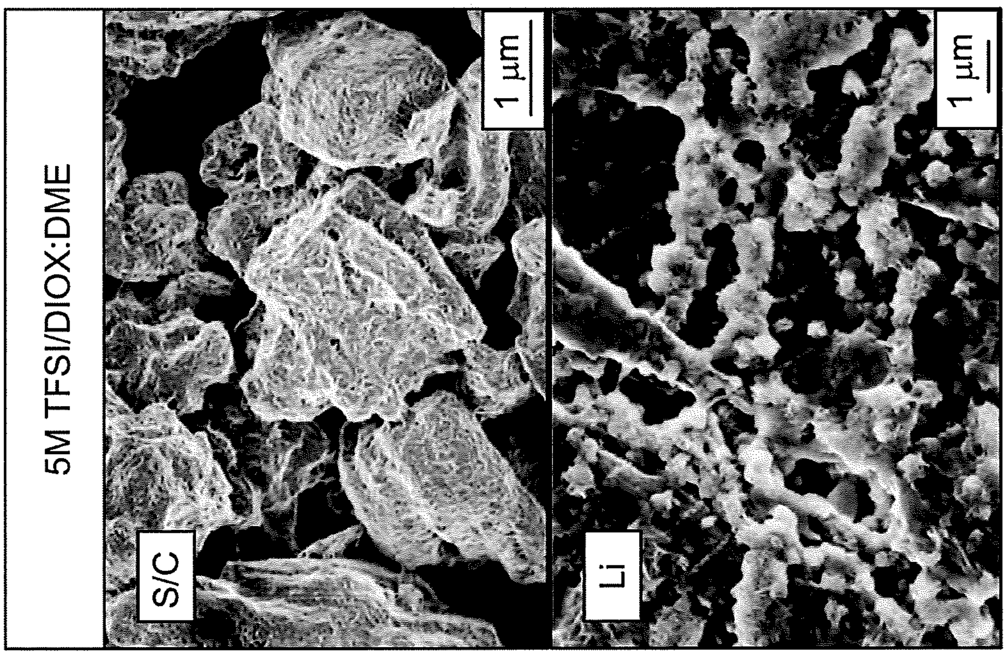

FIGS. 32A-32B illustrate scanning electron microscopy (SEM) micrographs of the S-impregnated carbon cathode and Li anode surfaces after cycling for 150 times, which shows a dramatic morphological difference between the LiTFSI and LiFSI-based electrolytes. The initial carbon morphology with sharp particle edges and a rough layer of deposited (poly)sulfides on the surface is visible for the cells with a traditional LiTFSI-based electrolyte, consistent with previous observations of typical S—C cathodes after cycling. In sharp contrast, a smooth layer of protective film containing spherical shaped-decomposed products covered the S—C cathodes cycled with the LiFSI electrolyte, supporting a high degree of decomposition by LiFSI and electrochemical observations. The Li surface in cells cycled with LiFSI electrolyte was covered uniformly with the decomposed electrolyte layer and showed dramatically reduced dendrite formation. In contrast, the morphology of the Li anodes in cells cycled with LiTFSI electrolyte was irregular and dendritic, demonstrating uneven Li plating/deplating.

Figure 33A:
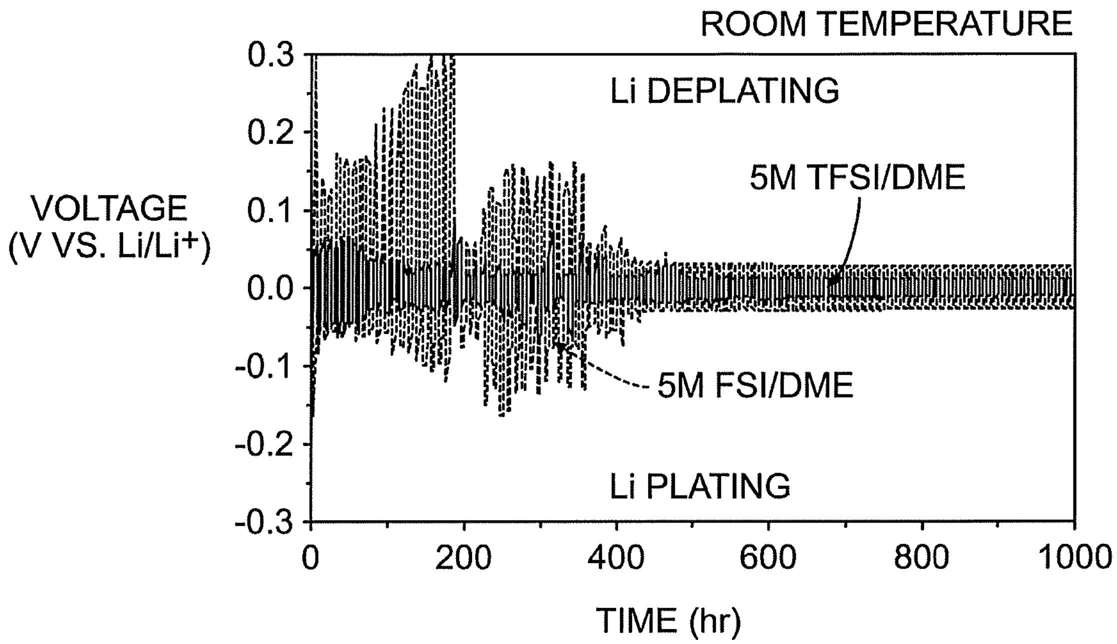
Figure 33B:
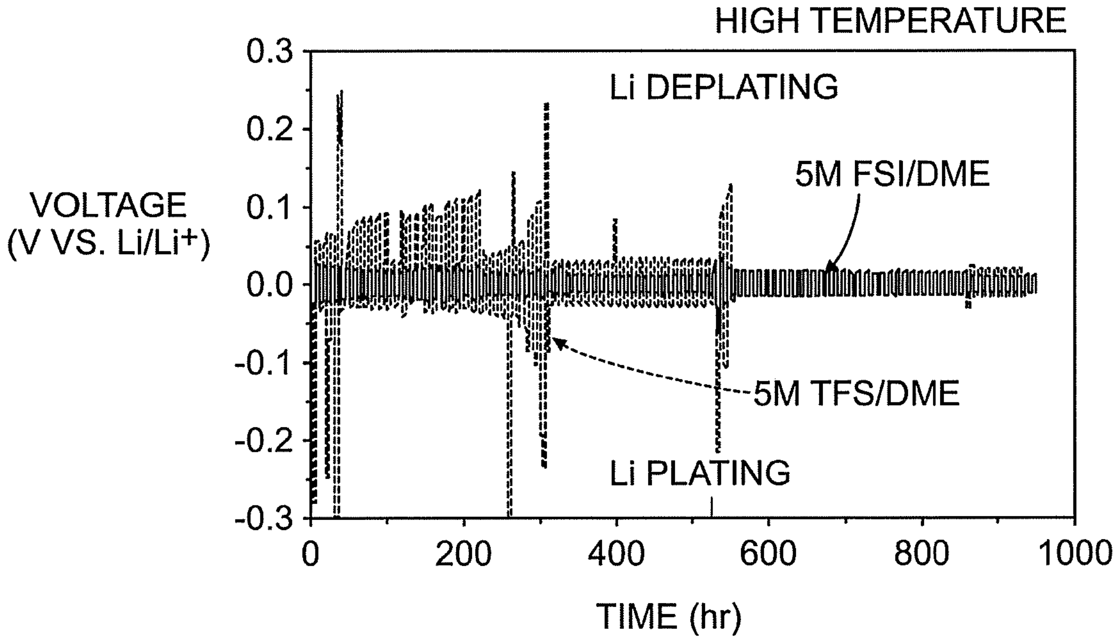

FIGS. 33A-33B illustrate the positive impact of the LiFSI salt on Li cycling stability. Tests were conducted of repetitive plating/deplating of Li with 5 M LiTFSI and LiFSI in DME single solvent using symmetric Li—Li cells. At both room temperature and 60° C., cells with LiTFSI-based electrolyte showed higher activation overpotential and large spikes in voltage, possibly due to the lack of SEI former (DIOX). In contrast, LiFSI-based electrolyte furnished stable cycling performance and lower overpotential. This result indicates the ability of LiFSI/DME to efficiently passivate the Li metal.

Figure 34:
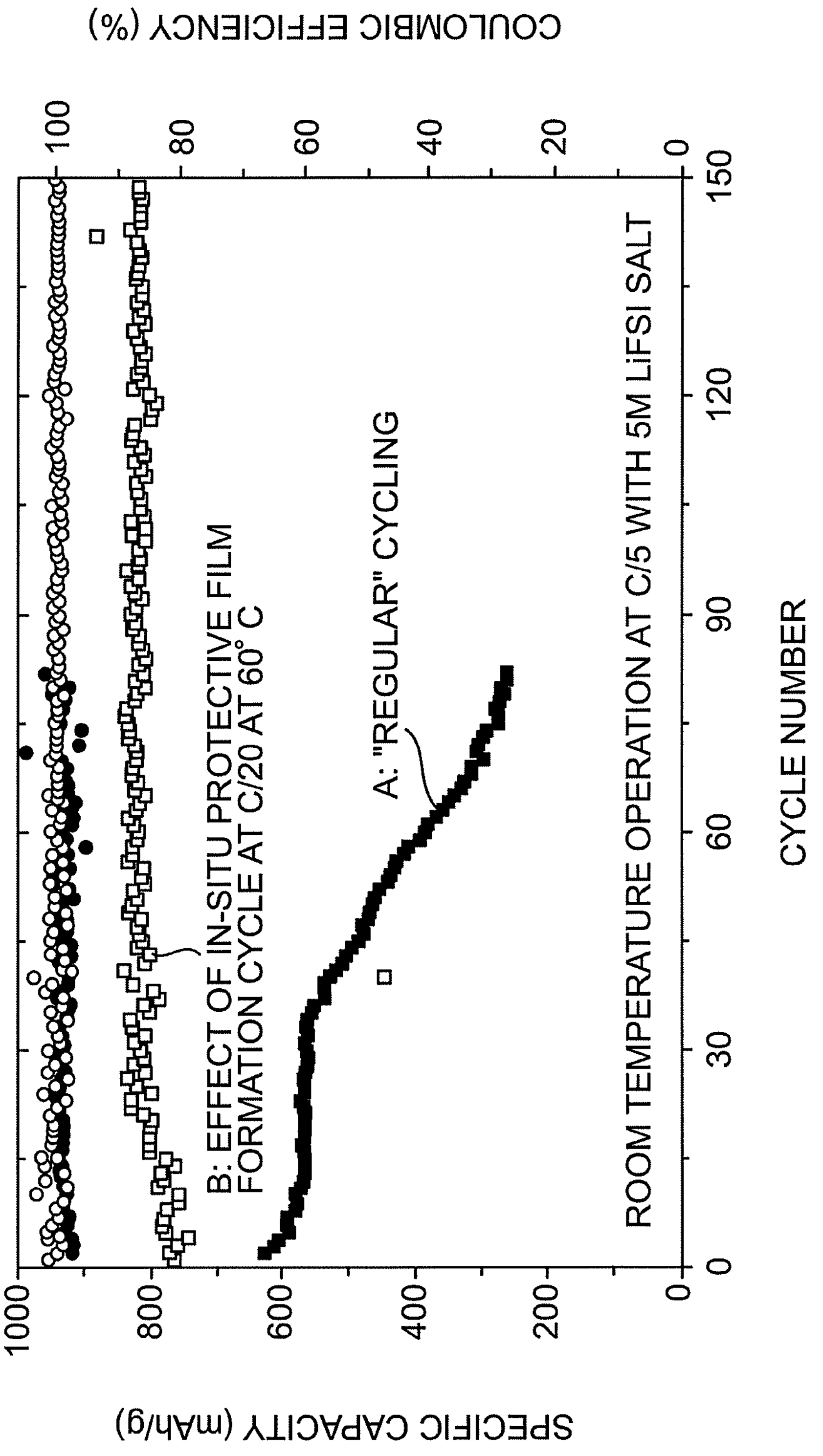

FIG. 34 illustrates the impact of the film formation on room temperature cycling of the S—Li cells in 5 M LiFSI/

DME electrolyte. At room temperature, a faster capacity decay can be seen than at 60° C., even though the dissolution rate at room temperature should be lower. However, when the first cycle of the cell is conducted at 60° C. and the rest of the cycles at room temperature, stable cycle performance was observed with high specific capacity. These results correlate well with the high temperature electrolyte reduction process observed at 60° C., suggesting that a protective film is only formed at elevated temperatures in the disclosed LiFSI-based electrolytes and is needed to stabilize the cell at room temperature. Based on the collected evidence, it can be concluded that the formation of FSI(-F) anion radicals at elevated temperatures (60° C.) and the subsequent radical-induced reactions with polysulfides and polymerization of DME is largely responsible for the in-situ formation of the efficient long-term protection layer on the surface of S cathodes. This protective surface layer is evidently permeable to Li ions, while being impermeable to polysulfides resulting in approximately 100% CE.

Accordingly, the use of LiFSI electrolytes in Li and Li-ion cells (particularly comprising low potential, less than 4 V vs. Li/Li+) electrodes may induce formation of the surface layer (on the low potential electrode(s)), which may stabilize either the electrode(s) or the electrolyte, or both against unfavorable surface reactions. When such a surface layer formation is induced, the cycle stability and overall performance of the cells may be significantly enhanced. Solvents other than DME may also be used in combination with LiFSI for the in-situ formation of the protective layer.

While commercial cells utilize 0.8-1 M salt concentration in electrolytes, the inventors have shown that high electrolyte concentration (molarity above 2 M) may provide additional benefits, such as improved cell stability either due to reduced reactivity between electrodes and electrolyte solvents or due to favorable interactions between the concentrated salts and solvent molecules, which may lead to the formation of the protective surface layers in-situ. Such high molarity electrolytes are particularly useful for the composite particles described in certain embodiments herein or in electrolyte compositions described in other embodiments herein. High electrolyte concentration may also lead to stable use of metal anodes (such as Li anodes), particularly when the electrolyte comprises LiFSI salts, LiI additives, or other metal halide additives, such as LiF, LiBr, MgBr, $MgF_2$, and others. It will be appreciated though, that such additives should not induce corrosion of the counter electrodes or the current collectors and should not induce significant undesirable redox shuttle for a given cell chemistry.

Figure 35:
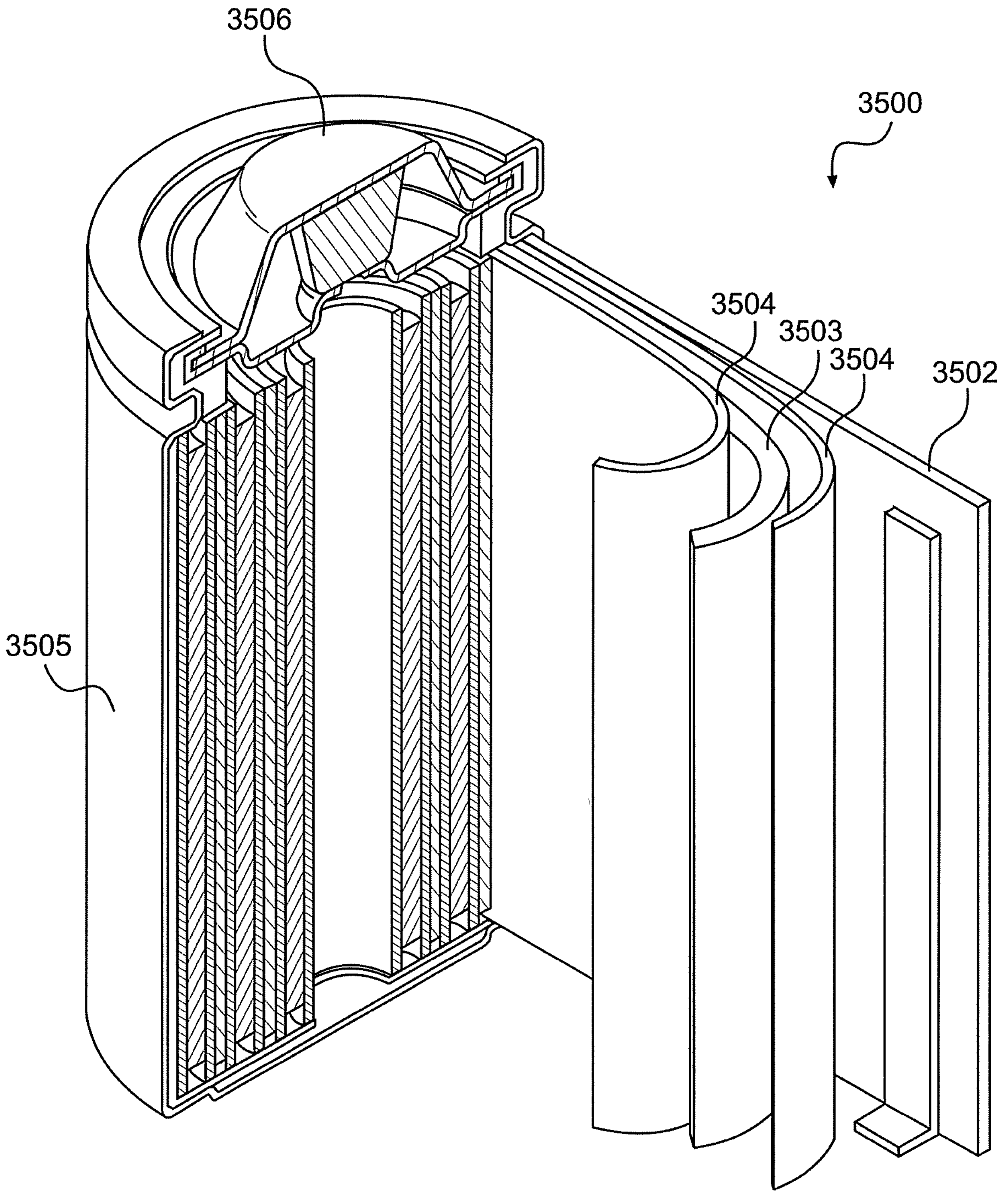
FIG. 35 illustrates an example metal-ion (e.g., Li-ion) battery in which the components, materials, methods, and other techniques described herein, or combinations thereof, may be applied according to various embodiments.

FIG. 35 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 3500 includes a negative anode 3502, a positive cathode 3503, a separator 3504 interposed between the anode 3502 and the cathode 3503, an electrolyte (not shown) impregnating the separator 3504, a battery case 3505, and a sealing member 3506 sealing the battery case 3505.

The invention claimed is:

1. A lithium (Li)-ion battery, comprising:
an anode electrode;
a cathode electrode;
a separator; and
an electrolyte impregnating the anode electrode, the cathode electrode, and the separator,
wherein:
the anode electrode comprises both carbon (C)-comprising active material and silicon (Si)-comprising active material,
the Si-comprising active material is present within hierarchical composite particles,
the hierarchical composite particles each comprise a first external shell and a first core,
the first core of each hierarchical composite particle comprises multiple Si nanoparticles incorporated within a first protective matrix, and
the first protective matrix comprises carbon and one or more of the following: a polymer, an oxide, a sulfide, and a phosphate,
wherein the cathode electrode comprises one or more cathode active materials that comprise one or more of the following: intercalation-type cathode material, conversion-type cathode material, and a mixture of the intercalation-type and the conversion-type cathode material,
wherein the electrolyte comprises two or more salts, each of the salts comprising a cation selected from Li, Mg, and a rare earth metal, and an anion selected from bis(fluorosulfonyl)imide (FSI), bis(trifluoromethanesulfonyl)imide (TFSI), $PF_6$, $BF_4$, I, Br, and Cl, and
wherein the hierarchical composite particles exhibit a type II shape, according to International Union of Pure and Applied Chemistry (IUPAC) classification, of nitrogen sorption curves collected at 77 K.

2. The Li-ion battery of claim 1, wherein each of the salts is selected from lithium bis(fluorosulfonyl)imide (LiFSI), lithium bis(trifluoromethanesulfonyl)imide (LiTFSI), $LiPF_6$, $LiBF_4$, LiI, LiF, $MgF_2$, $MgI_2$, LiCl, LiBr, $MgBr_2$, MgFSI, LaFSI, and LaTFSI.

3. The Li-ion battery of claim 1, wherein one or more of the hierarchical composite particles exhibit a cylindrical or fiber-like shape at one or more respective hierarchical levels.

4. The Li-ion battery of claim 1, wherein one or more of the hierarchical composite particles exhibit an irregular, flake-like, spherical or near-spherical shape.

5. The Li-ion battery of claim 1, wherein the first core of one or more of the hierarchical composite particles comprises multiple composite particles, wherein each of the composite particles comprises the multiple Si nanoparticles incorporated within the first protective matrix.

6. The Li-ion battery of claim 1, wherein the first external shell of one or more of the hierarchical composite particles comprises carbon.

7. The Li-ion battery of claim 1, wherein the first external shell of one or more of the hierarchical composite particles comprises a polymer.

8. The Li-ion battery of claim 1, wherein the hierarchical composite particles exhibit Brunauer-Emmett-Teller (BET) specific surface area equal to or less than about 35 $m^2/g$.

9. The Li-ion battery of claim 1, wherein the cathode electrode comprises two or more of the following elements in a composition of at least one cathode particle: lithium (Li), sulfur(S), carbon (C), iron (Fe), copper (Cu), fluorine (F), and bismuth (Bi).

10. The Li-ion battery of claim 9, wherein the two or more elements include two or more of the following: lithium (Li), sulfur(S) and carbon (C).

11. The Li-ion battery of claim 9, wherein the two or more elements include two or more of the following: lithium (Li), iron (Fe), copper (Cu), fluorine (F), and bismuth (Bi).

12. The Li-ion battery of claim 1, wherein the one or more cathode active materials comprise a metal oxide, a metal sulfide, and/or a metal phosphate.

13. The Li-ion battery of claim 1, wherein the one or more cathode active materials comprise a conductive carbon.

14. The Li-ion battery of claim 1, wherein at least one of the one or more cathode active materials is included in a cathode active material particle that exhibits a core-shell morphology.

15. The Li-ion battery of claim 1, wherein at least one of the one or more cathode active materials is included in a cathode active material particle that exhibits a hierarchical composite morphology.

16. The Li-ion battery of claim 15, wherein the cathode active material particle comprises a second external shell and a second core, wherein the second core comprises multiple active cathode material nanoparticles incorporated within a second protective matrix.

17. The Li-ion battery of claim 1, wherein the electrolyte comprises at least about 0.01 M of one or more of the following: LiI, LiF, LiBr, LiCl, $MgI_2$, or $MgBr_2$.

18. The Li-ion battery of claim 1, wherein the electrolyte comprises from about 3M to about 5M total salt concentration in a solvent or a solvent mixture.

19. The Li-ion battery of claim 1, wherein a decomposed part of the electrolyte is deposited on a surface of at least one of the anode electrode or the cathode electrode, and wherein the decomposed part of the electrolyte comprises at least one of the two or more salts.

20. A Li-ion battery anode material composition, comprising:

conductive carbon (C) active material; and silicon (Si)-comprising active material, wherein some or all of the Si active material is present within hierarchical composite particles, wherein the hierarchical composite particles each comprise a porous core and an external shell, wherein the porous core comprises multiple Si nanoparticles incorporated within a protective matrix, wherein the protective matrix of the hierarchical composite particles comprises carbon, pores and one or more of the following: a polymer, an oxide, a sulfide, and a phosphate, wherein the external shell of the hierarchical composite particles comprises carbon, wherein the hierarchical composite particles exhibit a cylindrical or fiber-like shape, and wherein the hierarchical composite particles exhibit a type II shape, according to International Union of Pure and Applied Chemistry (IUPAC) classification, of nitrogen sorption curves collected at 77 K.

21. The Li-ion battery anode material composition of claim 20, wherein a first amount of nitrogen adsorbed on a surface of the hierarchical composite particles in a first range of relative pressures of about 0.8-0.99 P/Po is at least three times more than a second amount of nitrogen adsorbed on the surface of the hierarchical composite particles in a second range of relative pressures of about 0-0.1 P/Po, as measured via nitrogen sorption at 77 K.

* * * * *